US009516621B2

(12) United States Patent
Bialer et al.

(10) Patent No.: US 9,516,621 B2
(45) Date of Patent: Dec. 6, 2016

(54) METHOD AND SYSTEM FOR ESTIMATING POSITION

(71) Applicant: Ramot at Tel-Aviv University Ltd., Tel-Aviv (IL)

(72) Inventors: Oded Bialer, Petach-Tikva (IL); Dan Raphaeli, Kfar-Saba (IL); Antony J. Weiss, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 14/433,686

(22) PCT Filed: Oct. 3, 2013

(86) PCT No.: PCT/IL2013/050811
§ 371 (c)(1),
(2) Date: Apr. 6, 2015

(87) PCT Pub. No.: WO2014/054044
PCT Pub. Date: Apr. 10, 2014

(65) Prior Publication Data
US 2015/0282112 A1    Oct. 1, 2015

Related U.S. Application Data

(60) Provisional application No. 61/709,361, filed on Oct. 4, 2012.

(51) Int. Cl.
*H04W 24/00* (2009.01)
*H04W 64/00* (2009.01)
(Continued)

(52) U.S. Cl.
CPC .............. *H04W 64/00* (2013.01); *G01S 1/02* (2013.01); *G01S 5/0273* (2013.01); *G01S 5/0278* (2013.01); *G01S 19/39* (2013.01); *H04L 45/24* (2013.01)

(58) Field of Classification Search
CPC ... H04W 4/001; H04W 4/005; H04W 76/02; H04W 64/00; H04W 64/003; H04W 64/006
USPC ......... 455/404.2, 456.1, 456.2, 456.3, 456.4, 455/456.5, 456.6
See application file for complete search history.

(56) References Cited

U.S. PATENT DOCUMENTS

| 6,256,506 B1 | 7/2001 | Alexander, Jr. et al. |
| 2005/0285793 A1* | 12/2005 | Sugar .................. G01S 5/0252 342/465 |

(Continued)

FOREIGN PATENT DOCUMENTS

| CA | 2442950 | 3/2005 |
| EP | 1596217 | 11/2005 |

(Continued)

OTHER PUBLICATIONS

International Preliminary Report on Patentability Dated Apr. 16, 2015 From the International Bureau of WIPO Re. Application No. PCT/IL2013/050811.

(Continued)

*Primary Examiner* — Jean Gelin

(57) ABSTRACT

A method of estimating a position of an object is disclosed. The method comprises receiving a plurality of signals transmitted between each of a respective plurality of reference stations of a known position and the object. The method further comprises, for each received signal: processing the signal using a matrix featuring a characteristic power delay profile and a characteristic signal waveform to provide a processed signal, and calculating a direct estimate of the position of the object based, at least in part, on the processed signals.

37 Claims, 21 Drawing Sheets

(51) Int. Cl.
G01S 1/02 (2010.01)
G01S 5/02 (2010.01)
H04L 12/707 (2013.01)
G01S 19/39 (2010.01)

(56) References Cited

U.S. PATENT DOCUMENTS

2006/0159206 A1 7/2006 Hofmann et al.
2012/0208523 A1* 8/2012 Hans ............... H04W 64/00
455/422.1

FOREIGN PATENT DOCUMENTS

| EP | 1605725 | 12/2005 |
|---|---|---|
| WO | WO 01/59940 | 8/2001 |
| WO | WO 2006/088599 | 8/2006 |
| WO | WO 2006/112846 | 10/2006 |
| WO | WO 2014/054044 | 4/2014 |

OTHER PUBLICATIONS

International Search Report and the Written Opinion Dated Jan. 15, 2014 From the International Searching Authority Re. Application No. PCT/IL2013/050811.
Al-Jazzar et al. "ML & Bayesian TOA Location Estimators for NLOS Environments", 2002 IEEE 56th Vehicular Technology Conference, 2002, Proceedings, VTC 2002—Fall, 2: 1178-1181, Dec. 10, 2002.
Chan et al. Exact and Approximate Maximum Likelihood Localization Algorithms, IEEE Transactions Technology, 55(1): 10-16, Jan. 2006.
Chehri et al. "Time-of-Arrival Estimation for IR-UWB Systems Based on Two Step Energy Detection", 24th Biennial Symposium on Communications, Kingston, ON, USA, Jun. 24-26, 2008, p. 369-373, Jul. 15, 2008.
Chen "A Non-Line-of-Sight Error Mitigation Algorithm in Location Estimation", IEEE Wireless Communications and Networking Conference, 1999 WCNC, New Orleans, LO, USA, Sep. 21-Sep. 24, 1999, 1: 316-320, Aug. 6, 2002.
Chung et al. "An Accurate Ultra Wideband (UWB) Ranging for Precision Asset Location", 2003 IEEE Conference on Ultra Wideband Systems and Technologies,Nov. 16-19, 2003, p. 389-393, Mar. 3, 2004.
Closas et al. "Bayesian Direct Position Estimation", Proceedings of the 21st International Technical Meeting of the Satellite Division of the Institute of Navigation (ION GNSS 2008), Savannah, GA, USA, Sep. 16-19, 2008, p. 183-190, 2008.
Closas et al. "Cramér-Rao Bound Analysis of Positioning Approaches in GNSS Receivers", IEEE Transactions on Signal Processing, 57(10): 3775-3786, Oct. 2009.
Closas et al. "Maximum Likelihood Estimation of Position in GNSS", IEEE Signal Processing Letters, 14(5): 359-362, May 2007.
Dardari et al. "Analysis of Threshold-Based TOA Estimators in UWB Channels", 14th European Signal Processing Conference, EUSIPCO 2006, Florence, Italy, Sep. 4-Sep. 8, 2006, 6 P., 2006.
Eric et al. "Direct Position Estimation of UWB Transmitters in Multipath Conditions", Proceedings of the 2008 IEEE International Conference on Ultra-Wideband (ICUWB2008), 1: 241-244, 2008.
Gezici et al. "Position Estimation Via Ultra-Wide-Band Signals", Proceedings of the IEEE, 97(2): 386-403, Feb. 2009.
Guvenc et al. "TOA Estimation for IR-UWB Systems With Different Transceiver Types", IEEE Transactions on Microwave Theory and Techniques, 54(4): 1876-1886, Apr. 2006.
Güvenç et al. "A Survey on TOA Based Wireless Localization and NLOS Mitigation Techniques", IEEE Communications Surveys & Tutorials, 11(3): 107-124, Third Quarter 2009.
Lee et al. "Ranging in a Dense Multipath Environment Using an UWB Radio Link", IEEE Journal on Selected Areas in Communications, 20(9): 1677-1683, Dec. 2002.
Li et al. "Super-Resolution TOA Estimation With Diversity for Indoor Geolocation", IEEE Transactions on Wireless Communications, 3(1): 224-234, Jan. 1, 2004.
Lottici et al. "Channel Estimation for Ultra-Wideband Communications", IEEE Journal on Selected Areas in Communications, 20(9): 1638-1645, Dec. 2002.
Lui et al. "Maximum a Posteriori Approach to Time-of-Arrival-Based Localization in Non-Line-of-Sight Environment", IEEE Transactions on Vehicular Technology, 59(3): 1517-1523, Mar. 2010.
Mazzucco et al. "A Ranging Technique for UWB Indoor Channel Based on Power Delay Profile Analysis", 2004 IEEE 59th Vehicular Technology Conference, VTC 2004—Spring, Milano, Italy, May 17-19, 2004, 5: 2595-2599, May 31, 2004.
Navarro et al. "Joint Estimation of TOA and DOA in IR-UWB", IEEE 8th Workshop on Signal Processing Advances in Wireless Communications, 2007, SPAWC 2007, Helsinki, Finland, 5 P., Dec. 12, 2007.
Papakonstatinou et al. "Direct Location Estimation for MIMO Systems in Multipath Environments", Global Telecommunications Conference, IEEE GLOBECOM 2008, New Orleans, LO, USA, Nov. 30, 2008-Dec. 4, 2008, p. 1-5, Dec. 8, 2008.
Roy et al. "Estimation of Signal Parameters Via Rotational Invariance Techniques—ESPRIT", IEEE Military Communications Conference—Communications—Computers, Teamed for the 90's, MILCOM 1986, Monterey, CA, USA, Oct. 5-9, 1986, 3: 41.6.1-41.6.5, 1986.
Stoica et al. "A Low-Complexity Noncoherent IR-UWB Transceiver Architecture With TOA Estimation", IEEE Transactions on Microwave Theory and Techniques, 54(4): 1637-1646, Apr. 2006.
Vidal et al. "High Resolution Time-of-Arrival Detection for Wireless Positioning Systems", 2002 IEEE 56th Vehicular Technology Conference, 2002, Proceedings, VTC 2002—Fall, 4: 2283-2287, Dec. 10, 2002.
Weiss "Direct Position Determination of Narrowband Radio Frequency Transmitters", IEEE Signal Processing Letters, 11(5): 513-516, May 2004.
Win et al. "Characterization of Ultra-Wide Bandwidth Wireless Indoor Channels: A Communication-Theoretic View", IEEE Journal on Selected Areas in Communications, 20(9): 1613-1627, Dec. 2002.
Yen et al. "Indoor Positioning Based on Statistical Multipath Channel Modeling", EURASIP Journal on wireless communications and networking, 2011: 189, 19 P., Nov. 30, 2011.
Yu et al. "Performance of UWB Position Estimation Based on Time-of-Arrival Measurements", 2004 International Workshop on Ultra Wideband Systems, Joint with Conference on Ultrawideband Systems and Technologies, Joint UWBST & IWUWBS, May 18-21, 2004, p. 400-404, Aug. 16, 2004.
Supplementary European Search Report and the European Search Opinion Dated May 6, 2016 From the European Patent Office Re. Application No. 13843390.9.
Sokhandan et al. "High Resolution Delay Estimation for Urban GNSS Vehicular Navigation", GNSS 2012—Proceedings of the 25th International Technical Meeting of the Satellite Division of the institute of navigation, ION GNSS 2012, Nashville/YN, USA, Sep. 17-21, 2012, XP056008455, p. 1417-1427, Sep. 21, 2012.
Van der Veen et al. "Joint Angle and Delay Estimation Using Shift-Invariance Techniques", IEEE Transactions on Signal Processing, XP011058058, 46(2): 405-418, Feb. 1, 1998. Section II, A, B, p. 406-408.

* cited by examiner

METHOD AND SYSTEM FOR ESTIMATING POSITION

RELATED APPLICATIONS

This application is a National Phase of PCT Patent Application No. PCT/IL2013/050811 having International filing date of Oct. 3, 2013, which claims the benefit of priority under 35 USC §119(e) of U.S. Provisional Patent Application No. 61/709,361 filed on Oct. 4, 2012. The contents of the above applications are all incorporated by reference as if fully set forth herein in their entirety.

FIELD AND BACKGROUND OF THE INVENTION

The present invention, in some embodiments thereof, relates to a positioning technique and, more particularly, but not exclusively, to a method and system for estimating a position in a multipath environment.

Locating a target in a wireless system involves the collection of location information from radio signals propagating between the target and a number of base stations at known position.

The ability to determine the location or position of a wireless device has become increasingly desirable as an ever increasing number of people carry wireless devices, such as mobile phones, pagers, wireless email/Internet devices, and communications radios on a daily basis. In most cases, because individuals carry the wireless devices on or about their person, it is a reasonable assumption that the position of a particular wireless device is also that of its owner. As a result, locating an individual may be accomplished by locating the wireless device they carry.

With the proliferation of private and public Wi-Fi networks in recent years, several positioning systems based on Wi-Fi networks have been introduced. In a wide-area Wi-Fi positioning system, the location and characteristics of Wi-Fi access points are used to locate Wi-Fi enabled mobile devices.

Time of arrival (TOA) based positioning techniques rely on measuring the propagation times between the target and the base stations. These measurements are based on estimation of the first arrival time of the transmitted signal. In case of multipath channel, where the transmitted signal is reflected by objects, walls, cars, buildings, people etc., the received signal contains several overlapping replicas of the transmitted signal and with the addition of noise accurate estimation of the first arrival time is a considerable challenge.

TOA estimation methods based on passing the received signal through a matched filter (MF) whose output peak epoch is the TOA estimate are disclosed in W. Chung and D. Ha, "An accurate ultra wideband (UWB) ranging for precision asset location," in Proc. IEEE Conf. Ultrawideband Syst. Technol. (UWBST), Reston, Va., November 2003, pp. 389-393; and K. Yu and I. Oppermann, "Performance of UWB position estimation based on time-of-arrival measurements," in Proc. IEEE Conf. Ultrawideband Syst. Technol. (UWBST), Kyoto, Japan, May 2004, pp. 400-404.

An alternative solution where a search for a finite number of MF output peak epochs is performed and then the TOA is estimated as the earliest peak epoch is disclosed in V. Lottici, A. D'Andrea, and U. Mengali, "Channel estimation for ultrawideband communications," IEEE J. Select. Areas Commun., vol. 20, no. 9, pp. 1638-1645, December 2002. Other solutions are based on comparing the received signal energy to a threshold and then performing a forward or backwards search with a heuristic TOA estimation criterion [L. Stoica, A. Rabbachin, and I. Oppermann, "A low-complexity noncoherent IR-UWB transceiver architecture with TOA estimation," IEEE Trans. Microwave Theory Tech., vol. 54, pp. 1637-1646, June 2006; I. Guvenc, Z. Sahinoglu, and P. V. Orlik, "TOA Estimation for IR-UWB Systems With Different Transceiver Types," IEEE Trans. Microwave Theory and Tech., vol. 54, no. 4, April 2006; D. Dardari, C.-C. Chong, and M. Z. Win, "Analysis of threshold-based TOA estimator in UWB channels," in Proc. Eur. Signal Process. Conf. (EUSIPCO), Florence, Italy, September 2006; A. Chehri, P. Fortier and P. M. Tardif, "Time-of-Arrival Estimation For IR-UWB Systems Based on Two Step Energy Detection" Biennial Symposium on Commun., pp. 369-373, June 2008.

Other approaches include the "frequency-domain super-resolution TOA estimation" which includes Multiple Signal Classification (MUSIC) [X. Li, "Super-Resolution TOA Estimation With Diversity for Indoor Geolocation," IEEE Trans. Wireless Commun., vol. 3, no. 1, January 2004], Estimation of Signal Parameters via Rotational Invariance Techniques (ESPRIT) [R. Roy, A. Paulraj and T. Kailath, "Estimation of Signal Parameters via Rotational Invariance Techniques-ESPRIT", IEEE Trans. Acoust., Speech, Signal Process., vol. 37, no. 7, pp. 984-995, July 1989.] and other algorithms [R. J. J. Vidal, M. Najar, "High resolution time-of-arrival detection for wireless positioning systems", In IEEE Vehicular Technology Conference, Vancouver, Canada, pp. 2283-2287, September 2002; M. Navarro and M. Najar, "Joint Estimation of TOA and DOA in IR-UWB", IEEE Workshop on Signal Processing Advances in Wireless Commun., Helsinki, Finland, pp. 17-20, June 2007]. Win and Scholtz [M. Z. Win and R. A. Scholtz, "Characterization of ultra-wide bandwidth wireless indoor communications channels: A communication theoretic view," IEEE J. Sel. Areas Commun., vol. 20, pp. 1613-1627, December 2002] introduced the generalized maximum likelihood (GML) solution. The method relies on the assumption that the number of multipath components is finite and known and all the multipath coefficients and their arrival times are jointly estimated.

An iterative approximation to the GML was introduced by [J. Y. Lee and R. A. Scholtz, "Ranging in a dense multipath environment using an UWB radio link," IEEE J. Select. Areas Commun, vol. 20, no. 9, pp. 1677-1683, December 2002.]. The multipath coefficients are estimated one by one and removed from the received signal sequentially until the strongest remaining coefficient is below a preset threshold. The TOA is determined according to the earliest arrival path.

European Publication No. EP1596217 discloses a method of detecting the time of arrival (TOA) of the first-arrival-path signal in a transmission system where wide band signals are transmitted. A parameter related to the energy of a plurality of samples of a received signal resulting from a multipath propagation of a transmitted signal is evaluated. For each TOA candidate sample, the observation period is divided into a corresponding pair of complementary windows, where the first window in each pair comprises the samples preceding the candidate sample and the other one comprises the remaining samples in the period. The signal energy in both windows of each window pair is evaluated, and the sample giving rise to windows whose energies maximize a function related to the energy ratio of the two windows in each pair is chosen as the estimated TOA sample.

Additional background art includes I. Guvenc and C. C. Chong, "A Survey on TOA Based Wireless Location and NLOS Mitigation Techniques", IEEE Comm. Surveys and Tutorials, vol. 11, no. 3, pp. 107-124, 2009; K. W. K. Lui, H. C. So and W. K. Ma, "Maximum A Posteriori Approach to Time-of-Arrival-Based Localization in Non-Line-of-Sight Environment", IEEE Trans. on Vehicular Technology, vol. 53, no. 3, pp. 1517-1523, Match 2010; P. C. Chen, "A non-line-of-sight error mitigation algorithm in location estimation", in Proc. IEEE Int. Conf. Wireless Commun. Netw. (WCNC), vol. 1, pp. 316-320, September 1999; A. Al-Jazzar and J. J. Caffery, "ML and Bayesian TOA location estimators for NLOS environments", in Proc. IEEE Veh. Technol. Conf. (VTS), vol. 2, pp. 1178-1181, September 2002; Y. T. Chan, H. Y. Chin Hang and Pak-chung Ching, "Exact and Approximate Maximum Likelihood Localization Algorithms", IEEE Trans. on Vehicular Technology, vol. 55, no. 1, pp. 10-16, January 2006; S. Gezici and H. V. Poor "Position Estimation via Ultra-Wide-Band Signals", Proceeding of the IEEE, vol. 97, no. 2, pp. 386-403, February 2009; A. J. Weiss, "Direct Position Determination of Narrowband Radio Frequency Transmitters", IEEE Signal Processing Letters, vol. 11, no. 5, May 2004; P. Closas, C. Fernandez-Prades and J. A. Fernandez-Rubio, "Maximum Likelihood Estimation of Position in GNSS", IEEE Signal Processing Letters, vol. 14, no. 5, May 2007; P. Closas, C. Fernandez-Prades and J. A. Fernandez-Rubio, "Cramer-Rao Bound Analysis of Positioning Approaches in GNSS Receivers", IEEE Transactions On Signal Processing, vol. 57, no. 10, October 2009; P. Closas, C. Fernandez-Prades, D. Bernal and J. A. Fernandez-Rubio, "Bayesian Direct Position Estimation", IEEE Aerospace Conference, 2010; C. Yen and P. J. Voltz, "Indoor positioning based on statistical multipath channel modeling," EURASIP Journal on Wireless Communications and Networking 2011; K. Papakonstantinou and D. Slock, "Direct Location Estimation for MIMO Systems in Multipath Environments", IEEE Global Communications Conference (GLOBECOM). November 2008; and M. Eric and D. Vucic, "Direct position estimation of UWB transmitters in multipath conditions", IEEE International Conference on Ultra-Wideband (ICUWB 2008), vol. 1. 2008.

SUMMARY OF THE INVENTION

According to an aspect of some embodiments of the present invention there is provided a method of estimating a position of an object. The method comprises: receiving a plurality of signals transmitted between each of a respective plurality of reference stations of known position and the object. The method further comprises, for each received signal: processing the signal using a matrix featuring a characteristic power delay profile and a characteristic signal waveform to provide a processed signal. The method further comprises calculating a direct estimate of the position of the object based, at least in part, on the processed signals.

According to some embodiments of the invention the matrix is based on an autocorrelation matrix of the received signal and is a function of the position of the object.

According to some embodiments of the invention the method further comprises partitioning the signal into at least a first segment containing noise and a second segment containing at least a multipath signal corresponding to a plurality of paths between the object and a respective reference station, wherein the calculation of the direct estimate is based, at least in part, on the segments.

According to some embodiments of the invention the calculating the estimate comprises combining, for each signal, contributions from the first segment and the second segment in a statistically independent manner.

According to an aspect of some embodiments of the present invention there is provided a system for estimating a position of an object. The system comprises a plurality of reference stations of know positions; and a data processor, configured for executing the method as described above and further exemplified below.

According to an aspect of some embodiments of the present invention there is provided a computer software product. The product comprises a computer-readable medium in which program instructions are stored, which instructions, when read by a data processor, cause the data processor to receive a plurality of signals transmitted between each of a respective plurality of reference stations of know position and an object and execute the method as described above and further exemplified below.

According to an aspect of some embodiments of the present invention there is provided a method of estimating a time-of-arrival (TOA) of a signal transmitted between an object and a reference station. The method comprises: receiving a multipath signal having a plurality of components respectively corresponding to a plurality of paths between the object and the reference station; processing the signal using a matrix featuring a characteristic power delay profile and a characteristic signal waveform to provide a processed signal; and calculating an estimate of the TOA of the signal based, at least in part, on the processed signal.

According to some embodiments of the invention the matrix is based on a noise variance.

According to some embodiments of the invention the matrix is based on an autocorrelation matrix of the signal and is a function of the time of arrival of the received signal.

According to some embodiments of the invention the processing comprising modeling the signal using a function characterized by the matrix, the function being selected from the group consisting of a Gaussian function, a Lorentzian function, a hyperbolic secant function, a logistic distribution, a Fourier transform and a wavelet transform.

According to some embodiments of the invention at least one of the signals is a diversity signal having diversity measurements, and the method further comprises processing the diversity measurements, wherein the estimate is based on the processed diversity measurements.

According to some embodiments of the invention the diversity comprises at least one of: time diversity, frequency diversity, interference diversity, antenna polarity diversity and space diversity.

According to some embodiments of the invention the space diversity is formed by a system selected from the group consisting of Multiple-Input Multiple-Output (MIMO) system, a Single-Input Multiple-Output (SIMO) system and a Multiple-Input Single-Output (MISO) system.

According to some embodiments of the invention the diversity is formed by frequency hopping.

According to some embodiments of the invention the diversity measurements comprises data received from a plurality of statistically independent channels of a respective reference station.

According to some embodiments of the invention the diversity measurements comprises data received from a plurality of correlated channels of a respective reference station.

According to some embodiments of the invention the method further comprises partitioning the signal into at least a first segment containing noise and a second segment containing at least a multipath signal corresponding to a plurality of paths between the object and a respective reference station, wherein the calculation of the TOA estimate is based, at least in part, on the segments.

According to some embodiments of the invention the partitioning comprises employing an energy search procedure.

According to some embodiments of the invention the calculating the estimate comprises combining, for each signal, contributions from the first segment and the second segment in a statistically independent manner.

According to some embodiments of the invention a signal transmitted between the object and each of the at least two reference stations is a two-way signal, and wherein the matrix features a difference between a signal transmission time of the object and a signal transmission time of a respective reference station.

According to some embodiments of the invention at least two of the reference stations are synchronized, and the object is unsynchronized with any reference station.

According to some embodiments of the invention a signal transmitted between the object and each of the at least two reference stations is a one-way signal, and wherein the plurality of reference stations comprises at least three reference stations.

According to some embodiments of the invention the estimate is in three-dimensions, and wherein the plurality of reference stations comprises at least four reference stations.

According to some embodiments of the invention at least two of the reference stations are unsynchronized, wherein the object is unsynchronized with any reference station, and wherein a signal transmitted between the object and each of the at least two reference stations is a two-way signal.

According to some embodiments of the invention at least two of the reference stations are synchronized, wherein the object is unsynchronized with any reference station, and wherein a signal transmitted between the object and each of the at least two reference stations is a two-way signal.

According to some embodiments of the invention the reference stations are located at indoor positions, and the method is utilized for estimating a distance between a reference station and an object.

According to some embodiments of the invention the object is a moving object.

According to some embodiments of the invention the reference stations are located at outdoor positions, and the method is utilized for estimating an outdoor distance of the object.

According to some embodiments of the invention the object is an inventory item.

According to some embodiments of the invention the object is a human or an animal.

According to some embodiments of the invention the object is a vehicle.

According to some embodiments of the invention the object is a mobile phone.

According to some embodiments of the invention the reference stations are Access Points, transmitting and receiving over a wireless network according to the LAN protocol, and wherein the object is a client of the wireless network.

According to some embodiments of the invention the reference stations system are satellites are transmitting according to a Global Navigation Satellite System (GNSS) protocol, and the object comprises a receiver for GNSS signals, where the GNSS is selected from the group consisting of a Global Positioning System (GPS), a Global Orbiting Navigation Satellite System (GLONASS) and a Galileo navigation system.

According to some embodiments of the invention the signals are in the time domain.

According to some embodiments of the invention the signals are in the frequency domain.

According to some embodiments of the invention the calculation of the direct estimate and/or TOA estimate comprises using the matrix for constructing a polynomial objective function, and searching for frequency at which the polynomial objective function has an extremum.

According to some embodiments of the invention the matrix is the same for all received signals.

According to some embodiments of the invention the matrix is different for at least two of the received signals.

According to some embodiments of the invention the characteristic power delay profile is calculated based on an estimate of a signal-to-noise ratio.

According to some embodiments of the invention the method further comprises updating the characteristic power delay profile using data collected from signal transmissions between the reference stations and other objects.

According to some embodiments of the invention the method further comprises, obtaining at least one additional power delay profile, wherein the processing the signal is executed separately for each power delay profile.

According to some embodiments of the invention the method comprises scoring each power delay profile and selecting a power delay profile based on the score, wherein the calculation of the direct estimate and/or the TOA estimate is based on the selected power delay profile.

According to some embodiments of the invention the method further comprises jointly estimating a plurality of pairs of candidate power delay profiles and respective candidate direct estimations of the position of the object, scoring each pair of the plurality of pairs, and selecting the direct estimation of the position of the object based on the score.

According to some embodiments of the invention the method further comprises jointly estimating a plurality of pairs of candidate power delay profiles and respective candidate TOAs, scoring each pair of the plurality of pairs, and selecting the TOA estimate based on the score.

According to some embodiments of the invention the method further comprises, obtaining at least one additional signal waveform, wherein the processing the signal is executed separately for each signal waveform.

According to some embodiments of the invention the method comprises scoring each signal waveform and selecting a signal waveform based on the score, wherein the calculation of the direct estimate and/or the TOA estimate is based on the selected signal waveform.

According to some embodiments of the invention the method further comprises jointly estimating a plurality of pairs of candidate signal waveforms and respective candidate direct estimations of the position of the object, scoring each pair of the plurality of pairs, and selecting the direct estimation of the position of the object based on the score.

According to some embodiments of the invention the method further comprises jointly estimating a plurality of pairs of candidate signal waveforms and respective candidate TOAs, scoring each pair of the plurality of pairs, and selecting the TOA estimate based on the score.

According to some embodiments of the invention the method further comprises: jointly estimating a plurality of sets of: candidate power delay profiles, candidate signal waveforms, and respective candidate direct estimations of the position of the object, scoring each set of the plurality of sets, and selecting the direct estimation of the position of the object based on the score.

According to some embodiments of the invention the method further comprises: jointly estimating a plurality of sets of: candidate power delay profiles, candidate signal waveforms, and respective candidate TOAs, scoring each set of the plurality of sets, and selecting the TOA estimate based on the score.

According to some embodiments of the invention the method further comprises obtaining a model describing a relation between the power delay profile and a distance from the object to a respective reference station, wherein the matrix is expressed in terms of the model.

According to an aspect of some embodiments of the present invention there is provided a system for estimating a position of an object, comprising: a plurality of reference stations of know positions; and a data processor, configured for executing the method as described above and further exemplified below to provide a TOA of signals transmitted between the object and each of the reference stations and for calculating the position based on the TOA.

According to an aspect of some embodiments of the present invention there is provided a computer software product, comprising a computer-readable medium in which program instructions are stored, which instructions, when read by a data processor, cause the data processor to receive a plurality of signals transmitted between each of a respective plurality of reference stations of know position and an object and execute the method as described above and further exemplified below.

According to an aspect of some embodiments of the present invention there is provided a method of estimating a position of an object. The method comprises comprising: receiving a plurality of signals transmitted between each of a respective plurality of reference stations of known position and the object; for each signal, estimating a time-of-arrival (TOA) of the signal using the method as described above and further exemplified below, thereby providing a plurality of TOA estimates; and calculating an indirect estimate of the position of the object based, at least in part, on the plurality of TOA estimates.

According to some embodiments of the invention the calculation of the indirect estimate comprises utilizing at least one procedure selected from the group consisting of a weighted least-squares procedure, a non-weighted least-squares procedure and a Kalman filter procedure.

According to an aspect of some embodiments of the present invention there is provided a method of estimating a distance between an object and a reference station, comprising: receiving a two-way multipath signal having a plurality of components respectively corresponding to a plurality of paths between the object and the reference station; processing the signal using a matrix featuring a difference between a signal transmission time of the object and a signal transmission time of the reference station; and calculating an estimate of the propagation delay of the signal based, at least in part, on the processed signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
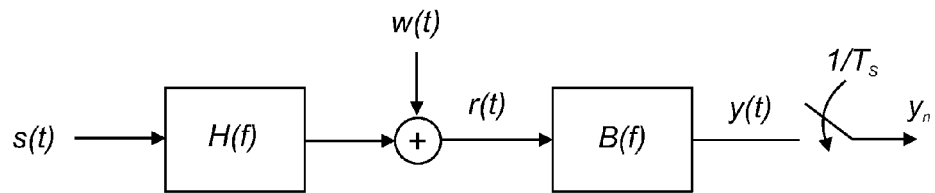
FIG. 1 is a schematic illustration of a baseband system model, used according to some embodiments of the present invention.

DESCRIPTION OF SPECIFIC EMBODIMENTS
OF THE INVENTION

The present invention, in some embodiments thereof, relates to a positioning technique and, more particularly, but not exclusively, to a method and system for estimating a position in a multipath environment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Position estimation methods can be partitioned into two classes: direct and indirect position estimation.

In the direct position estimation (DPE) the target position is estimated in one step, directly from the received signals (the raw measurements) from all base stations together. The received signals are transferred to the server for joint processing.

The indirect position estimation (IPE) is done in two stages. In a first stage, a few position related parameters are estimated at each base station independently. In a second stage, the position is estimated based on the parameters obtained in the first stage. Typically, the position estimation in the second stage is the position that minimizes the sum of squared errors between the measured distances (obtained in the first step) and the distances corresponding to the estimated position. If a figure of merit is provided with each distance measurement then the position can be estimated by weighted least squares [Gezici et al., supra].

It was found by the present inventors that indirect positioning requires passing less data to the location estimation processor.

As used herein, "multipath" refers to the reception of a line of sight signal as well as a non-line of sight signal transmitted from a signal source.

Multipath signals may result, for example, from the reflection of a signal from a nearby reflector, such as the ground, objects, buildings, face or the surface of a body of water. Multipath signals may also result when signals are significantly refracted. In general a non-reflected or refracted (straight line) signal is referred to as "line-of-sight signal," whereas a reflected or refracted signal is referred to as a "diverted signal." The term "multipath signal" refers to a signal which includes a line-of-sight signal and at least one diverted signal.

Since the diverted signal does not travel along the line-of-sight, it always arrives at the receiver later than the line-of-sight signal.

Figure 17:
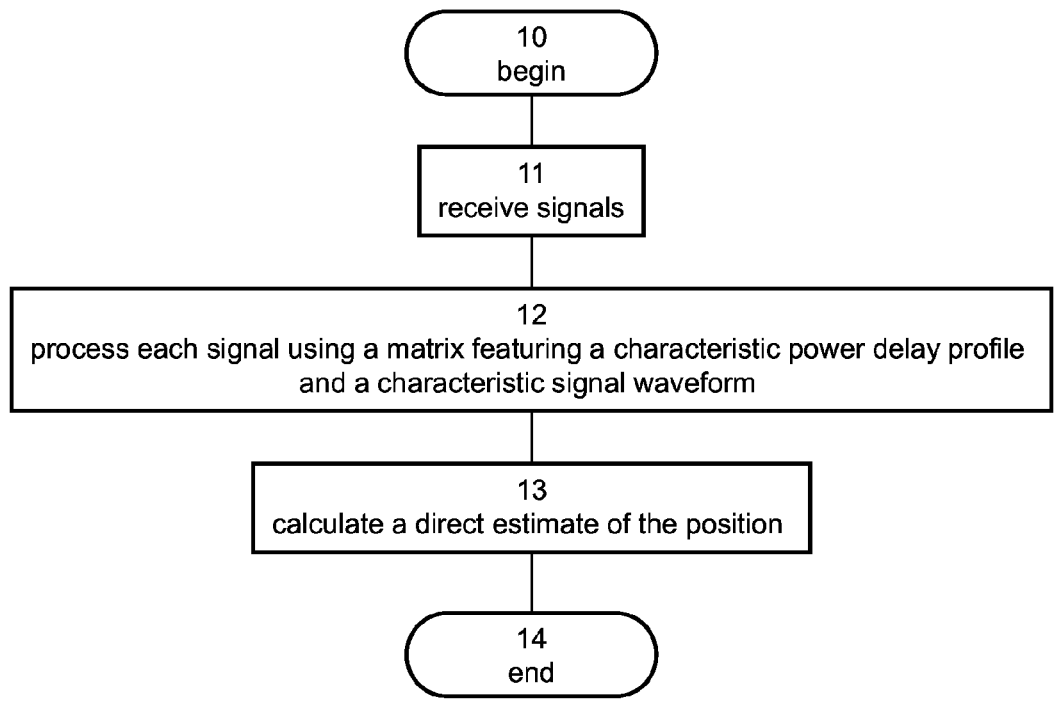
FIG. 17 is a flowchart diagram of a method of estimating a position of an object according to some embodiments of the present invention.

Referring now to the drawings, FIG. 17 is a flowchart diagram of a method of estimating a position of an object according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The object can be a cellular phone, an inventory item, a human being, an animal, a vehicle, a robot and the like. The method is suitable for both indoors and outdoors applications, and can be used for estimating the position of a stationary or moving objects.

The method begins at 10 and continues to 11 at which the method receives a plurality of signals transmitted between each of a respective plurality of reference stations of known position and the object. Optionally and preferably the method receives at least one signal from each reference station. Thus, for example, when the method employs K reference stations, the method receives at least K signals. The reference stations can be positioned indoors or outdoors.

Many types of reference stations are contemplated. For example, in some embodiments of the present invention one or more (e.g., all) of the reference stations is an Access Point (AP) 180B communicating with the object over a wireless link. Any AP known in the art can be employed. Representative examples include, without limitation, an IEEE 802.11 Wireless Local Access Network such as, but not limited to, IEEE 802.11a-g, IEEE 802.15.4, and derivatives thereof; cellular-based data systems including, without limitation, the "TIA/EIA-95-B Mobile Station-Base Station Compatibility Standard for Dual-Mode Wideband Spread Spectrum Cellular System" (the IS-95 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), the standard offered by a consortium named "3rd Generation Partnership Project 2" (3GPP2) and embodied in "TR-45.5 Physical Layer Standard for cdma2000 Spread Spectrum Systems" (the IS-2000 standard), and the high data rate (HDR) system that conforms to the TIA/EIA/IS-856 standard (the IS-856 standard).

In some embodiments of the present invention one or more (e.g., all) of the reference stations is a satellite transmission system, which can transmit according to a Global Navigation Satellite System (GNSS) protocol, such as, but not limited to, a Global Positioning System (GPS) protocol, a Global Orbiting Navigation Satellite System (GLONASS) protocol and a Galileo navigation system protocol.

In any event, the object includes a transmitter and/or receiver configured for communicating with each of the reference stations.

Each received signal can be a multipath signal. The received signal can be in the time domain or the frequency domain, as desired.

When the signal is the time domain, the signal is optionally a complex sampled signal represented by a vector, wherein each component of the vector can be a signal intensity value and phase associated with a different time point within the signal. Optionally, but not necessarily, the components are equally spaced in terms of the corresponding time points.

When the signal is the frequency domain, the signal is optionally a complex sampled signal represented by a vector, wherein each component of the vector can be a signal intensity value and phase associated with a different frequency within the signal. Optionally, but not necessarily, the components are equally spaced in terms of the corresponding frequencies. Alternatively, the components can be spaced according to a non-linear scale, such as, but not limited to, a logarithmic scale. A representative example of a signal in the frequency domain is, without limitation, a Fast Fourier Transform (FFT) or Discrete Fourier Transform (DFT) vector.

While the embodiments below are described with a particular emphasis to signals in the time domain, it is to be understood that more detailed reference to signals in the time domain is not to be interpreted as limiting the scope of the invention in any way, and one of ordinary skills in the art, provided with the details described herein would know how to adjust the procedures of the present invention for the case in which the signal is represented in the frequency domain.

Throughout this specification, underlined or bold symbols represent vector or matrix quantities.

The method optionally and preferably continues to 12 at which each received signal is processed using a matrix $\underline{R}$ featuring a characteristic power delay profile $\sigma_h^2(t)$ and a characteristic signal waveform and optionally a noise variance.

The power delay profile is typically a channel average power as a function of the time delay and it can be expressed by $\sigma_h^2(t)=E\{|h(t)|^2\}$ where $E\{x\}$ is the expectation of the quantity x, and h(t) is the multipath channel signal. The power delay profile expresses the statistical characteristics of the multipath channel and is typically dependent on the specific multipath environment, and may also vary within a specific environment according to the object positions. For example, for a given reference station positions the power delay profile may differ for different target positions.

The power delay profile can be provided in more than one way. In some embodiments of the present invention it is provided from external source, for example, a user input, in some embodiments of the present invention it is a predetermined profile, and in some embodiments of the present invention it is estimated by the method.

The power delay profile can be initialized per a specific location environment and kept fixed. In some embodiments of the present invention the power delay profile can be adaptively varied to better match the multipath statistical characteristics of the specific environment and of the specific object position.

Optionally and preferably the power delay is estimated independently per each link between reference station and object. Estimating the power delay profile is preferably performed utilized a priori information such as SNR information or information pertaining to the expected range between the object and the reference station. Alternatively, the power delay profile can be estimated jointly and incorporeally with the position estimation.

In some embodiments of the present invention two or more power delay profile candidates are employed, and a separate matrix is calculated for each delay profile candidate. The signal processing as further detailed hereinbelow can be executed for each matrix. In some embodiments, the power delay profile candidates are scored during the processing. In these embodiments, the power delay profile score is used for selecting one power delay profile from the candidates (e.g., the power delay profile with the highest score) and the position is estimated using the selected power delay profile.

Also contemplated are embodiments in which a model describing the relation between the power delay profile and the distance from the object to a respective reference station is obtained. In these embodiments, the matrix $\underline{R}$ is expressed in terms of this model. A representative example of this embodiment is provided in Example 8 of the examples section that follows.

Two or more power delay profile candidates can also be employed according to some embodiments of the present invention in a joint estimation of candidate positions and candidate power delay profiles. In these embodiments, a score is optionally and preferably given to each pair of candidate power delay profile and candidate position. The estimated position of the object can then be selected based on the score. Typically, but not necessarily, the candidate position that is associated with the higher score is selected as the estimated position of the object.

A more detailed description of an embodiment which employs a plurality of power delay profile candidates is described hereinunder.

The present inventors have found several functions that can be used to approximate the power delay profile. The advantageous of these functions is that they depend on one or two unknown parameters which are relatively easy to estimate.

Figure 19:
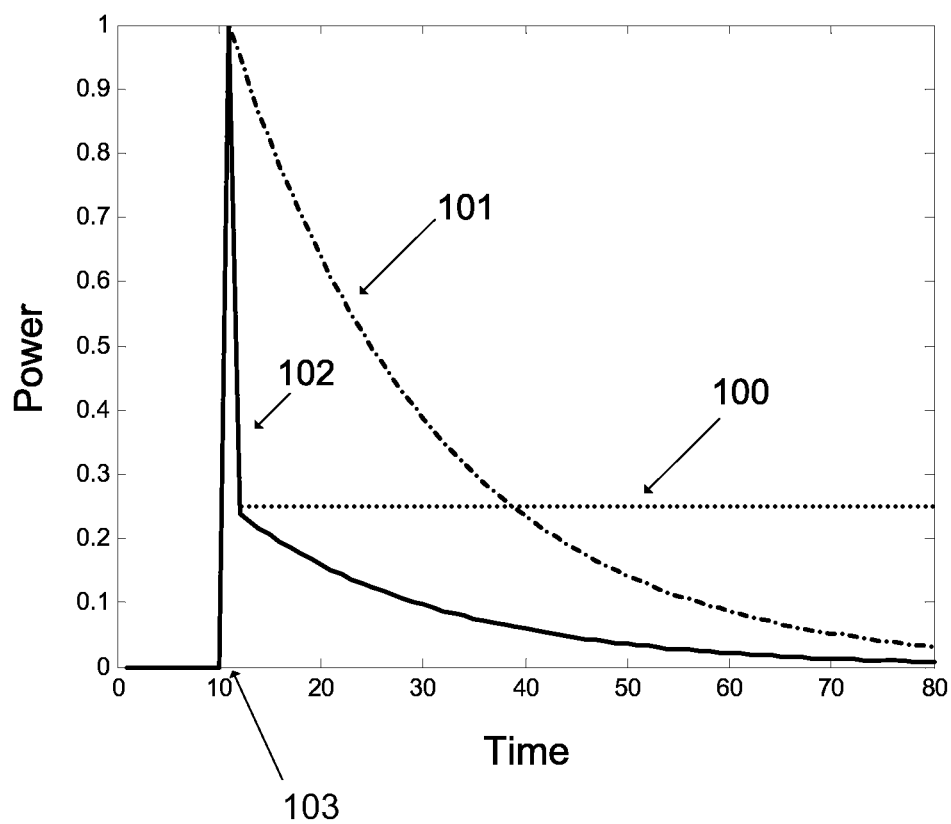
FIG. 19 shows functions that can be used for approximating a power delay profile, according to some embodiments of the present invention.
Figure 20:
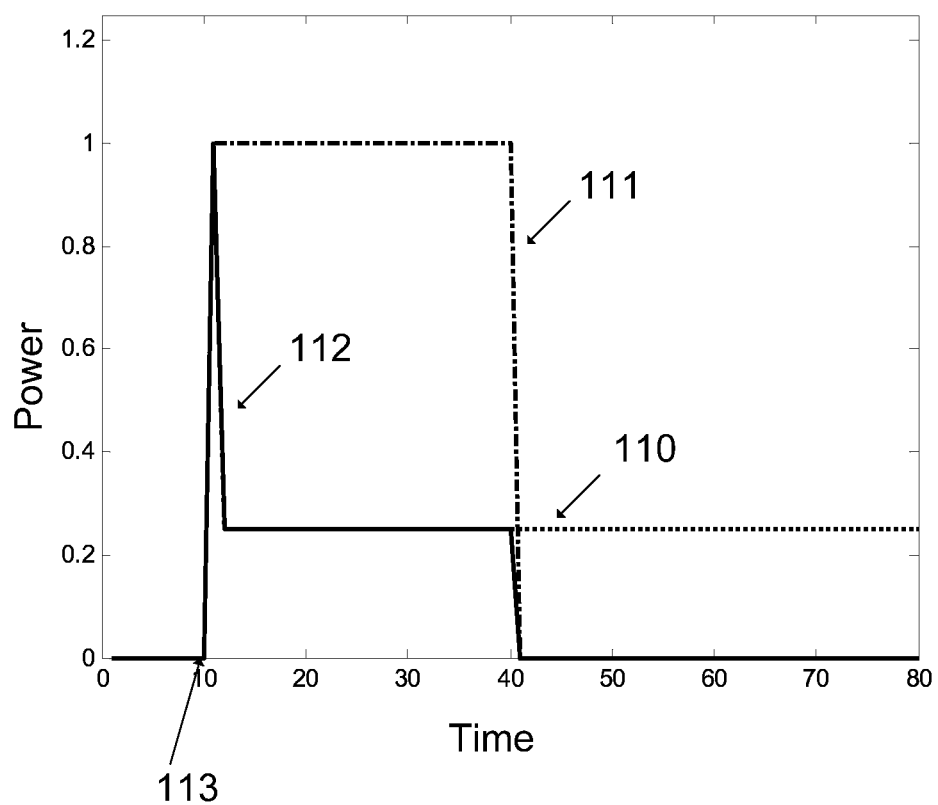
FIG. 20 shows additional functions that can be used for approximating a power delay profile, according to other embodiments of the present invention.
Figure 21:
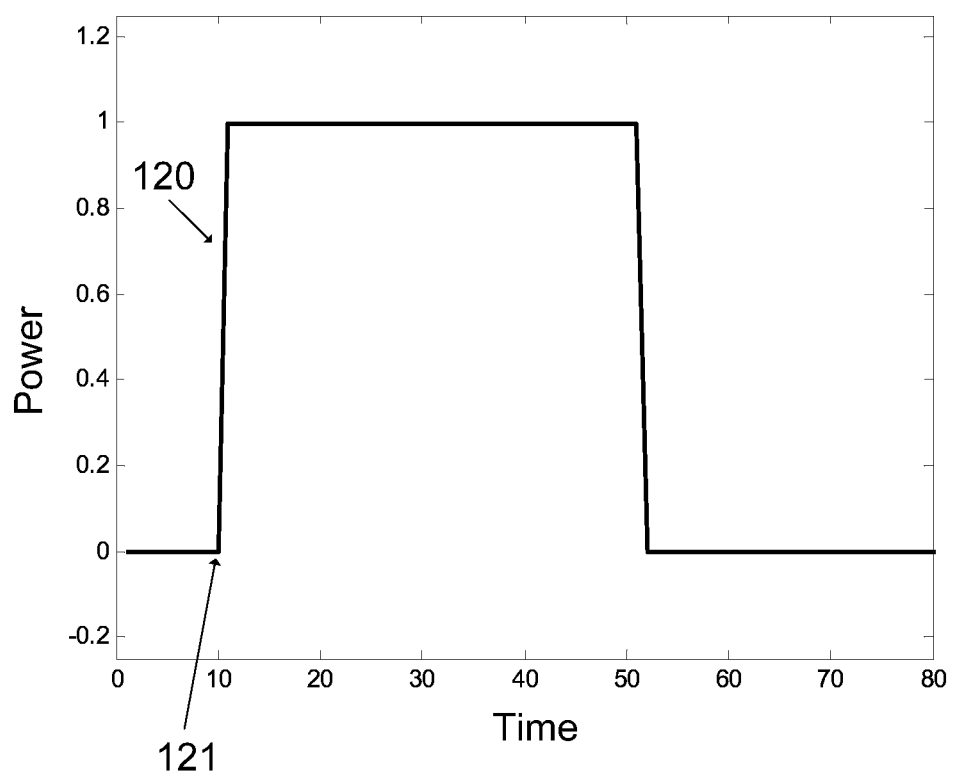
FIG. 21 shows additional functions that can be used for approximating a power delay profile, according to other embodiments of the present invention.

Representative examples of functions which can be used as approximations to the power delay profile will now be provided, with reference to FIGS. 19-21. The power delay profile is initiated at the TOA, $\tau$.

In some embodiments of the present invention the power delay profile is approximated by $$\sigma_h^2(t) \approx c(t)p(t),$$

where $c(t)=0$ for $t<\tau$, $c(t)=1$ at $t=\tau$, $c(t)=\lambda$ for $t>\tau$ and $p(t)=0$ for $t<\tau$, $p(t)=e^{-(t-\tau)/T_p}$ for $t\geq\tau$.

Thus, for a given TOA the approximated channel power delay profile is dependent on the two parameters $\lambda$, $T_p$.

The $\lambda$ parameter is the multipath density (for example, the probability of a multipath arrival within an infinitesimal interval that follows the TOA and does not include the first arrival). In some embodiments of the present invention $\lambda$ is approximated as constant for $t>\tau$. The value of $\lambda$ increases as the multipath environment has more dense reflectors and possibly reduces as the SNR increases.

The $T_P$ parameter relates to the SNR. As the SNR increases $T_P$ reduces. Hence the power delay profile of the present embodiments is determined by the SNR which is specific per object position and by a measure of the environment reflectors density which is general parameter that is typically common to most of the target positions. The SNR and measure of reflectors density can be estimated as known in the art. FIG. 19 shows an example for c(t) 100, p(t) 101, $\sigma_h^2(t)$ 102 and the TOA 103 for a typical indoor multipath environment.

In some embodiments of the present invention the power delay profile is approximated as $$\sigma_h^2(t) \approx c(t)j(t)$$

where c(t) is as defined above and $j(t)=1$ for $\tau\leq t<\tau+T_M$ and $j(t)=0$ otherwise, where $T_M$ is the average channel delay spread that includes the energetic part of the multipath. For example $T_M$ can be the multipath duration from the TOA until the multipath power decays by 8 dB. $T_M$ can be estimated per specific received signal and/or according to the SNR. FIG. 20 shows an example of c(t) 110, j(t) 111, $\sigma_h^2(t)$ 112 and the TOA 113.

In some embodiments of the present invention the power delay profile is approximated as $$\sigma_h^2(t) \approx z(t)$$

where $z(t)=1$ $\tau\leq t<\tau+T_M$ and $z(t)=0$ otherwise, where $T_M$ was described above. This approximation is particularly useful for environment crowded with reflectors resulting in a dense multipath arrival times (for example, an office or other industrial indoor environment). FIG. 21 shows an example $\sigma_h^2(t)$ 120 for highly dense arrival times with TOA marked by 121.

The characteristic signal waveform typically describes the shape of the result of convolution between the transmitted signal by the reference station and/or object and the receiver filters. In case the convolution result is repetitive then the characteristic signal waveform is optionally and preferably represented based on one repetition of the convolution. The characteristic signal waveform can be provided from external source, for example, a user input, or it can be predetermined. The present inventors found that it is not mandatory to use the exact shape of the signal waveform to construct the matrix $\underline{R}$.

Thus, in various exemplary embodiments of the invention an approximation of the signal waveform is employed. The present embodiments also contemplate use of data received from other objects in the same environment for the purpose of updating the power delay profile and/or signal waveform. In these embodiments, the method adaptively learns over time the parameters that determine the power delay profile and/or waveform, particularly, but not exclusively, the parameters that depend on the environment and that are approximately the same for all objects in the environment.

In various exemplary embodiments of the invention the method calculates the aforementioned $\lambda$ parameter based on data pertaining to the transmission between the reference stations and other objects in the same environment.

In some embodiments of the present invention two or more signal waveform candidates are employed, and a separate matrix is calculated for each signal waveform candidate. The signal processing as further detailed hereinbelow can be executed for each matrix. In some embodiments, the signal waveform candidates are scored during the processing. In these embodiments, the signal waveform score is used for selecting one signal waveform from the candidates (e.g., the signal waveform with the highest score) and the position is estimated using the selected signal waveform. The signal waveform scoring is optionally and preferably performed independently from the position estimation.

Two or more signal waveform candidates can also be employed according to some embodiments of the present invention in a joint estimation of candidate positions and candidate signal waveforms. In these embodiments, a score is optionally and preferably given to each pair of candidate signal waveform and candidate position. The estimated position of the object can then be selected based on the score of the pairs. Typically, but not necessarily, the candidate position that is associated with the higher score is selected as the estimated position of the object.

A more detailed description of an embodiment which employs a plurality of signal waveform candidates is described hereinunder.

The present embodiments also contemplate use of a plurality of candidate signal waveforms as well as a plurality of candidate power delay profiles. This can be done in more than one way.

In some embodiments of the present invention each candidate signal waveform is assigned with a signal waveform score and each candidate power delay profile can be assigned with a candidate power delay profile score. In these embodiments, the power delay profile score and signal waveform scores can be used for selecting one power delay profile and one signal waveform from the candidates (e.g., the power delay profile and signal waveform with the highest scores) and the position is optionally and preferably estimated using the selected power delay profile and signal waveform.

In some embodiments of the present invention the method a joint estimation of candidate position, candidate signal waveform and candidate power delay profile is executed. In these embodiments, a score is optionally and preferably given to each set of candidate signal waveform, candidate position and candidate power delay profile. The estimated position of the object can then be selected based on the score of the sets. Typically, but not necessarily, the candidate position that is associated with the higher score among the sets is selected as the estimated position of the object.

Figure 22:
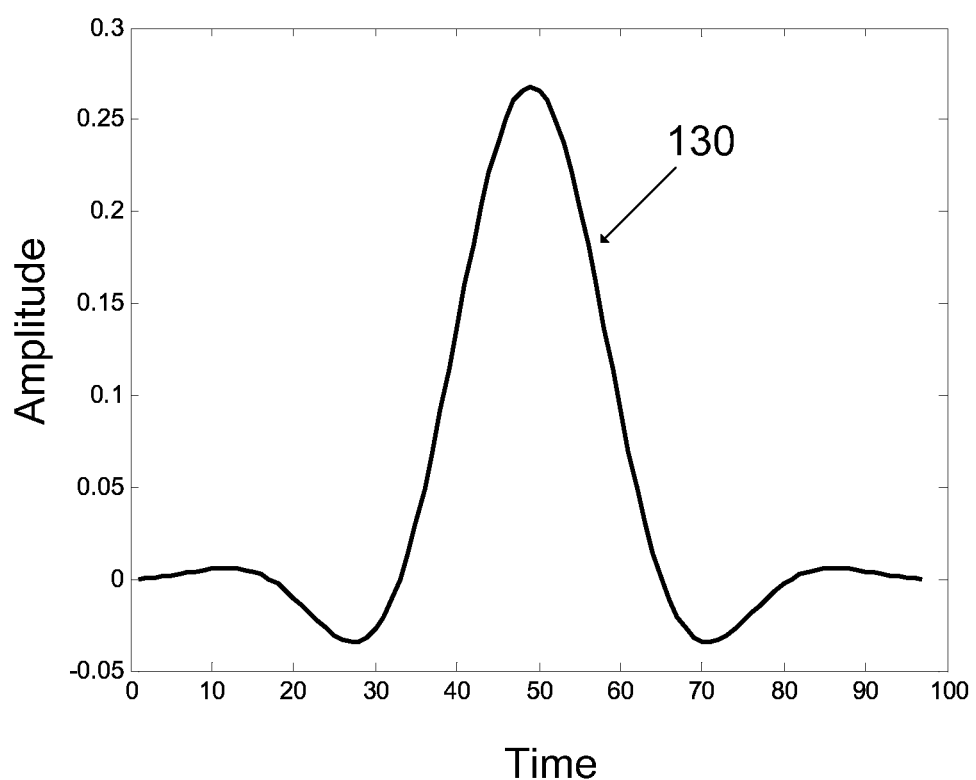
FIG. 22 shows a signal waveform composed by Sinc function multiplied by a Hamming window, which can be used according to some embodiments of the present invention.
Figure 23:
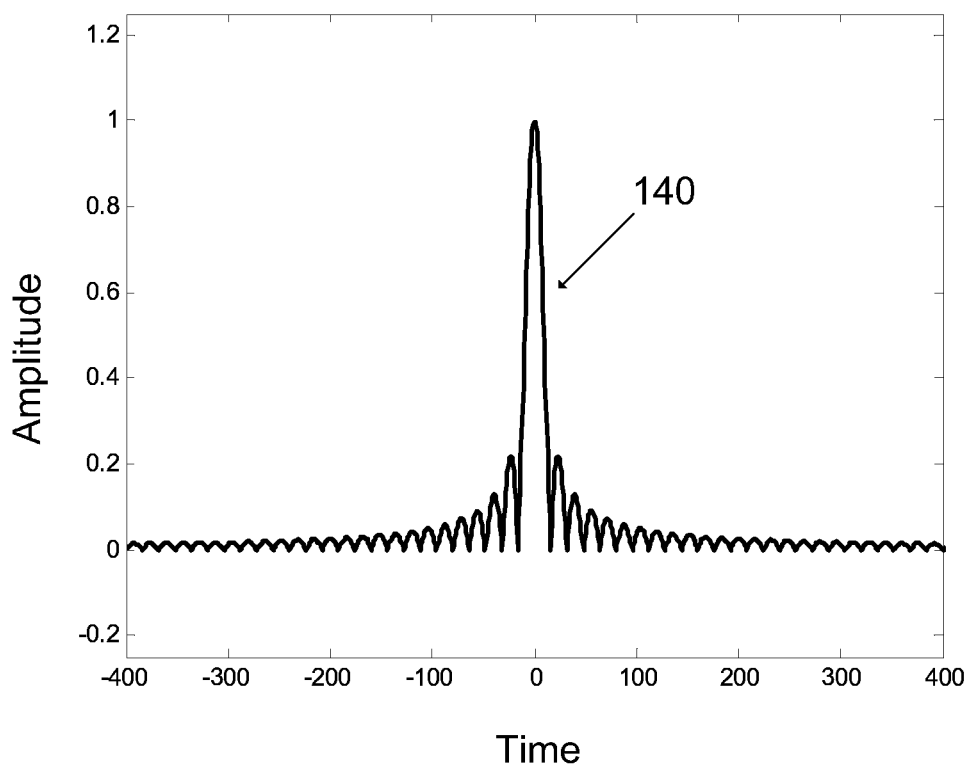
FIG. 23 shows a Dirichlet signal waveform, which can be used according to some embodiments of the present invention.

Generally, the estimation accuracy improves as the approximation is more accurate. For example, in some embodiments of the present invention the characteristic signal waveform describes a Sinc function multiplied in the time domain by a window centered around the Sinc peak. Examples of such window functions are rectangular window, Hanning window, Hamming window, Blackman window, Kaiser window or Chebchev window. FIG. 22 presents an example of a signal waveform 130 composed by Sinc function multiplied by a Hamming window and FIG. 23 presents an example of Dirichlet signal waveform 140.

The matrix $\underline{R}$ can be based on an autocorrelation matrix of the signal and is preferably a function of the position of the object. A representative and non-limiting example of an autocorrelation matrix suitable for the present embodiments is provided in the Examples section that follows (see Appendix B of Example 1).

When the signal is in the frequency domain, the autocorrelation matrix is different than when the signal is in the time domain. The relation between the autocorrelation matrices can be formulated as follows. Let $\underline{y}$ be the received vector in the time domain, and let z be its DFT vector. Thus, $\underline{z}=\underline{F}\,\underline{y}$ where $\underline{F}$ is a DFT matrix corresponding to the vector $\underline{y}$. The autocorrelation of $\underline{z}$ is given by $E\{\underline{z}\underline{z}^H\}=\underline{F}\,E\{\underline{y}\underline{y}^H\}\underline{F}^H$, where $E\{\underline{y}\underline{y}^H\}$ is the autocorrelation of the received signal in the time domain which as explained is obtained by the power delay profile and the transmitted signal waveform. The matrix F can be used, according to some embodiments of the present invention for constructing an objective function, which can be expressed as a sum of powers, for example, a polynomial function. This objective function can be used in subsequent operations for estimating the position of the object. Additional examples of calculations in the frequency domain are provided in Example 6 of the Examples section that follows.

The method proceeds to 13 at which a direct estimate of the position of the object is calculated based, at least in part, on the processed signals.

The term "direct position estimate" can be better understood by first considering the term "indirect position estimate."

As used herein, an "indirect position estimate" is a procedure in which the position of an object is estimated based on one or more previously estimated time-of-arrival or range values, wherein the position of an object is estimated only after the one or more time-of-arrival or range values is/are estimated and explicitly expressed.

As used herein, "direct position estimate" refers to any procedure suitable for estimating the position of an object from signals transmitted between the object and a plurality of reference station, with the provision that the procedure used for estimating the position is other than an indirect position estimate.

In some embodiments of the present invention the direct position estimate is a procedure in which the position is estimated from the received signal directly without applying preprocessing in a manner that position information is lost.

The estimation typically employs a maximum likelihood (ML) procedure. Broadly speaking, the ML procedure involves the calculation of $\mathrm{argmin}_p\{S(p)\}$ or $\mathrm{argmax}_p\{S(p)\}$, where S is a function of the (unknown) position p. In various exemplary embodiments of the invention S comprises contributions from each signal in a statistically independent manner. Denoting the sampled signal for the kth reference station by the vector $\underline{y}^k$, a representative and non-limiting example for the function S can be written as:

$$S = \sum_{k=0}^{K-1} \ln(|R^k(\tau^k)|) + (y^k)^H (R^k(\tau^k))^{-1} y^k$$

where the superscript H denotes the conjugate transpose operation, $\tau^k$ is given by:

$$\tau^k = \frac{1}{c}\sqrt{(p_{ref}^k - p)^T(p_{ref}^k - p)},$$

c is the propagation speed of the signal (approximately the speed of light), $\underline{p}^k_{ref}$ is the (known) position of the kth reference station, and the superscript T denotes the transpose operation.

The matrix $\underline{R}^k$ optionally and preferably is calculated using a noise variance $\sigma_v^2$. The noise variance can be obtained in more than one way. In some embodiments of the present invention $\sigma_v^2$ is calculated long before the signal arrives. In some embodiments of the present invention $\sigma_v^2$ is calculated based on a segment of the signal as further detailed hereinbelow.

In some embodiments of the present invention $\sigma_v^2$ is obtained in the following manner.

Let y be the received vector in the time domain which is given by $$y = Cz + n$$

where n is an additive noise vector with length N, z is a vector of L multipath samples, and C is a convolution matrix of the signal waveform. Specifically, each column in C is a cyclic shifted representation of the signal waveform.

Using singular value decomposition $C = U\Omega V^T$. Let w be the projection of y to the subspace that spans the multipath z:

$$w = U^T y + n = U^T U \Omega \Omega^T z + U^T n = \Omega V^T z + U^T n$$

The dimension of w is N but only the L first elements contain the signal and the remaining N-L elements contain the noise. Let $\tilde{y} = \{w_0, w_1, \ldots, w_{L-1}\}$ be the first L elements of w. Thus, $\tilde{y}$ contains all the signal energy and L noise samples. The noise variance can therefore be estimated as $$\sigma_v^2 = \frac{\|y\|^2 - \|\tilde{y}\|^2}{N - L}$$

where $\|x\|$ represents the norm or vector x. The normalization is by N-L since $\|\tilde{y}\|^2$ contains also L noise samples.

The calculation of the correlation matrix optionally and preferably includes estimating signal attenuation. This can be done by calculating an overall factor $\alpha$ for multiplying the power delay profile. Let $E_s$ be the known signal energy for $\alpha=1$, then $\alpha$ is given by $$\alpha = \frac{\|\tilde{y}\|^2 - \sigma_v \cdot L}{E_s}$$

In some embodiments of the present invention the processing operation 12 comprises partitioning each signal into at least a first segment containing noise and a second segment containing at least a multipath signal corresponding to a plurality of paths between the object and a respective reference station. Thus, for example, denoting the sampled signal for a given reference station by the vector $\underline{y}=[y_0, y_1, \ldots, y_{L-1}]$, where L is the length of the vector, the method can partition $\underline{y}$ into $[\underline{y}_0^T, \underline{y}_1^T]^T$, where $\underline{y}_0$ is a vector representing the first segment, $\underline{y}_1$ is a vector representing the second segment. The length (number of components) of $\underline{y}_0$ is denoted $N_\tau$, and the length of $\underline{y}_1$ is therefore $L-N_\tau$. The signal can be partitioned, for example, by employing a coarse energy search procedure. Typically, the energy corresponding to the second segment is higher than the energy corresponding to the first segment.

In some embodiments of the present invention the second segment $\underline{y}_1$ is further divided into a transient sub-segment $\underline{y}_{1,0}$, and a generally steady state sub-segment $\underline{y}_{1,1}$. The length of $\underline{y}_{1,0}$ can equal the number d of samples within the time interval $T_D$ which is the time that includes the energetic part of the signal waveform, for example about 98% of the signal waveform is included in duration $T_D$. The length of $\underline{y}_{1,1}$ can be $L-N_\tau-d$.

The method proceeds by defining a characteristic multidimensional width for each of the segments. Typically, the widths are defined by modeling each segment using a localized function. Representative examples of localized functions suitable for the present embodiments, including, without limitation, a Gaussian function, a Lorentzian function, a hyperbolic secant function, a logistic distribution, a Fourier transform and a wavelet transform. In various exemplary embodiments of the invention a Gaussian function is employed both for $\underline{y}_0$ and for $\underline{y}_1$.

It was found by the present inventors that the characteristic multidimensional width of the first segment $\underline{y}_0$ can be based on the noise variance $\sigma_v^2$ which can be calculated, for example, by averaging the energy over the entire length of $\underline{y}_0$ or portion thereof. Alternatively, $\sigma_v^2$ can be predetermined. For different reference stations, different noise width $\sigma_v^2$ can be defined. Alternatively, the same noise width can be employed for two or more (e.g., all) reference stations.

The characteristic multidimensional width of $\underline{y}_1$ can be defined using an autocorrelation matrix $\underline{R}_1$ of $\underline{y}_1$ as a function of the (unknown) position $\underline{p}$ of the object. In various exemplary embodiments of the invention different autocorrelation matrices are defined for different reference stations. Yet, use of the same autocorrelation matrix for two or more, e.g., all the reference stations, not excluded from the scope of the present invention. The multidimensional width of $\underline{y}_1$ can be defined as the determinant of the autocorrelation matrix $\underline{R}_1$.

In embodiments in which the segmentation operation is employed, the calculation of direct estimate of the position is also based on the segments $\underline{y}_0$ and $\underline{y}_1$. For example, in these embodiments the function S can be written as:

$$S = \sum_{k=0}^{K-1} N_\tau^k \ln(\sigma_v^2) + \frac{1}{\sigma_v^2}\|y_0^k\|^2 + \ln(|R_1^k(\tau^k)|) + (y_1^k)^H (R_1^k(\tau^k))^{-1} y_1^k.$$

where $R_1^k(\tau^k)=E\{y_1^k(y_1^k)^H|\tau^k\}$ is the autocorrelation matrix of $y_1^k$ and is a function of the power delay profile, the signal waveform and possibly the noise variance, $\sigma_v^2$, and possibly the signal attenuation factor $\alpha$.

When the sub-segments $\underline{y}_{1,0}$ and $\underline{y}_{1,1}$ are defined, the expression for S can be further simplified as $$S = \sum_{k=0}^{K-1} \gamma + \frac{1}{\sigma_v^2}\|y_{1,0}^k\|^2 + (y_{1,0}^k)^H (R_{1,0}^k(\tau^k))^{-1} y_{1,0}^k + \|\tilde{y}_{1,1}^k\|^2$$

where $R_{1,0}^k(\tau^k)=E\{y_{1,0}^k(y_{1,0}^k)^H|\tau^k\}$, $\tilde{y}_{1,1}^k$ is the result of a linear convolution between $y_{1,1}^k$ and $1/\sqrt{\lambda_i}$ where $\lambda_i$ are the eigenvalues of $R_{1,1}^k(\tau^k)=E\{y_{1,1}^k(y_{1,1}^k)^H|\tau^k=0\}$ and $$\gamma^k = N_\tau^k\left(\ln(\sigma_v^2) - \frac{1}{L_k}\sum_{i=0}^{L-1}\ln(\lambda_i)\right)$$

where $L_k$ is the length of the received vectors $y^k$.

According to some embodiments of the present invention at least one of the signals is a diversity signal having diversity measurements, and the method further comprises processing the diversity measurements. In these embodiments, the estimate is based on the processed diversity measurements.

As used herein, a "diversity measurement" refers to an output of a single channel, and "diversity measurements" refer a plurality of outputs of a respective plurality of channels, wherein no two channels are identical thereamongst. Two or more of the channels may or may not be correlated.

It is recognized that each channel provides output in the form of a signal. Thus, although the term "diversity signal" is in the singular form, it is used for representing a set of signal components, wherein each signal component corresponds to a single channel output.

According to some embodiments of the present invention the diversity comprises at least one of: time diversity, frequency diversity, interference diversity, antenna polarization diversity and space diversity.

For example, in some embodiments, the signals are transmitted by a Multiple-Input Multiple-Output (MIMO) system or a Single Input Multiple Output (SIMO) system or a Multiple Input Single Output (MISO) system which generate space diversity using multiple antenna elements. A MIMO, MISO or SIMO system employs multiple transmitters and multiple receivers that yield multiple channels. The correlation between the channel realizations depends on the space distance between the antennas at each side (transmitter and receiver). As the antennas are more separated in space the correlation is weaker. When the antennas are separated by more than half the carrier frequency wavelength the channels can be assumed statistically independent.

In some embodiments of the present invention the diversity is formed by frequency hopping. Frequency hopping is a known technique utilized to achieve frequency diversity and/or interference diversity. The multipath varies with changes in the carrier frequency. Thus, transmitting in several carrier frequencies (frequency hopping) yields multiple multipath realizations. The larger the difference between the carrier frequencies the weaker is the correlation between the received realizations.

The diversity measurements can comprise data received from a plurality of statistically independent channels of a respective reference station. A representative example of use of such diversity measurements is described in Example 1 of the Examples section that follows. The diversity measurements can alternatively comprise data received from a plurality of correlated channels of a respective reference station. A representative example of use of such diversity measurements is described in Example 3 of the Examples section that follows.

In some embodiments of the present invention the position estimation is performed using a set of power delay profile candidates. For example, each individual power delay profile candidate can correspond to a different multipath environment (e.g. indoor, outdoor etc). This is particularly useful when the specific power delay profile environment in which the object and reference stations placed is unknown. In these embodiments scenario a joint direct position estimation and power delay profile can be employed.

For example, let $\Sigma = \{\sigma_0^2(t), \sigma_1^2(t), \ldots, \sigma_{J-1}^2(t)\}$ be a set of J power delay profile candidates. The estimation typically employs a maximum likelihood (ML) procedure. Broadly speaking, the ML procedure involves the calculation of $\arg\min_{p,\sigma_i^2(t)} S(p,\sigma_i^2(t))$ where S is a function of the (unknown) position p and the power delay profile $\sigma_i^2(t)$. Denoting the sampled signal for the kth reference station by the vector $\underline{y}^k$, a representative and non-limiting example for the position estimation, $\hat{p}$, in this case is:

$$\hat{p} = \operatorname{argmin}_p \sum_{k=0}^{K-1} \min_{\sigma_i^2(t) \in \Sigma} \ln(|R^k(\tau^k, \sigma_i^2)|) + (y^k)^H (R^k(\tau^k, \sigma_i^2))^{-1} y^k$$

where in the inner minimization $\sigma_i^2(t)$ can be chosen from the set $\Sigma$, the superscript H denotes the conjugate transpose operation, $\tau^k$ is given by:

$$\tau^k = \frac{1}{c}\sqrt{(p_{ref}^k - p)^T (p_{ref}^k - p)},$$

c is the speed of the signal propagation (approximately the speed of light), $p_{ref}^k$ is the (known) position of the kth reference station and the superscript T denotes the transpose operation.

In some embodiments of the present invention there exists at least one received signal for which the power delay profile used to process the signal is chosen from a set of power delay profile candidates and then the processed signal is used for the position estimation. Denote by $\hat{\sigma}_k^2(t)$ the chosen power delay candidate for the kth received vector denoted by $y^k$. A representative example of choosing $\hat{\sigma}_k^2(t)$ is given by $$\hat{\sigma}_k^2(t) = \operatorname{argmax}_{\sigma_i^2(t) \in \Sigma} \int_\tau \exp\bigl(-\ln(|R^k(\tau^k, \sigma_i^2)|) - (y^k)^H (R^k(\tau^k, \sigma_i^2))^{-1} y^k\bigr) d\tau.$$

Then the position estimation can be estimated as:

$$\hat{p} = \operatorname{argmin}_p \sum_{k=0}^{K-1} \ln(|R^k(\tau^k, \hat{\sigma}_k^2)|) + (y^k)^H (R^k(\tau^k, \hat{\sigma}_k^2))^{-1} y^k$$

In some embodiments of the present invention the position estimation is performed using a set of signal waveform candidates. In these embodiments the signal waveform can also be incorporated into the direct position estimation.

For example, let $\chi = \{x_0(t), x_1(t), \ldots, x_{I-1}(t)\}$ be a set of I signal wave form candidates $x_i(t)_i$. A representative and non-limiting example for position estimation in this embodiment is given by:

$$\hat{p} = \operatorname{argmin}_p \sum_{k=0}^{K-1} \min_{x_i \in \chi, \sigma_i^2(t) \in \Sigma} \ln(|R^k(\tau^k, \sigma_i^2, x_i)|) + (y^k)^H (R^k(\tau^k, \sigma_i^2, x_i))^{-1} y^k$$

where the inner minimization is on the set of signal waveform candidates and power delay profile candidates.

It is to be understood that it is not intended to limit the scope of the present invention to the calculation of position estimation using the chosen power delay candidate, since the power delay can be provided as output, without calculating position estimation, or it can be used for calculating other physical quantities such as, but not limited to, TOA. In some embodiments of the present invention both the position estimation and the TOA are calculated using the chosen power delay.

The present inventors contemplate a scenario in which two or more of the reference stations (e.g., all) are synchronized, and the object is synchronized with the synchronized reference stations. In some of these embodiments the signal transmitted between the object and each of the synchronized reference stations is a one-way signal. A representative example of position estimation in this scenario is provided in Example 2 of the Examples section that follows. In other embodiments the signal transmitted between the object and each of the synchronized reference stations is a two-way signal.

As use herein, "one-way signal" refers to a signal transmitted by a first entity and received by a second entity, wherein the second entity does not transmit a response signal back to the first entity.

As use herein, "two-way signal" refers to a pair of signals, one transmitted by a first entity and received by a second entity, and another transmitted by the second entity (typically, but not necessarily, in response to the first signal) and received by the first entity.

In the above description each of the first and second entities can be the object or a reference station. When the first entity is the object the second entity is a reference station, and when the first entity is a reference station the second entity is the object.

The present inventors also contemplate a scenario in which two or mote the reference stations (e.g., all) are synchronized, and the object is unsynchronized with any reference station. In these embodiments the signal transmitted between the object and each of the synchronized reference stations is a one-way signal, and the number of the reference stations is at least d+1, where d is the dimensionality of the estimated position. Specifically, when it is desired to have a two-dimensional position estimate, the number of the reference stations is at least 3, and when it is desired to have a three-dimensional position estimate, the number of the reference stations is at least 4.

The present inventors also contemplate a scenario in which two or more of the reference stations are unsynchronized both thereamongst and with the object. In these embodiments, the signal transmitted between the object and each of the unsynchronized reference stations is a two-way signal.

Representative examples of position estimators in various synchronization scenarios are provided in Examples 4 and 5 of the Examples section that follows.

Figure 18:
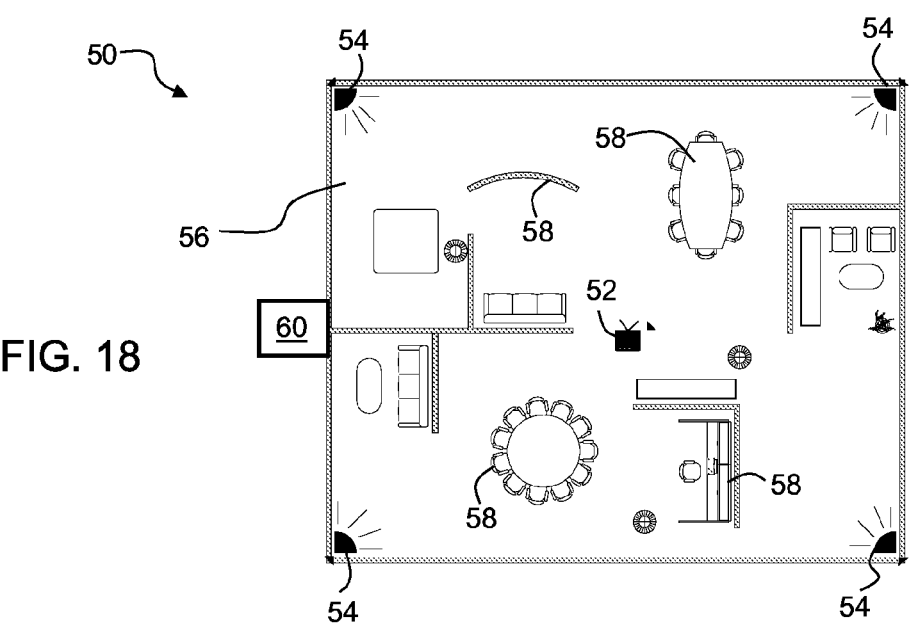
FIG. 18 schematic illustration of a system for estimating a position of an object, according to some exemplary embodiments of the present invention.

Reference is now made to FIG. 18 which is a schematic illustration of a system 50 for estimating a position of an object 52, according to some exemplary embodiments of the present invention. System 50 comprises a plurality of reference stations 54 of known positions. Reference stations 54 can be positioned indoors or outdoors. In the representative illustration of FIG. 18, an indoor environment 56 with a plurality of obstacles 58 distributed therein, so that the signals (not shown) transmitted between object 52 and stations 54 are generally multipath signals.

System 50 also comprises a data processor 60 configured for executing the method described herein. Data processor 60 can be a general purpose computer or dedicated circuitry. Data processor 60 communicates with stations 54 and/or object 52 and receives data pertaining to the multipath signals. Data processor 60 can be located near or in one of the reference stations 54 or within object 52 or anywhere in environment 56 or at a remote location, as desired.

The signals can be transmitted from reference stations 54 and received by object 52 or from object 52 and received by reference stations 54. In some embodiments of the present invention one-way signals are employed, wherein object 52 transmits signals and at least one reference station 54 receives signals, or alternatively at least one reference station 54 transmits signals and the object 52 receives signals. In some embodiments of the present invention two-way signals are employed, wherein object 52 both receives and transmits signals, and at least one of reference stations 54 both receives and transmits signals.

According to an aspect of some embodiments of the present invention there is provided a method of estimating a TOA of a signal transmitted between an object and a reference station.

The method comprises receiving a multipath signal having a plurality of components respectively corresponding to a plurality of paths between the object and the reference station. The method further comprises processing the signal using a matrix featuring a characteristic power delay profile and a characteristic signal waveform and optionally a noise variance to provide a processed signal, as further detailed hereinabove.

In some embodiments of the present invention two or more power delay profile candidates are employed, as further detailed hereinabove. In some embodiments of the present invention the power delay profiles are scored during the processing. In these embodiments, the power delay profile score is used for selecting one power delay profile from the candidates (e.g., the power delay profile with the highest score) and the TOA is estimated using the selected power delay profile.

Also contemplated are embodiments in which a model describing the relation between the power delay profile and the distance from the object to a respective reference station is obtained, as further detailed hereinabove. A representative and non limiting example for these embodiments is provided in the Examples section that follows (see Example 8).

Two or more power delay profile candidates can also be employed according to some embodiments of the present invention in a joint estimation of candidate TOA/distance and candidate power delay profiles, as further detailed hereinabove.

In some embodiments of the present invention two or more signal waveform candidates are employed, and a separate matrix is calculated for each signal waveform candidate, as further detailed hereinabove. Thus, signal processing can be executed for each matrix. In some embodiments, the signal waveform candidates are scored during the processing. In these embodiments, the signal waveform score is used for selecting one signal waveform from the candidates (e.g., the signal waveform with the highest score) and the TOA is estimated using the selected signal waveform. The signal waveform scoring is optionally and preferably performed independently from the TOA estimation.

Two or more signal waveform candidates can also be employed according to some embodiments of the present invention in a joint estimation of candidate TOA/distance and candidate signal waveforms, as further detailed hereinabove.

The present embodiments also contemplate use of a plurality of candidate signal waveforms as well as a plurality of candidate power delay profiles, as further detailed hereinabove. For example, a joint estimation of candidate TOA, candidate signal waveform and candidate power delay profile can be executed. In these embodiments, a score is optionally and preferably given to each set of candidate signal waveform, candidate TOA and candidate power delay profile. The estimated TOA of the object can then be selected based on the score of the sets. Typically, but not necessarily, the candidate TOA that is associated with the higher score among the sets is selected as the estimated TOA.

The method, according to some embodiments of the present invention, can comprise receiving more than one received signal. In these embodiments, the TOA estimation is performed by utilizing the plurality of received signals. Optionally and preferably one or more of the received signals is a diversity signal as further detailed hereinabove.

The method further comprises calculating an estimate of the TOA of the signal based, at least in part, on the processed signal.

For example, the estimation of a TOA, $\tau$, can employ an ML procedure wherein $\mathrm{argmin}_\tau \{S_t(\tau)\}$, where $S_t$ is a function of the (unknown) TOA. A representative example for the function $S_t$ can be written as:

$$S_t(\tau) = \sum_{k=0}^{K-1} \ln(|R^k(\tau)|) + (y^k)^H (R^k(\tau))^{-1} y^k.$$

where $y^0, y^1, \ldots, y^{K-1}$ are received vectors at either the object or the reference station and $R^k(\tau)$ is the matrix featuring a characteristic power delay profile, a characteristic signal waveform and optionally a noise variance. In various exemplary embodiments of the invention the vectors $y^0, y^1, \ldots, y^{K-1}$ are statistically independent.

In some embodiments of the present invention the method comprises partitioning the signal into at least a first segment containing noise and a second segment containing at least a multipath signal corresponding to a plurality of paths between the object and a the reference station, as further detailed hereinabove. In some embodiments of the present invention the method further comprises defining a characteristic multidimensional width for each segment, as further detailed hereinabove. In these embodiments the estimation of a TOA, $\tau$, is based on the segments. A representative example for the function $S_t$ in these embodiments can be written as:

$$S_t(\tau) = \sum_{k=0}^{K-1} N_\tau \ln(\sigma_v^2) + \frac{1}{\sigma_v^2}\|y_0^k\|^2 + \ln(|R_1(\tau)|) + (y_1^k)^H (R_1(\tau))^{-1} y_1^k.$$

This expression for $S_t(\tau)$ is preferred from the standpoint of accuracy. When a reduced complexity is desired, $S_t(\tau)$ is optionally and preferably expressed in terms of the sub-segments $\underline{y}_{1,0}$ and $\underline{y}_{1,1}$. This can be done, for example, by partitioning the matrix $\underline{R}_1$ to form a block matrix having a first on-diagonal block $\underline{R}_{1,0}$ that corresponds to $\underline{y}_{1,0}$ and a second on-diagonal block $\underline{R}_{1,1}$ that corresponds to $\underline{y}_{1,1}$. The sub-segments $\underline{y}_{1,0}$ and $\underline{y}_{1,1}$ and the corresponding on-diagonal blocks $\underline{R}_{1,0}$ and $\underline{R}_{1,1}$ can then be used to define an expression for $S_t(\tau)$. For example, $$S_t(\tau) = \sum_{k=0}^{K-1} \gamma + \frac{1}{\sigma_v^2}\|y_0^k\|^2 + (y_{1,0}^k)^H R_{1,0}^{-1}(\tau - N_\tau) y_{1,0}^k + \|\tilde{y}_{1,1}^k\|^2$$

where, $\|\tilde{y}_{1,1}\|^2$ is given by the approximation $y_{1,1}{}^H R_{1,1}^{-1}(N_\tau) y_{1,1} \approx \|\tilde{y}_{1,1}\|^2$, $\gamma$ is defined as $$\gamma = N_\tau \left( \ln(\sigma_v^2) - \frac{1}{L}\sum_{i=0}^{L-1} \ln(\tilde{\lambda}_i) \right),$$

and $\tilde{\lambda}_i$ are the eigenvalues of $R_{1,1}(N_\tau=0)$.

In some embodiments of the present invention the TOA estimation is performed using a set of power delay profile candidates. For example each individual power delay profile corresponds to a different multipath environment (e.g. indoor, outdoor etc). This is particularly useful when the specific power delay profile environment in which the object and reference station are placed is unknown. In these embodiments a joint TOA and power delay profile estimation can be employed.

For example, let $\Sigma=\{\sigma_0^2(t), \sigma_1^2(t), \ldots, \sigma_{J-1}^2(t)\}$ be a set of J power delay profile candidates. The estimation typically employs a maximum likelihood (ML) procedure. Broadly speaking, the ML procedure involves the calculation of arg $\min_{\tau,\sigma_i^2(t)} S_t(\tau,\sigma_i^2(t))$ where S is a function of the (unknown) position p and the power delay profile $\sigma_i^2(t)$. Denoting the sampled signal for the kth reference station by the vector $\underline{y}^k$, a representative and non-limiting example for the TOA estimation, $\hat{\tau}$, in this case is given by $$\hat{\tau} = \mathrm{argmin}_\tau \sum_{k=0}^{K-1} \min_{\sigma_i^2(t) \in \Sigma} \ln(|R(\tau, \sigma_i^2)|) + (y^k)^H (R(\tau, \sigma_i^2))^{-1} y^k$$

where in the inner minimization $\sigma_i^2(t)$ is chosen from the set $\Sigma$.

In some embodiments of the present invention the TOA estimation is performed using a set of signal waveform candidates. In these embodiments, the signal waveform can also be incorporated into the TOA estimation.

For example, let $\chi=\{x_0(t), x_1(t), \ldots, x_{I-1}(t)\}$ be a set of I signal wave form candidates $x_i(t)$. A representative and non-limiting example for TOA estimation for this scenario is given by:

$$\hat{\tau} = \mathrm{argmin}_\tau \sum_{k=0}^{K-1} \min_{x_i \in \chi} \ln(|R(\tau, x_i)|) + (y^k)^H (R(\tau, x_i))^{-1} y^k$$

In some embodiments of the present invention a joint estimation of candidate TOA, candidate signal waveform and candidate power delay profile is executed. In these embodiments, a score is optionally and preferably given to each set of candidate signal waveform, candidate TOA and candidate power delay profile. The estimated TOA can then be selected based on the score of the sets. Typically, but not necessarily, the candidate TOA that is associated with the higher score among the sets is selected as the estimated TOA.

For example, let $\Sigma=\{\sigma_0^2(t), \sigma_1^2(t), \ldots, \sigma_{J-1}^2(t)\}$ be a set of J power delay profile candidates and let $\chi=\{x_0(t), x_1(t), \ldots, x_{I-1}(t)\}$ be a set of I signal wave form candidates $x_i(t)$. A representative and non-limiting example for TOA estimation for this scenario is given by:

$$\hat{\tau} = \mathrm{argmin}_\tau \sum_{k=0}^{K-1} \min_{x_i \in \chi, \sigma_i^2(t) \in \Sigma} \ln(|R(\tau, \sigma_i^2, x_i)|) + (y^k)^H (R(\tau, \sigma_i^2, x_i))^{-1} y^k$$

where the inner minimization is on the set of signal waveform candidates and power delay profile candidates.

When the calculation is employed in the frequency domain, the cost function to be minimized is optionally and preferably expressed as a sum of powers, for example, a polynomial function, and the minimization is executed by means of a transform to the frequency domain, e.g., via FFT or the like. A representative example of such minimization procedure is provided in Example 6 of the Examples section that follows.

Once the TOA or propagation delay is estimated, an indirect position estimation can be executed for estimating the position of the object. This can be done using any technique known in the art. Typically, an optimization procedure is employed. For example, the TOA estimates can be used to calculate a set of distances and a minimization procedure can be executed to minimize the error associated with the correspondence of these distances to the distances obtained from the estimated position. A representative and non-limiting example of a minimization procedure includes minimizing the sum or weighted sum of squared errors between the set of distances and the distances corresponding to the estimated position.

According to an aspect of some embodiments of the present invention there is provided a method of estimating a propagation delay of a signal transmitted between an object and a reference station.

The method comprises receiving a multipath signal having a plurality of components respectively corresponding to a plurality of paths between the object and the reference station. The method further comprises processing the signal using a matrix $\underline{R}$ featuring a characteristic power delay profile, a characteristic signal waveform and optionally a noise variance to provide a processed signal, as further detailed hereinabove.

The method can comprise receiving more than one received signal. In these embodiments, the propagation delay estimation is performed by utilizing the plurality of received signals. Optionally and preferably one or more of the received signals is a diversity signal as further detailed hereinabove.

The method further comprises calculating an estimate of the propagation delay of the signal based, at least in part, on the processed signal. A representative example of a procedure suitable for estimating the propagation delay between the object and a reference station based on two way signals is provided in Example 7 of the examples section that follows.

The present embodiments contemplate use of a model which describes the relation between the power delay profile and the distance from the object to a respective reference station. In these embodiments, the matrix $\underline{R}$ is expressed in terms of this model. A representative example of this embodiment is provided in Example 8 of the examples section that follows.

Once the propagation delay is estimated, an indirect position estimation can be executed for estimating the position of the object. This can be done using any technique known in the art. Typically, an optimization procedure is employed. For example, the propagation delays can be used to calculate a set of distances and a minimization procedure can be executed to minimize the error associated with the correspondence of these distances to the distances obtained from the estimate position. A representative and non-limiting example of a minimization procedure includes minimizing the sum or weighted sum of squared errors between the set of distances and the distances corresponding to the estimated position.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion. The Examples below contain enumerated mathematical expressions. For clarity of presentation, the enumeration is self-contained within each example. Unless otherwise stated, when a reference is made within a particular example to an equation by its reference numeral, such reference should be understood as a reference to the equation having that reference numeral within that particular example.

Example 1

TOA Estimate

The present Example describes a TOA estimate procedure according to some embodiments of the present invention. The approach taken in this example is to approximate the received multipath signal as a Gaussian process and derive the maximum likelihood estimator. In order to further decrease the computational load of the new algorithm, a low complexity approximation with negligible performance degradation was developed. The algorithm is useful for either single channel realization or multiple channel realizations using diversity either in time, frequency or space. When applying diversity technique a substantial performance gain is attained due to the optimal combining of the channel realizations and thus reliable TOA estimation is attainable even at low SNR. The estimator's performance can be closely predicted by a closed form analytical error expression.

Introduction

The range between a transmitter and a receiver can be determined by measuring the signal propagation time from one to the other. Towards this end, the TOA of the received signal can be used. The time resolution is inversely proportional to the signal bandwidth, hence it is typically desired to use the widest bandwidth available. The large bandwidth frequently imposes a large multipath delay spread relative to the transmitted signal duration. The best example is the Ultra-Wideband (UWB) technology which enables precise ranging due to its remarkable bandwidth.

For ranging estimation only the TOA of the first multipath component needs to be detected, which represent the line-of-sight path. In a typical multipath environment the first arrival path is often attenuated significantly due to destructive superposition with multipath reflections. In the presence of additive thermal noise, robust and accurate TOA estimation is a considerable challenge especially when the signal to noise ratio (SNR) is low. Unfavorable SNR is encountered when the range is relatively large, the transmitter is shadowed or the averaging time is limited due to the need for quick response or a rapidly changing environment. An SNR performance gain can be obtained by averaging multiple observations of the received signal all with the same multipath realization but with different noise realizations. However, in case of destructive multipath and/or low SNR the required averaging time for attaining precise TOA estimation can be very large. By applying diversity techniques the receiver can obtain several independent realizations of the multipath channel, all with the same TOA, and thus by proper processing a substantial performance improvement can be obtained which, for a given number of observations, is significantly larger than obtained by coherently combining the same channel realization (averaging). Diversity can be used if the distance between the transmitter and receiver does not change during all measurements. Examples of diversity techniques are frequency diversity, antenna polarization diversity and space diversity. When space diversity is used, the antennas are optionally separated by half a wavelength for low correlation, and it is assumed that this distance is small such that the difference between the signal time of arrivals at the antennas is negligible. Time diversity can also be used if the measurements are separated (in time) more than the coherence time of the channel.

In general, the optimal combining of the independent realizations for each specific TOA estimation algorithm is not straightforward. The simplest solution is to average the TOA estimates of each individual realization with equal weights. A more sophisticated solution is to use weighted averaging where the weights reflect the quality of each individual TOA estimate. However, it is not clear how to define a good quality criterion for each individual estimate. In many cases the estimation error is not Gaussian and has occasional outliers which must be detected and rejected. This leads, in many cases, to heuristic solutions that do not fully exploit the significant potential gain that can be obtained from diversity.

The statistics of a multipath channel have been investigated and discussed in many articles [1]-[4]. In common base-band multipath channel models for wideband transmission the multipath components are statistically independent, each component is represented by a complex gain and a random delay. The arrival delays are modeled as a Poisson process and the gains have exponential decaying variance. In the classical model [1] the distribution of each complex gain is Gaussian. Other models [3] describe the gain distribution as Nakagami when the signal bandwidth is very large.

Simple approaches for TOA estimation are based on passing the received signal through a matched filter (MF) whose output peak epoch is the TOA estimate [5]-[8]. An alternative solution is to search for a finite number of MF output peak epochs and to estimate the TOA as the earliest peak epoch [9]. Other simple solutions are based on comparing the received signal energy to a threshold and then performing a forward or backwards search with a heuristic TOA estimation criterion [10]-[16]. Also of interest is an algorithm for symbol timing synchronization [17].

Other approaches include the "frequency-domain super-resolution TOA estimation" which includes Multiple Signal Classification (MUSIC) [18], Estimation of Signal Parameters via Rotational Invariance Techniques (ESPRIT) [19] and other algorithms [20],[21]. In case the multipath is sparse then the computational load of these methods can be reduced by sampling at rate lower than Nyquist (the rate of innovation) [22],[23]. Win and Scholtz [24] introduced the generalized maximum likelihood (GML) solution. The method relies on the assumption that the number of multipath components is finite and known and all the multipath coefficients and their arrival times are jointly estimated.

An iterative approximation to the GML was introduced by [25]. The multipath coefficients are estimated one by one and removed from the received signal sequentially until the strongest remaining coefficient is below a preset threshold. The TOA is determined according to the earliest arrival path. In [26] the TOA is estimated as the instant separating the leading segment of samples which is associated with noise only, and the following segment of samples that is associated with the signal multiple arrivals. The separating instant is defined as the point where the energy changes.

The exact maximum likelihood (EML) TOA estimator is developed in Appendix A. The estimator chooses the first arrival time which maximizes the conditional probability density function of the measured channel realizations (one or more) given the first arrival time only. In practice, the a priori statistical parameters of the channel such as the Poisson average arrival rate and the signal exponential decaying variance are not known.

The present example describes a practical TOA estimation algorithm that for one or more independent channel realizations attains the EML performance in the limit when the multipath rays are infinitely dense and independent. The Inventors found that the multipath density for which the estimator essentially closes the performance gap with the EML matches the density of a typical indoor environment. The estimator of the present embodiments is superior to other known practical TOA estimators. In various exemplary embodiments of the invention the estimator does not need to know the channel characteristics accurately, thus, it is robust to various multipaths and very attractive.

System Model

The baseband system model considered in this example is depicted in FIG. 1. A wideband single pulse signal s(t), with bandwidth $W_s$, is transmitted through the multipath channel h(t) and observed with additive white Gaussian complex noise w(t) which has zero mean and variance $\sigma_w^2$. It is assumed that s(t) is known to the receiver. Let H($f$) be the Fourier transform of h(t). The channel is assumed to be a time invariant multipath channel with impulse response given by $$h(t) = \sum_{m=0}^{M-1} \alpha_m \delta(t - \tau_m) \quad \text{(EQ. 1)}$$

where M is the number of multipath components, $\delta(t)$ is the Dirac delta, $\alpha_m$ and $\tau_m$ are the complex coefficient and the delay of the m-th arrival multipath component, respectively. Both $\alpha_m$ and $\tau_m$ are statistically independent. Throughout this Example the notation of the first arrival time, $\tau_0$, will often be replaced by $\tau$ for simplifying the exhibition. The received signal can be written as $$r(t) = \sum_{m=0}^{M-1} \alpha_m s(t - \tau_m) + w(t). \quad \text{(EQ. 2)}$$

Typically, in wide band transmission, the time duration of s(t) is shorter than the channel delay spread. At the receiver, the signal r(t) is passed through a pre-sampling low pass filter (LPF) whose frequency response and impulse response are B($f$) and b(t), respectively. The filters output y(t) is sampled at rate $f_s=1/T_s=2W_b$ where $W_b$ is the bandwidth of B($f$) which satisfies $W_b \geq W_s$. The resulting sampled sequence is denoted by $y_n$ and can be written as $$y_n = q_n + v_n \quad \text{(EQ. 3)}$$

In (3) $v_n$ are the noise samples obtained by filtering w(t) with b(t) and $q_n$ is the sampled received multipath signal. Let x(t) be the result of the convolution between s(t) and b(t)

then $q_n$ is obtained by filtering h(t) with x(t) and sampling the result at a rate of 1/T, thus $$q_n = \int_0^{nT_s} h(\lambda)x(nT_s - \lambda)d\lambda = \sum_{m=0}^{M-1} \alpha_m x(nT_s - \tau_m) \quad (EQ. 4)$$

Denote by $T_D$ the time duration of x(t). The noise samples $v_n$ are assumed to be independent complex circular Gaussian random variables with zero mean and variance $\sigma_v^2$.

The following notation will be used. $f_x(x)$ is used to represent the probability density function of x. The subscript x is usually omitted to simplify the exhibition. The superscripts *, T and H represent conjugate, transpose and conjugate transpose, respectively.

Derivation of Estimation Algorithms

Most models assume that the multipath components are clustered in time. In the present example, clusters are considered to be separated when the inter cluster gaps are longer than the transmitted signal duration. The preliminary step of the estimation algorithm is a coarse search for the samples containing the first arrival multipath cluster. This can be done by energy detection using a short sliding window over the samples $y_n$. The beginning of the observation widow is set to be several times the sliding window length prior to the first time that the energy exceeds a rough threshold to insure that the first arrival time is included in the window. The observation window ends when the sliding window energy falls below a threshold level. It was found by the present inventors that the performance of the TOA detector described in this example is not affected significantly if the window includes a portion of noise samples following the first cluster as long as this portion is small relative to the cluster duration.

Figure 2:
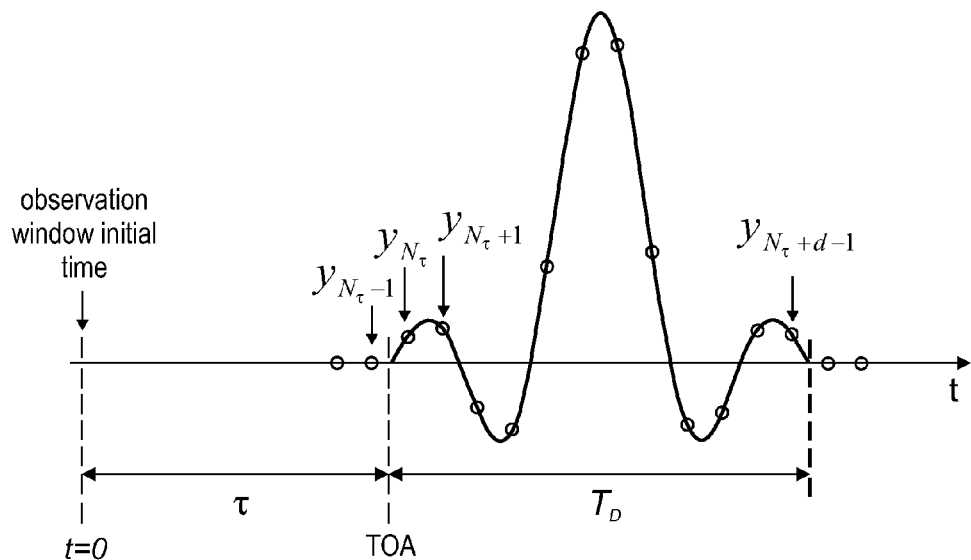
FIG. 2 is a schematic illustration of a section of a signal, according to some embodiments of the present invention.

In this example, it is assumes, without loss of generality, that the beginning of the observation window is at time t=0. Let $y=[y_0 \, y_1 \ldots y_{L-1}]^T$ be a vector of length L containing the observation window samples which are given by $y_n = y(nT_s)$. Note that $\tau$, the first arrival time with respect to the beginning of the observation window, is a real number. Let $N_\tau$ be the integer index of the first sample within the observation vector y that contains the multipath signal, thus, $(N_\tau - 1)T_s < \tau \leq N_\tau T_s$. In FIG. 2 the first arrival time to be estimated, $\tau$, is pointed out for the case of a single path channel (no multipath) i.e., $h(t) = \delta(t-\tau)$ and $y(t) = x(t-\tau)$. The continuous received signal y(t) and its samples $y_n$ along the observation window are shown in the figure. Note that $\tau$ is not a point of high energy in the pulse, just a reference point. For example a detector that looks for the pulse maximum does not find it at $\tau$ but at a different point $\tau + T_D/2$. However the constant $T_D/2$ is typically known and can be subtracted since in the present example the pulse shape is known to the receiver.

Figure 3:
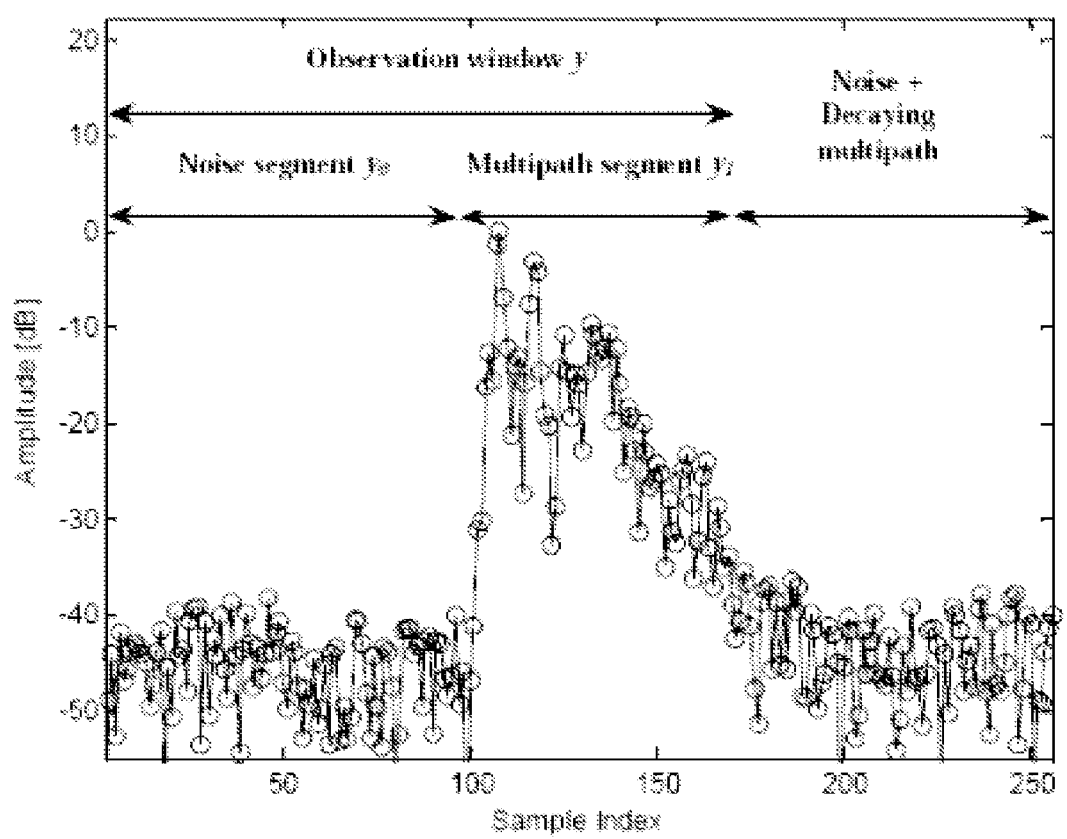
FIG. 3 is a is a schematic illustration of a partitioned observation vector, according to some embodiments of the present invention.

The observation vector y can be partitioned into two segments $y = [y_0^T \, y_1^T]^T$ such that the first segment $y_0 = [y_0 \, y_1 \ldots y_{N_\tau-1}]^T$ contains only noise samples, and the second segment $y_1 = [y_{N_\tau} \, y_{N_\tau+1} \ldots y_{L-1}]^T$ contains the received multipath first cluster plus noise samples as demonstrated in FIG. 3. It is assumed that the segment $y_1$ terminates at the end of the first cluster. The reason that the vector is truncated at this point is that the rest of the samples do not provide any useful information regarding the TOA.

The estimate of the received signal first arrival time $\tau$ within the observation window will now be described. Let $v = [v_{N_\tau} \, v_{N_\tau+1} \ldots v_{L-1}]^T$ be the noise samples in $y_1$ then from (4) we write $y_1$ as a sum of statistically independent vectors so that $$y_1 = \sum_{m}^{M_y-1} \eta_m + v \quad (EQ. 5)$$

where $\eta_m = \alpha_m [x(N_\tau T_s - \tau_m) \, x((N_\tau+1)T_s - \tau_m) \ldots x((L-1)T_s - \tau_m)]^T$ and $M_y$ is the number of multipath components included in $y_1$. The vectors $\eta_m$ are statistically independent since $\alpha_m$ and $\tau_m$ are statistically independent. The central limit theorem (CLT) for random vectors [28] states that the sum of independent random vectors is a Gaussian vector when the number of the summed vectors approaches infinity. The number of non zero elements in the summation for each term of $y_1$ is proportional to the density of the multipath delays ($\tau_m$) within the duration of x(t). It is assumes that the density is large enough to justify the use of the Gaussian approximation. In the following section the Maximum Likelihood (ML) estimator is developed based on the Gaussian model. The simulation results show that in practice only three terms were enough to justify the Gaussian approximation. The complexity of the resulting estimator is much lower than that of the EML (the ML solution for the exact channel model). A simplified solution which has an even further reduced complexity and is practical for implementation is developed hereinunder.

Gaussian Model Maximum Likelihood TOA Estimator (GE)

The TOA ML estimator, assuming the receiver obtains K independent observation vectors $y^0, y^1, \ldots, y^{K-1}$ all with the same TOA, is given by $$\hat{\tau} = \arg\max_\tau f(y^0, y^1, \ldots, y^{K-1} | \tau) = \arg\max_\tau \prod_{k=0}^{K-1} f(y^k | \tau) \quad (EQ. 6)$$

Typically, K=1 but diversity can be used to obtain K>1 vectors. For each single observation vector y (superscript is omitted to simplify the exhibition), the segments prior and following time $\tau$ are statistically independent hence we can write $$f(y|\tau) = f(y_0|\sigma)f(y_1|\tau) \quad (EQ. 7)$$

The noise samples in $y_0$ are independent complex Gaussian random variable with zero mean, variance $\sigma_v^2$ and independent real and imaginary components, thus $$f(y_0|\tau) = \prod_{n=0}^{N_\tau-1} \frac{1}{\pi\sigma_v^2} e^{-\frac{|y_n|^2}{\sigma_v^2}} \quad (EQ. 8)$$

According to (5) $E\{y_1\}=0$ since $E\{\alpha_m\}=0$ and $E\{v_n\}=0$. The $L-N_\tau$ samples in $y_1$ are assumed to have Gaussian distribution hence their distribution is given by $$f(y_1|\tau) = \frac{1}{\pi^{(L-N_\tau)}|R_1(\tau)|} e^{-y_1^H R_1^{-1}(\tau) y_1} \quad (EQ. 9)$$

where $R_1(\tau)$ is the autocorrelation matrix of $y_1$ which is dependent on the value of $\tau$. The autocorrelation of y is derived in Appendix B. Denote by $R_1^{i,j}(\tau)$ the element in the i-th row and j-th column of $R_1(\tau)$ which is given in Appendix B by $$R_1^{i,j}(\tau) = E\{y_{N_\tau+i} y_{N_\tau+j}^* \mid \tau\} = \qquad (EQ. 10)$$

$$\int_{t=\tau}^{\infty} \sigma_h^2(t) x((N_\tau + i)T_s - t) x((N_\tau + j)T_s - t) dt + \sigma_v^2 \delta_K(i-j)$$

where $x(\mu)$ initiates at $\mu=0$, $\delta_K(n)$ is the Kronecker delta and $\sigma_h^2(t)$ is the channel power delay profile, which is typically the average power as a function of the delay.

By substituting (8) and (9) into (7) and then into (6), applying ln to the result, and eliminating insignificant terms the following Gaussian Model ML TOA estimator (GE) is found $$\hat{\tau}_{GE} = \qquad (EQ. 11)$$

$$\operatorname*{argmin}_\tau \sum_{k=0}^{K-1} N_\tau \ln(\sigma_v^2) + \frac{1}{\sigma_v^2} \|y_0^k\|^2 + \ln(|R_1(\tau)|) + (y_1^k)^H R_1^{-1}(\tau) y_1^k$$

where $\|y_0^k\|^2$ is the squared norm of $y_0^k$.

The TOA estimator in (11) was derived according to some embodiments of the present invention based on the assumption that the observation vector y is a Gaussian vector. It was found by the present inventors that the Gaussian approximation is sufficient for any multipath scenario, including dense multipath, a single path channel, and any other density of paths (e.g., only few paths within the pulse duration).

When the channel power delay profile $\sigma_h^2(t)$ is not known or difficult to be found, it can be approximated as constant within the first segment. By truncating the decayed multipath part only a minor part of the signal energy is lost and hence it causes insignificant degradation in performance. Let $\tilde{\sigma}_h^2$ be the approximated constant value of $\sigma_h^2(t)$. In cases that the multipath arrivals density is low there is a significant difference between the value of $\sigma_h^2(t)$ at time $t=\tau$ and at $t>\tau$ and it is preferred to increase the variance at time $t=\tau$ such that $\sigma_h^2(\tau)=Y\tilde{\sigma}_h^2$, where Y is a constant factor inversely proportional to the multipath density. Thus $Y \geq 1$ and it approaches one as the multipath arrivals density grows.

If $\sigma_v^2$ and $\tilde{\sigma}_h^2$ are not known, they can be estimated as follows. The noise variance can be estimated by averaging the energy of the samples received long before the signal arrival time, and $\tilde{\sigma}_h^2$ can be estimated by first evaluating the ratio between the energy of $y_1$ and its duration and then subtracting the noise variance from the result.

It is noted that unlike conventional techniques, the accuracy of the estimator of the present embodiments is not limited by the sampling rate, provided $1/T_s \geq 2W_s$, where $W_s$ is the bandwidth of s(t) which is also the bandwidth of x(t). The sampling rate does not affect the estimator resolution since the metric to minimize is a continuous function of $\tau$.

The complexity of the estimator given in (11) will now be evaluated. The cost function to be minimized in (11) is not necessarily convex and may have several local minimum points. In the following, a worst case scenario is taken, according to which the exhaustive search is performed on a certain grid of $\tau$ with spacing $T_A$. Let $P=T_s/T_A$ be the ratio between the sampling period and the search grid spacing. In total there are $LT_s/T_A=PL$ hypotheses tests of $\tau$ for an observation vector of L samples. The matrices $R_1^{-1}(\tau)$ and the values of $\ln(|R_1(\tau)|)$ for $\tau=0, T_A, 2T_A, \ldots, (LP-1)T_A$ can be computed in advance for several SNR values and stored in memory. The complexity of the estimator is then governed by the computation of $J=(y_1^k)^H R_1^{-1}(\tau) y_1^k$. For a single vector $y_1$ of length N the complexity of computing J (assuming $R_1^{-1}(\tau)$ is stored in memory) is $O(N^2+N)$. Per each different length of $y_1$ there are P evaluations of J and thus the total computational complexity for all PL hypothesizes of $\tau$ is given by $$O\left(K \sum_{n=1}^{L} P(n^2+n)\right) \approx O\left(KP \sum_{n=1}^{L} n^2\right) = \qquad (EQ. 12)$$

$$O\left(P \frac{L(L+1)(2L+1)}{6}\right) \approx O\left(\frac{KPL^3}{3}\right).$$

Thus, the complexity is proportional to $L^3$. An approximation of the GE with significant lower complexity is described in the following section.

Approximated Gaussian Model ML TOA Estimator (AGE)

In order to simplify the implementation of the GE given in (11) an approximation to $$\Omega(\tau) = \ln(|R_1(\tau)|) + y_1^H R_1^{-1}(\tau) y_1 \qquad (EQ. 13)$$

is derived. The duration of h(t) from the first arrival until it decays to zero is assumed to be larger than the duration, $T_D$, of x(t). $y_1$ is further partitioned into two sub-segments $y_1 = [y_{1,0}^T \ y_{1,1}^T]^T$ where $y_{1,0} = [y_{N_\tau} \ y_{N_\tau+1} \ \cdots \ y_{N_\tau+d-1}]^T$, $y_{1,1} = [y_{N_\tau+d} \ y_{N_\tau+d+1} \ \cdots \ y_{L-1}]^T$ and d is the number of samples within the interval $T_D$. It is assumed that the segment $y_{1,1}$ terminates once the multipath signal level drops significantly and hence the multipath power delay profile, $\sigma_h^2(t)$, in the segment is approximated as constant. The segment $y_{1,0}$ is the transient response of the convolution between x(t) and h(t) where only partial correlation between them takes place and the segment $y_{1,1}$ is the steady state response where the full length of x(t) is correlated with h(t). The transient period is where the signal frontier is arriving, and is the most significant part of the entire observation window for TOA estimation. The TOA cannot effect the steady state period $y_{1,1}$. Nevertheless, this segment is used to verify that the signal has arrived and the transient is not caused by noise. In other words, the TOA estimator utilizes this segment to reduce false signal detection. The dimension of $y_{1,0}$ is fixed for a given x(t) (independent of $\tau$) and is relatively small. The dimension of $y_{1,1}$ is $L-N_\tau-d$ which is relatively large and not fixed. It was found by the present inventors that such choice of segmentation reduces the complexity while maintaining sufficient level of performance. The length of the transient part can be varied. For a sufficiently large transient segment, the estimator is equivalent to the GE described above.

The autocorrelation matrix of $y_1$ can be written as $$R_1(\tau) = \begin{bmatrix} R_{1,0}(\tau - N_\tau) & G \\ G & R_{1,1}(N_\tau) \end{bmatrix}$$

where $R_{1,0}(\tau-N_\tau) = E\{y_{1,0} y_{1,0}^H\}$ is the autocorrelation of the transient period which from (10) is a function of $\tau-N_\tau$ and $R_{1,1}(N_\tau) = E\{y_{1,1} y_{1,1}^H\}$ is the autocorrelation of the steady state period which from (10) is a function of $N_\tau$ (assuming constant power delay profile). The matrix $G=E\{y_{1,0} y_{1,1}^H\}$ is the cross-correlation between the transient and steady state periods. The two sub-segments are approximated as independent, thus G=0. By substituting the latter into (13) one obtains:

$$\Omega(\tau) = y_{1,0}^H R_{1,0}^{-1}(\tau - N_\tau) y_{1,0} + \ln(|R_{1,0}(\tau - N_\tau)|) + y_{1,1}^H R_{1,1}^{-1}(N_\tau) y_{1,1} + \ln(|R_{1,1}(N_\tau)|)$$ (EQ. 14)

Let $\lambda_i$ be the eigenvalues of $R_{1,1}(N_\tau)$. Since the determinant of a matrix is equal to the product of its eigenvalues then $$\ln(|R_{1,1}(N_\tau)|) = \sum_{i=0}^{L-N_\tau-d-1} \ln(\lambda_i).$$ (EQ. 15)

According to the spectral decomposition theorem $R_{1,1}^{-1}(N_\tau) = U\Lambda^{-1}U^H$ where U is a matrix whose columns are the eigenvectors of $R_{1,1}(N_\tau)$ and $\Lambda$ is a diagonal matrix with the eigenvalues $\lambda_i$ of $R_{1,1}(N_\tau)$ along its diagonal. Let $\Psi = U^H y_{1,1}$, then:

$$y_{1,1}^H R_{1,1}^{-1}(N_\tau) y_{1,1} = y_{1,1}^H U\Lambda^{-1}U^H y_{1,1} = \Psi^H \Lambda^{-1} \Psi = \sum_{i=0}^{L-N_\tau-d-1} \left|\frac{1}{\sqrt{\lambda_i}} \Psi(i)\right|^2$$

According to the Parseval's theorem $$\sum_{i=0}^{L-N_\tau-d-1} \left|\frac{1}{\sqrt{\lambda_i}} \Psi(i)\right|^2 = \sum_{n=0}^{L-N_\tau-d-1} |\omega_n|^2$$ (EQ. 16)

where $\omega_n$ is the result of circular convolution between the IDFT of $1/\sqrt{\lambda_i}$ and the IDFT of $\Psi$. The matrix $R_{1,1}(N_\tau)$ is Toeplitz with dimension $L-N_\tau-d$ which is large in relation to the correlation length hence we approximate it as a Circulant matrix. As such, $U^H$ is the discrete Fourier transform (DFT) matrix and the eigenvalues $\lambda_i$ along the diagonal of $\Lambda$ are equal to the DFT of the first row of $R_{1,1}(N_\tau)$ [29]. Hence, approximating $R_{1,1}(N_\tau)$ as Circulant means approximating $\Psi$ as the DFT of $y_{1,1}$ and $\lambda_i$ as the frequency response of a low pass filter (since it is the DFT of the autocorrelation of $y_{1,1}$). Consequently, $1/\sqrt{\lambda_i}$ is high pass filter (HPF) frequency response and $\omega_n$ is approximated as the result of circular convolution between this HPF and $y_{1,1}$. Let $\tilde{y}_{1,1}$ be the result of a linear convolution between $y_{1,1}$ and the HPF $1/\sqrt{\lambda_i}$. Assuming that this filter is short enough we can replace the circular convolution with a linear convolution and then $$y_{1,1}^H R_{1,1}^{-1}(N_\tau) y_{1,1} \approx \|\tilde{y}_{1,1}\|^2$$ (EQ. 17)

The effect of changing the size of the first row of $R_{1,1}(N_\tau)$ according to $N_\tau$ is zero padding. In the frequency domain it results in resampling the frequency response $\lambda_i$. The summation in (15) is then linearly proportional to the dimension of $R_{1,1}(N_\tau)$ and can be approximated as $$\ln(|R_{1,1}(\tau)|) \approx \left(\frac{L-N_\tau-d}{L}\right)\Gamma$$ (EQ. 18)

where $\Gamma = \Sigma_{i=0}^{L-1} \ln(\tilde{\lambda}_i)$, and $\tilde{\lambda}_i$ are the eigenvalues of $R_{1,1}(N_\tau=0)$. The factor $$\left(\frac{L-N_\tau-d}{L}\right)$$

is the ratio between the length of $y_{1,1}$ and the dimension for which $\tilde{\lambda}_i$ is evaluated. Substituting (17) and (18) into (14) yields an approximation to $\Omega(\tau)$. Substituting this approximation into (11), removing irrelevant terms and reorganizing, the following approximate GE (AGE) solution is obtained $$\hat{\tau}_{AGE} = \underset{\tau}{\operatorname{argmin}} \sum_{k=0}^{K-1} \gamma + \frac{1}{\sigma_v^2}\|y_0^k\|^2 + (y_{1,0}^k)^H R_{1,0}^{-1}(\tau - N_\tau) y_{1,0}^k + \|\tilde{y}_{1,1}^k\|^2$$ (EQ. 19)

where $$\gamma = N_\tau\left(\ln(\sigma_v^2) - \frac{1}{L}\sum_{i=0}^{L-1} \ln(\tilde{\lambda}_i)\right).$$

Further simplification can be obtained when the sampling rate is slightly higher than the Nyquist rate. In this case the HPF becomes close to an all-pass, and has negligible effect and thus the metric in (19) can be simplified by using the approximation $$\|\tilde{y}_{1,1}^k\|^2 \approx \frac{1}{\sigma_{y1}^2}\|y_{1,1}^k\|^2$$

where $\sigma_{y1}^2$ is the variance of the samples in $y_{1,1}$.

The TOA estimator in (19) is simple to implement. The dimensions of $R_{1,0}(\tau - N_\tau)$ is only d×d, where d is the number of samples corresponding to the transmitted pulse duration (typically only a few samples). There are only $P = T_s/T_A$ different matrices $R_{1,0}^{-1}(\tau - N_\tau)$ and value of $\ln(|R_{1,0}(\tau - N_\tau)|)$ to be used in (19) for the time differences of $\tau - N_\tau = 0, T_A, 2T_A, \ldots, (P-1)T_A$. They can be calculated in advance, as well as the HPF coefficients, for several SNR values and stored in memory. The complexity of (19) is governed by the calculation of $(y_{1,0}^k)^H R_{1,0}^{-1}(\tau - N_\tau) y_{1,0}^k$ which has a complexity of $O(d^2+d)$. Thus, the complexity of (19) for K independent observations and all PL hypothesizes of $\tau$ is $O(KPLd^2)$ which grows only linearly with L. This is a remarkable reduction in complexity compared to the complexity of the GE metric (11) which grows with the third power of L. Furthermore, the complexity of the AGE is only $d^2$ times higher than the complexity of the simplest TOA estimation methods. These methods are based on comparing the signal energy to a threshold [14]. For these methods the sampling spacing is equal to the search resolution, $T_A$, and thus there are PL samples in the observation window corresponding to PL hypothesizes of $\tau$. Hence there are PL energy calculations per channel realization thus the complexity is $O(KLP)$. The implementation complexity of SCC is also linearly dependent on L, however, it is more complex than AGE since at each iteration the multipath complex coefficients are estimated by the least squares method which requires an inversion of a matrix with dimension equal to the number of arrivals.

Performance Analysis

The performance of the Gaussian estimator given in (11) will now be evaluated. The analysis is applicable for any multipath density and even for low density where the Gaussian approximation is inaccurate. A cost function (a function to be minimized) in the face of (11) can be written as;

$$C(\tau) = \sum_{k=0}^{K-1} [\ln(|R(\tau)|) + (y^k)^H R^{-1}(\tau) y^k], \quad \text{(EQ. 20)}$$

where $y^k$ is the k-th full observation vector (including all segments) and $R(\tau)$ is the autocorrelation of $y^k$ with elements calculated according to (40). Using the relationship $$\sum_{k=0}^{K-1} (y^k)^H R^{-1}(\tau) y^k =$$

$$\sum_{k=0}^{K-1} Tr\{R^{-1}(\tau) y^k (y^k)^H\} = KTr\left\{R^{-1}(\tau)\left[\frac{1}{K}\sum_{k=0}^{K-1} y^k (y^k)^H\right]\right\}$$

(20) is written as $$C(\tau) = K \ln(|R(\tau)|) + KTr\{R^{-1}(\tau)\hat{R}\} \quad \text{(EQ. 21)}$$

where $Tr\{\ \}$ denotes the trace of a matrix and $$\hat{R} = \frac{1}{K}\sum_{k=0}^{K-1} y^k (y^k)^H$$

is the empirical autocorrelation estimation. From (21) the ML estimator can be interpreted as first estimating the autocorrelation $\hat{R}$ based on the empirical observations and then choosing $\tau$ that yields $R(\tau)$ that best "matches" $\hat{R}$. The "matching" test is realized by $Tr\{R^{-1}(\tau)\hat{R}\}$.

The derivative of the cost function $C(\tau)$ with respect to $\tau$ is given by $$g(\tau, \hat{R}) = \frac{\partial C(\tau)}{\partial \tau} \quad \text{(EQ. 22)}$$

$$= \frac{\partial}{\partial \tau}[K\ln(|R(\tau)|) + KTr\{R^{-1}(\tau)\hat{R}(\tau)\}]$$

$$= KTr\left[R^{-1}(\tau)\frac{\partial R(\tau)}{\partial \tau} - R^{-1}(\tau)\frac{\partial R(\tau)}{\partial \tau}R^{-1}(\tau)\hat{R}\right]$$

Let $\tau_t$ and $R(\tau_t)$ be the true TOA and the true autocorrelation respectively. A first-order Taylor series expansion of $g(\tau, \hat{R})$ at $\tau = \tau_t$ and $\hat{R} = R(\tau_t)$ yields $$g(\tau, \hat{R}) \cong g(\tau_t, R(\tau_t)) + Q(\tau_t, R(\tau_t))[\tau - \tau_t] + F(\tau_t, R(\tau_t))[\text{vec}(\hat{R}) - \text{vec}(R(\tau_t))] \quad \text{(EQ. 23)}$$

where $\text{vec}(A)$ is the vectorized version of the matrix $A$, $$Q(\tau, \hat{R}) = \frac{\partial}{\partial \tau} g(\tau, \hat{R}) \text{ and } F(\tau, \hat{R}) = \frac{\partial}{\partial \text{vec}(\hat{R})} g(\tau, \hat{R}).$$

For a given empirical autocorrelation matrix $\hat{R}$, the value $\tau = \hat{\tau}$ ($\hat{\tau}$ is the estimated TOA) attains the minimum of the cost function and for $\hat{R} = R(\tau_t)$ (the error free autocorrelation) the value $\tau = \tau_t$ attains the minimum. Hence $g(\hat{\tau},\hat{R}) = g(\tau_t, R(\tau_t)) = 0$. Substituting the latter into (23) yields $$Q(\tau_t, R(\tau_t))[\hat{\tau} - \tau_t] \cong -F(\tau_t, R(\tau_t))[\text{vec}(\hat{R}) - \text{vec}(R(\tau_t))] \quad \text{(EQ. 24)}$$

Right multiplication by the conjugate transpose of itself at each side of equation (24) yields $$Q^2(\tau_t, R(\tau_t))[\hat{\tau} - \tau_t]^2 = F(\tau_t, R(\tau_t))\Theta F^H(\tau_t, R(\tau_t)) \quad \text{(EQ. 25)}$$

where $\Theta = [\text{vec}(\hat{R}) - \text{vec}(R(\tau_t))][\text{vec}(\hat{R}) - \text{vec}(R(\tau_t))]^H$. Taking the expectation of (25) and dividing by $Q^2(\tau_t, R(\tau_t))$ gives $$E\{(\hat{\tau} - \tau_t)^2\} \cong \frac{F(\tau_t, R(\tau_t))E\{\Theta\}F^H(\tau_t, R(\tau_t))}{Q^2(\tau_t, R(\tau_t))} \quad \text{(EQ. 26)}$$

It has been shown [30] that $$E\{\Theta\} = \frac{1}{K} R(\tau_t)^T \otimes R(\tau_t) \quad \text{(EQ. 27)}$$

where $\otimes$ is the Kronecker product.

The denominator of (26) is $$Q^2(\tau_t, R(\tau_t)) = \left[KTr\left\{\left[R^{-1}(\tau_t)\left[\frac{\partial R(\tau)}{\partial \tau}\right]_{\tau=\tau_t}\right]^2\right\}\right]^2 \quad \text{(EQ. 28)}$$

and in the nominator $$F(\tau, \hat{R}) = \frac{\partial}{\partial \text{vec}(\hat{R})} KTr\left[R^{-1}(\tau)\frac{\partial R(\tau)}{\partial \tau} - R^{-1}(\tau)\frac{\partial R(\tau)}{\partial \tau}R^{-1}(\tau)\hat{R}\right] \quad \text{(EQ. 29)}$$

$$= -K\frac{\partial}{\partial \text{vec}(\hat{R})} Tr\left[R^{-1}(\tau)\frac{\partial R(\tau)}{\partial \tau}R^{-1}(\tau)\hat{R}\right].$$

Let $A(\tau) = R^{-1}(\tau)\frac{\partial R(\tau)}{\partial \tau}R^{-1}(\tau)$ then $$F(\tau, \hat{R}) = -K\frac{\partial}{\partial \text{vec}(\hat{R})} \sum_{i=0}^{N-1}\sum_{j=0}^{N-1} A_{i,j}\hat{R}_{j,i} = -K\text{vec}(A(\tau))$$

where $A_{i,j}$ and $\hat{R}_{j,i}$ are the elements in the i-th row and j-th column of $A(\tau)$ and $\hat{R}$, respectively. By substituting (27), (28) and (29) into (26) we arrive at $$E\{(\hat{\tau} - \tau_t)^2\} \cong \frac{\text{vec}(A(\tau_t))^H \{R^T(\tau_t) \otimes R(\tau_t)\} \text{vec}(A(\tau_t))}{K\left[Tr\left\{\left[R^{-1}(\tau_t)\left[\frac{\partial R(\tau)}{\partial \tau}\right]_{\tau=\tau_t}\right]^2\right\}\right]^2} \quad \text{(EQ. 30)}$$

Using linear algebra equalities [29] the nominator of (30) can be written as s $$\text{vec}(A(\tau_t))^H \{R^T(\tau_t) \otimes R(\tau_t)\}\text{vec}(A(\tau_t)) = \text{vec}(A(\tau_t))^H \text{vec}(R(\tau_t)A(\tau_t)R(\tau_t)) =$$

$$\text{vec}(A(\tau_t)^H R(\tau_t)A(\tau_t)R(\tau_t)) = Tr\left\{\left[R^{-1}(\tau_t)\left[\frac{\partial R(\tau)}{\partial \tau}\right]_{\tau=\tau_t}\right]^2\right\}$$

by substituting the latter result back into (30) the MSE approximation is obtained:

$$E\{(\hat{\tau} - \tau_t)^2\} \cong \frac{1}{KTr\left\{\left[R^{-1}(\tau_t)\left[\frac{\partial R(\tau)}{\partial \tau}\right]_{\tau=\tau_t}\right]^2\right\}} \quad (EQ. 31)$$

In (31) the multipath statistics are realized in R(τ) thus the attained approximated MSE expression is suited for various multipath models. The expression in (31) is also the expression of the Cramer-Rao lower bound (CRLB) on the TOA estimation MSE when the received signal y is a Gaussian vector [31] which is the case when the multipath is dense or when the channel has only a single path. Thus, in these two cases the GE MSE is higher or equal to (31) and it is expected to reach the CRLB as the number of independent observation vectors (K) increases.

Results and Discussion

The GE estimator of the present embodiments was tested against the exact maximum likelihood estimator (EML) using a test channel that approximates the commonly used multipath model for which each reflection coefficient has complex Gaussian distribution and the delays have a Poisson distribution [1]. In the test channel the time axis is discrete and its duration is final, for enabling EML calculation, as described in Appendix A. Since the complexity of the EML is extremely high the observation vector was limited to 20 samples. The transmitted signal is presented in FIG. 4. The sample index of the first multipath coefficient (first arrival) was placed randomly with uniform distribution in the first quarter of the observation window, and for each of the following samples a Bernoulli random variable taking the value of zero or one, according to the average arrival rate, determined the existence of an arrival. All the existing reflection coefficients had Gaussian distribution with zero mean and constant variance $\sigma_\alpha^2$. Herein, $T_{eff}$ is defined the duration of the section of x(t) that contains 98% of its total energy. Thus, $T_{eff}$ is considered as the energetic duration of x(t) that has the significant contribution to the result of the convolution between x(t) and the channel h(t). For the transmitted signal presented in FIG. 4, $T_{eff}$=5 samples. Denote by λ the average number of arrivals within $T_{eff}$ not including the first arrival.

Figure 4:
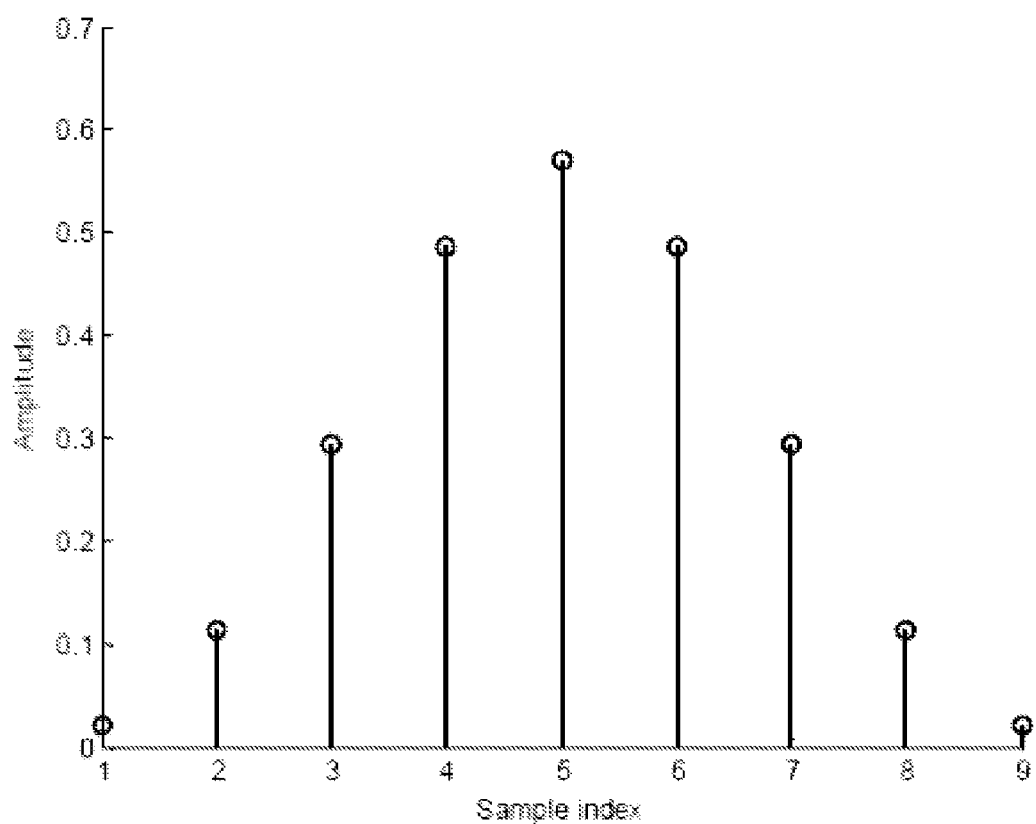
FIG. 4 shows a signal used in computer simulations executed according to some embodiments of the present invention.
Figure 5:
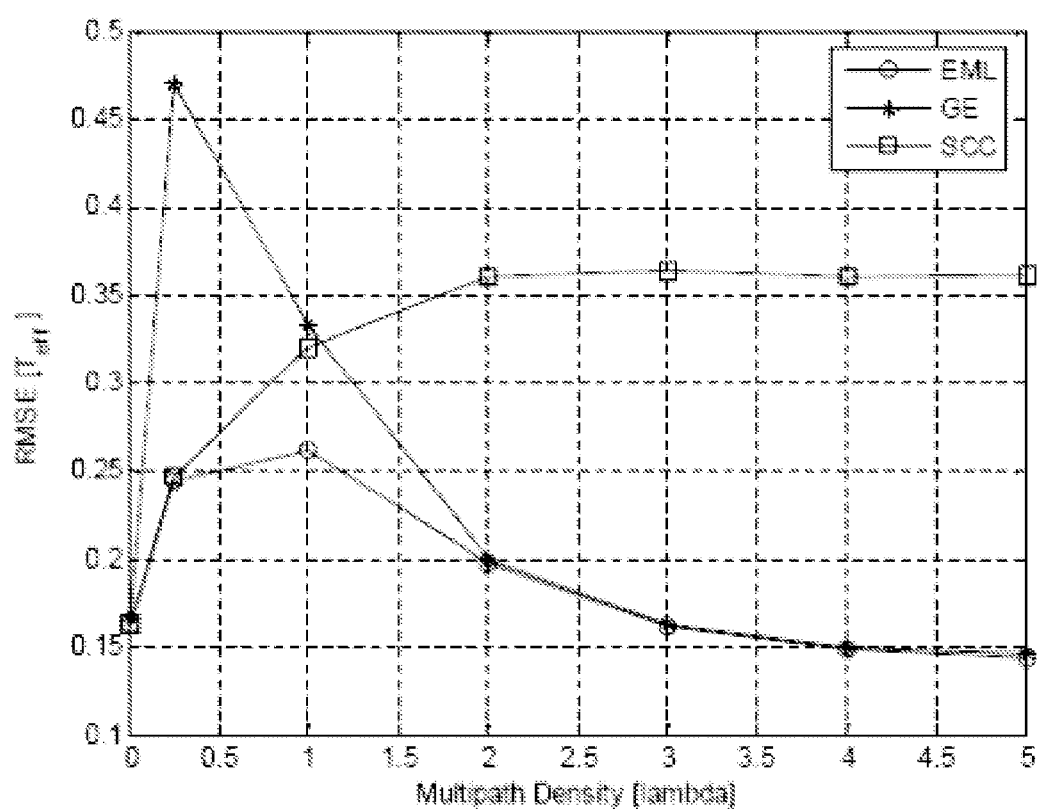
FIG. 5 shows root mean square error (RMSE) as obtained by computer simulations executed according to some embodiments of the present invention, using the signal shown in FIG. 4; Ray signal to noise ratio (RSNR) of 30 dB.
Figure 6:
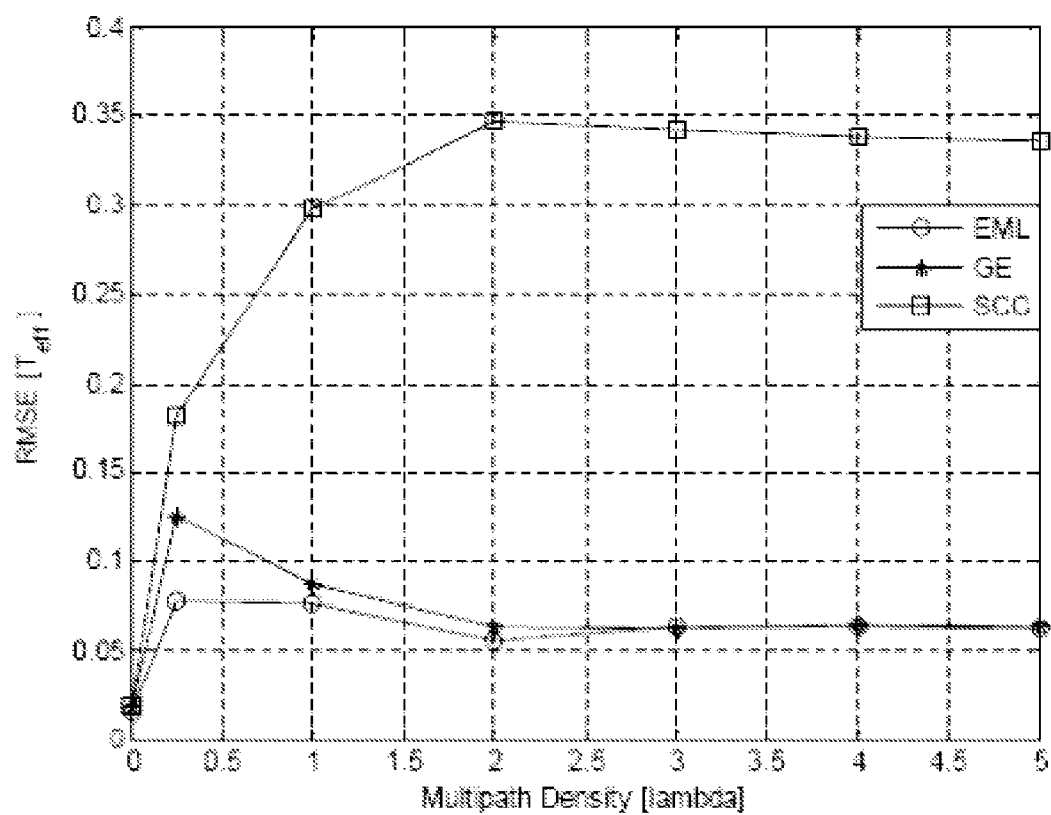
FIG. 6 shows RMSE as obtained by computer simulations executed according to some embodiments of the present invention, using the signal shown in FIG. 4; RSNR of 45 dB.

FIG. 5 and FIG. 6 present the simulation root mean square error (RMSE) results of EML, GE, and of SCC [25] as a function of λ for Ray SNR (RSNR) of 30 dB and 45 dB, respectively, where RSNR=$\sigma_\alpha^2/\sigma_v^2$. The signal used in these simulations is shown in FIG. 4. In practical UWB systems relatively high RSNR of 45 dB can be attained by transmitting successive pulses and averaging the received signals during the coherence time of the channel. The SCC was chosen for comparison since it is a practical solution that attempts to approximate the ML solution. All methods attain the same RMSE at λ=0. The RMSE of SCC increases with λ until it reaches an RMSE error ceiling of about 0.35 $T_{eff}$ at λ>2. The RMSE of both GE and EML increases as λ increases until λ=0.25 and for λ>0.25 their RMSE reduces until it reaches an error floor of 0.15 $T_{eff}$ at λ=4 and 0.06 $T_{eff}$ at λ=2 for RSNR=30 dB and 45 dB, respectively. The RMSE of GE consolidates with that of EML for λ>2. The GE has lower RMSE than SCC at RSNR of 45 dB for λ>0 and at RSNR of 30 dB for λ>1. These results show that approximating the received signal as a Gaussian vector is effective when on average there are more than two arrivals (excluding the first arrival) within the effective pulse duration ($T_{eff}$), or, on the other extreme, a single arrival within the effective pulse duration. For such cases the GE attains the performance of EML and there is a substantial performance advantage with respect to SCC. For lower multipath density the GE outperforms other leading reference methods such as the SCC at high RSNR. In order to apply the above conclusions to real life channels, the ray density of practical channel models was tested. For transmission bandwidth of up to 1 Ghz the value of λ is greater than two for most channel models proposed by the IEEE 802.15.4a study group [3]-[4] as detailed in the sequel.

The behavior of the RMSE as λ increases can be explained as follows. The result of two contradicting effects is observed. The first effect is increasing the probability of decayed first arrival due to destructive superposition with multipath reflections and the second is reducing the distance between the first and following arrivals. The first effect increases the miss-detection probability of the first arrival while the second effect reduces the error when arrivals following the first arrival are detected instead. FIG. 5 and FIG. 6 show that the performance of EML and GE are dominated by the first effect at low values of λ and for λ>0.25 the second effect is the dominant.

Figure 7:
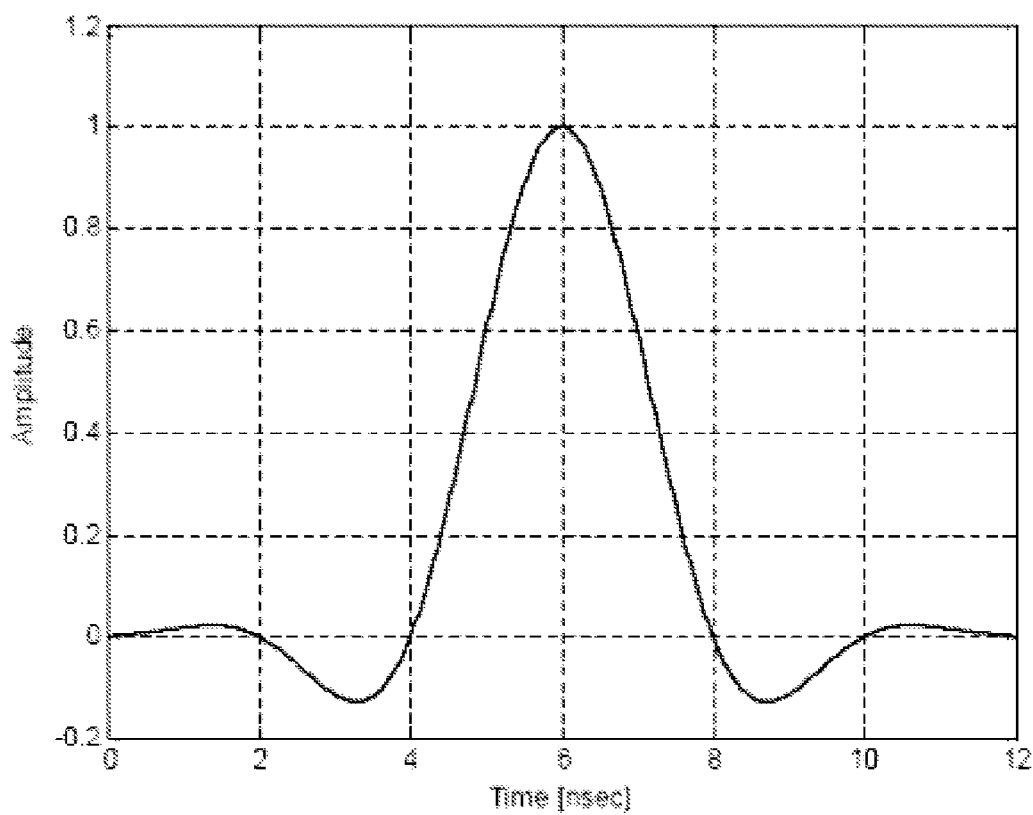
FIG. 7 shows a signal used in additional computer simulations executed according to some embodiments of the present invention.
Figure 8:
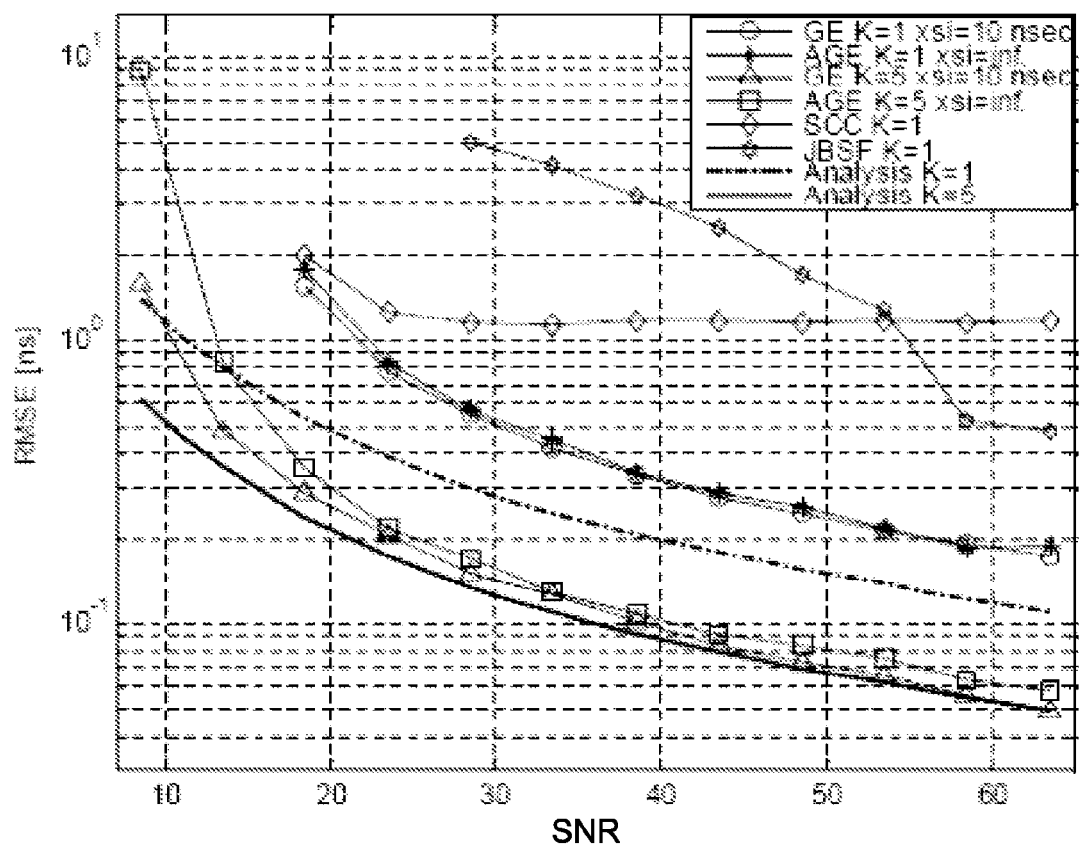
FIG. 8 shows performances of an estimator according to some embodiments of the present invention, evaluated using the signal shown in FIG. 7 and a channel modeled as white complex Gaussian process with exponential decaying variance.
Figure 9:
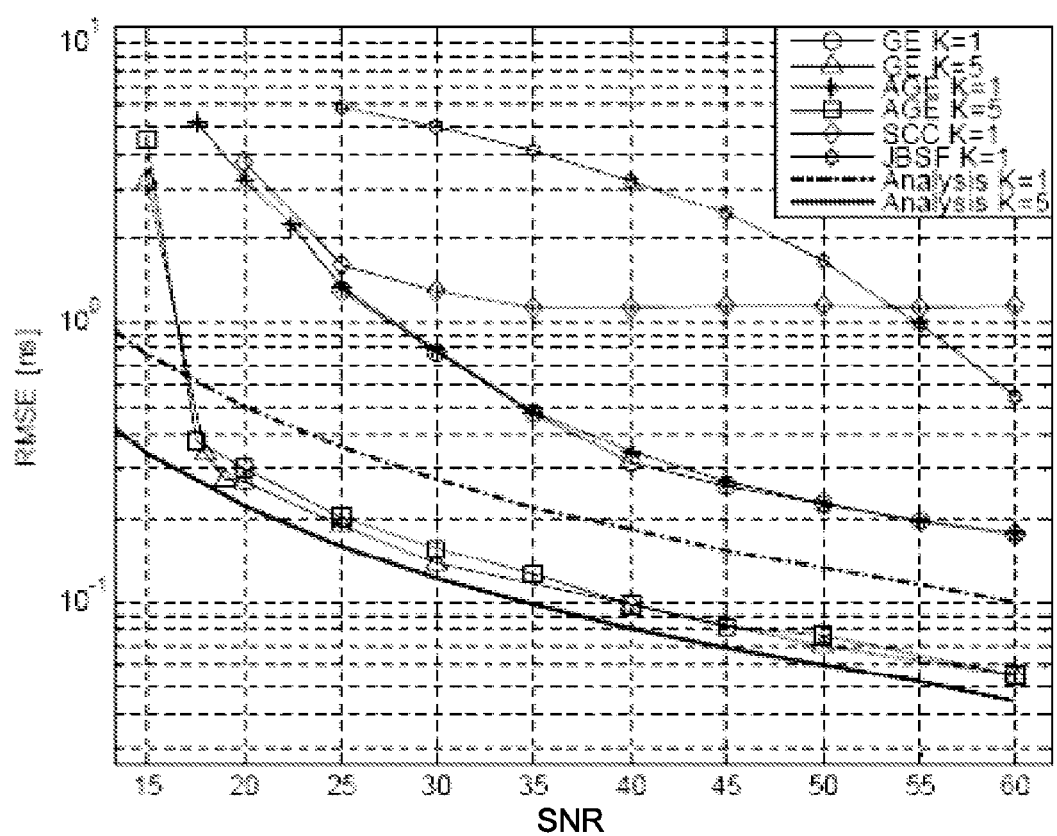
FIG. 9 shows performances of an estimator according to some embodiments of the present invention, evaluated using the signal shown in FIG. 7 for IEEE 802.15.4a in residential indoor environment channel model.
Figure 10:
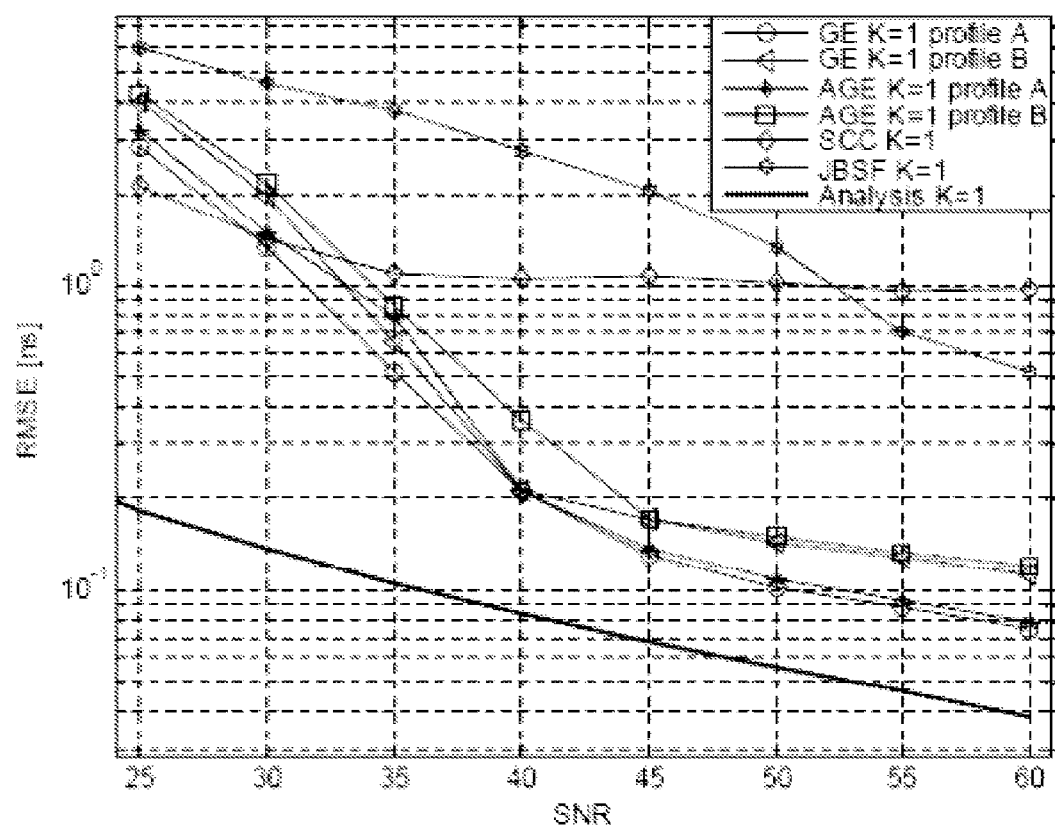
FIG. 10 shows performances of an estimator according to some embodiments of the present invention, evaluated using the signal shown in FIG. 7 (single channel) for IEEE 802.15.4a in indoor office environment channel model.
Figure 11:
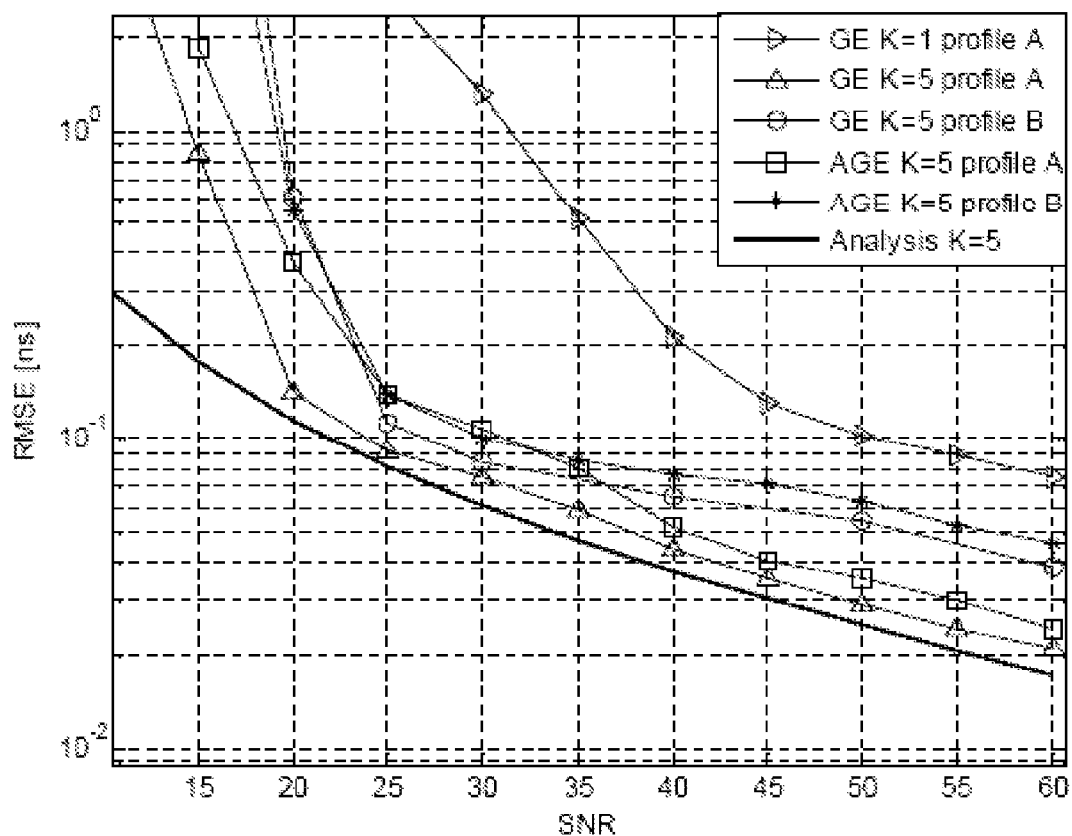
FIG. 11 shows performances of an estimator according to some embodiments of the present invention, evaluated using the signal shown in FIG. 7 (five channels) for IEEE 802.15.4a in indoor office environment.

The performance of the estimator of the present embodiments has been evaluated for three different channel models. The first tested channel, denoted CH0, is a white complex Gaussian process with exponential decaying variance, thus, it perfectly matches the channel model for which the GE was derived. The multipath duration was 40 nsec and the exponential decay rate is given by $\sigma_h^2(t)=e^{-(t-\tau)/\xi}$ where $\xi$=10 nsec. The other two channels, denoted CH2 and CH3, are channel model 3 (indoor office environment) and 1 (residential indoor environment), respectively from the UWB channel models proposed by the IEEE 802.15.4a study group [4]. The impulse response of the transmitted signal used for testing all three channels is presented in FIG. 7. The total pulse duration is $T_D$=12 ns, the effective duration is $T_{eff}$=2 ns and the side lobe levels absolute peak is 18 dB below the main lobe peak. The main difference between CH1 and CH2 is that the multipath arrivals of CH1 are dense (λ≈6) and those of CH2 are sparse (λ≈0.3) with respect to the $T_{eff}$.

The performance of the GE and AGE are compared to SCC [25] and to the Jump Back Search Forward (JBSF) method [14]. In the JBSF the pre-sampling filter was chosen as B(f)=S*(f), which is a matched filter to the transmitted signal and then the TOA was estimated by a search forward from the beginning of the estimation window for the first sample energy that exceeds a threshold level. For all other tested methods B(f) was an anti-aliasing low pass filter. The SCC and JBSF are chosen as reference methods since they represent two ends of solutions considered in the literature. The SCC is a high-end method and the JBSF in contrast, is a widely used low-end method. For all methods a coarse sliding window energy search was conducted as described above in the section entitled "Derivation of Estimation Algorithms." Note that this algorithm provided the same end results for the various algorithms as genie aided window placement.

The performance evaluation criterion was the RMSE as a function of the SNR defined as SNR=$(\Sigma_{n=-\infty}^{\infty}|q_n|^2)/\sigma_v^2$. The algorithms were tested at various SNR levels with Monte Carlo computer simulations where for each channel model 5000 channel realizations were generated. The multipath channel was generated with a bandwidth of 64 W, such that the minimum time between multipath rays was 31.25 psec and the τ search resolution was the same. For SCC and JBSF achieving such resolution requires increasing sampling rate or interpolation to the appropriate sampling rate. For GE and AGE this is not necessary since the metric can be calculated in any resolution as long as the sampling rate is above Nyquist minimum. The sampling rate for GE and AGE was 1 GHz and we have verified that indeed increasing it does not affect the results.

For fair comparison between the estimation methods, each had its own parameters optimized to yield minimum RMSE per channel model (not per each specific channel realization) and SNR value: the threshold level for SCC and JBSF and the ratio between the first arrival variance and noise variance $\sigma_h^2(\tau)/\sigma_v^2$ used for GE and AGE. The GE and AGE showed to be more robust against mismatch in the signal and noise variance level compared to SCC and JBSF (data not shown).

The RMSE results for CH0, CH1 and CH2 are presented in FIGS. 8-11. The results for all three channels show that there is an insignificant performance loss between AGE and GE when the TOA estimation is done with a single channel realization i.e. K=1, and a slight degradation at low SNR when K=5. The RMSE of both methods reduces with SNR and by increasing the number of independent realizations.

When the number of realizations was increased from one to five the mean square error (MSE) reduced by a factor larger than 10. For CH0 and CH1 the performance degradation was insignificant when a constant multipath power delay profile was used in calculating (10) for GE and AGE instead of the exact exponential decaying profile. However for CH2 both methods showed a performance gain when the exact power delay profile was used. In fact, the only significant information in the exact power delay profile for CH2 is the differentiation between the line of sight (t=τ) and the rest (t>τ).

The same performance gain was obtained by approximating the exact power delay profile as having only two different levels: one for t=τ and the other for t>τ. The results of SCC reach an RMSE floor of about 1 nsec which does not reduce with SNR, thus as the SNR increases, the RMSE gap between SCC and AGE increases. The RMSE results of AGE and GE are lower than SCC for all three channel models and all SNR ranges except for the low SNR range on CH2 where the SCC has slightly lower RMSE results.

The RMSE of the JBSF method is the highest from all the tested methods at low and medium SNR levels. At high SNR the JBSF has lower RMSE than SCC but still significantly higher than AGE. The developed RMSE analytical expression given by the root of (31) showed to be a loose lower bound for a single channel realization but for five independent realizations (K=5) the lower bound was tight.

The results presented in FIGS. 8-11 show that the performance of the developed low complexity AGE is robust to various multipath channels (both sparse and dense) and has superior performance to JBSF and to SCC which is widely referred to in literature as a potentially high accurate solution which approximates the ML estimation of all channel coefficients and delays. Unlike SCC, the RMSE of AGE reduces monotonically with SNR. The SCC reaches an error floor which is most likely explained by the imprecise successive cancelation of the multipath components that results in a residual multipath signal regardless of the SNR level. The effect of this residual signal on the TOA estimation is similar to the effect of noise. The AGE does not need to know the channel power delay profile accurately. Most of the performance gain is achieved by approximating the channel power delay profile as constant and thus the detector needs to estimate only the ratio between the signal energy and the noise variance.

Using diversity techniques to obtain only a small number of independent channel realizations yields a significant reduction of the MSE. For five independent realizations the MSE was reduced by a factor larger than 10 while averaging the TOA estimation of each individual realization gives a reduction factor of only 5. Hence, by applying diversity techniques, the AGE can achieve reliable estimation even at very low SNR.

The developed analytical RMSE analysis showed to lower bound the simulation results and the bound becomes tight as the number independent realizations increases. For five independent realizations the analysis was accurate. For the Gaussian channel it means that five independent realizations are sufficient to reach the CLRB. It is known that the ML estimator reaches the CRLB as the number of measurements increases. In the present case, the measurements are increased by increasing the number of realizations.

Appendix A

Exact Maximum Likelihood Estimator

In this Appendix, the exact maximum likelihood (EML) TOA estimator for a typical channel model with Poisson arrival times and complex Gaussian distribution coefficients [1] is derived following the notations given in Example 1.

Let $\tilde{\tau}$ be a vector containing the μ arrival times within the observation window that follow the arrival time of the first multipath component, τ, where $0 \le \mu \le N_\mu$ and $N_\mu$ is the maximal number of arrivals within the observation window. Let Λ(μ) be the set of all the different vectors $\tilde{\mu}$ of length μ, then the EML estimation of the first arrival time τ based on the observation vector y is given by $$\hat{\tau}_{EML} = \arg\max_\tau f(y|\tau) = \arg\max_\tau \sum_{\mu=1}^{N_\mu} \sum_{\tilde{\tau} \in \Lambda(\mu)} f(y|\tau, \tilde{\tau}) f(\tilde{\tau}|\tau) \quad \text{(EQ. 32)}$$

The distribution of y given all the arrival times (τ and $\tilde{\tau}$) is a Gaussian multivariable distribution thus $$f(y|\tau, \tilde{\tau}) = \frac{1}{\pi^L |C(\tau, \tilde{\tau})|} e^{-y^H C^{-1}(\tau, \tilde{\tau}) y} \quad \text{(EQ. 33)}$$

where L is the length of y and $C(\tau,\tilde{\tau})=E\{yy^H|\tau,\tilde{\tau}\}$. For practical implementation we suggest the following approximated model. The arrival times are treated as discrete over a finite grid with time spacing $T_\epsilon$. The arrival times in $\tilde{\tau}$ have Poisson distribution hence the probability of an arrival within $T_\epsilon$ is given by $P_\tau = \lambda e^{-\lambda T_\epsilon}$ where λ is the average arrival rate within $T_\epsilon$ which is assumed known. Let $T_L$ be the observation vector duration time, then the maximal number of arrivals within $T_L$, given τ, is $M_\mu(\tau)=(T_L-\tau)/T_\epsilon$ and thus $$f(\tilde{\tau}|\tau) = P_\tau^\mu (1-P_\tau)^{M_\mu(\tau)-\mu} \quad \text{(EQ. 34)}$$

By substituting (33) and (34) into (32) we arrive at $$\hat{\tau}_{EML} = \arg\max_\tau \sum_{\mu=1}^{M_\mu(\tau)} \sum_{\tilde{\tau} \in \Lambda(\mu)} P_\tau^\mu (1-P_\tau)^{M_\mu(\tau)-\mu} \quad \text{(EQ. 35)}$$

$$\frac{1}{\pi^L |C(\tau, \tilde{\tau})|} e^{-y^H C^{-1}(\tau, \tilde{\tau}) y}$$

The total number of summations in (35) is $2^{M_u(\tau)}$. For accurate TOA estimation of a wideband signal in a typical indoor environment this value is extremely high and hence the EML TOA estimator is too complex for practical implementation.

Appendix B

Autocorrelation of y

From (3) and (4) of Example 1 the autocorrelation elements of y, given $\tau$, can be written as $$E\{y_i y_j^* \mid \tau\} = E\{y(iT_s) y^*(jT_s) \mid \tau\} = \qquad (EQ.\ 36)$$

$$E\left\{\sum_m \sum_q \alpha_m \alpha_q^* x(iT_s - \tau_m) x(jT_s - \tau_q) \bigg| \tau\right\} + E\{v_i v_j^*\}$$

Since $\alpha_m$ and $\alpha_q$ are statistically independent for $m \neq q$ and so are $v_i$ and $v_j$ for $i \neq j$ then we can write (36) as $$E\{y_i y_j^* \mid \tau\} = E_{\tau_1, \ldots \tau_{M-1}} \left\{ \sum_{m=0}^{M-1} \zeta(m) \bigg| \tau \right\} + \sigma_v^2 \delta_K(i-j) \qquad (EQ.\ 37)$$

where $\xi(m) = \sigma_\alpha^2(m) x(iT_s - \tau_m) x(jT_s - \tau_m)$, M is the number of multipath components, $\sigma_\alpha^2(m) = E_{\alpha_m}\{|\alpha_m|^2\}$ and $\delta_K(n)$ is the Kronecker delta. The multipath components variances $\sigma_\alpha^2(m)$ decay as m increases and hence the value of M is set to be large enough so that $\sigma_\alpha^2(M)$ approaches zero. Let $f_{\tau_m}(\tau_m|\tau)$ be the probability density of the m-th multipath component arrival time (m>1), given $\tau$, thus, $$E_{\tau_1, \ldots \tau_{M-1}} \left\{ \sum_{m=0}^{M-1} \zeta(m) \right\} =$$

$$\int_{\tau_1=\tau}^{\infty} \ldots \int_{\tau_{M-1}}^{\infty} = \tau \sum_{m=0}^{M-1} \zeta(m) f(\tau_1, \ldots, \tau_{M-1} \mid \tau) d\tau_1 \ldots d\tau_{M-1} =$$

$$\sigma_\alpha^2(0) x(iT_s - \tau) x(jT_s - \tau) +$$

$$\sum_{m=1}^{M-1} \sigma_\alpha^2(m) \int_{\tau_m=\tau}^{\infty} x(iT_s - \tau_m) x(jT_s - \tau_m) f_{\tau_m}(\tau_m \mid \tau) d\tau_m$$

By changing the integration variable from $\tau_m$ to t and replacing the order of the summation and the integral we can write the last expression in (38) as $$\sum_{m=1}^{M-1} \sigma_\alpha^2(m) \int_{\tau_m=\tau}^{\infty} x(iT_s - \tau_m) x(jT_s - \tau_m) f_{\tau_m}(\tau_m \mid \tau) d\tau_m = \qquad (EQ.\ 39)$$

$$\int_{t=\tau}^{\infty} \sum_{m=1}^{M-1} \sigma_\alpha^2(m) f_{\tau_m}(t \mid \tau) x(iT_s - t) x(jT_s - t) dt$$

By substituting (39) into (38) and then the result into (37) we finally arrive at $$E\{y_i y_j^* \mid \tau\} = \int_{t=\tau}^{\infty} \sigma_h^2(t) x(iT_s - t) x(jT_s - t) dt + \sigma_v^2 \delta_K(i-j) \qquad (EQ.\ 40)$$

where $$\sigma_h^2(t) = \sigma_\alpha^2(0) \delta(t-\tau) + \sum_{m=1}^{M-1} \sigma_\alpha^2(m) f_{\tau_m}(t \mid \tau) \qquad (EQ.\ 41)$$

is the channel power delay profile, i.e. the average power vs delay, as shown next. The power delay profile can be obtained by transmitting narrow pulses with duration going to zero through realizations of a random multipath channel with fixed time of arrival and then measuring the received signal variance over delay. Let p(t) be a transmitted narrow pulse with unit energy given by $$p(t) = \lim_{\Delta \to \infty} \left\{ \begin{array}{ll} 0 & |t| > \Delta \\ 1/\sqrt{\Delta} & |t| < \Delta \end{array} \right\}. \qquad (EQ.\ 42)$$

The channel output is given by $\Sigma_m \alpha_m p(t - \tau_m)$ which is the result of convolution between p(t) and h(t). The channel output variance given $\tau$ is then $$E\left\{ \left| \sum_m \alpha_m p(t - \tau_m) \right|^2 \bigg| \tau \right\} = E_{\tau_1}, \qquad (EQ.\ 43)$$

$$\ldots \tau_{M-1} \left\{ \sum_m \sigma_\alpha^2(m) p^2(t - \tau_m) \bigg| \tau \right\} =$$

$$\sigma_\alpha^2(0) p^2(t - \tau) + \sum_{m=1}^{M-1} \sigma_\alpha^2(m) \int_{\tau_m=\tau}^{\infty} p^2(t - \tau_m) f_{\tau_m}(\tau_m \mid \tau) d\tau_m$$

Substituting (42) into (43) yields $$\lim_{\Delta \to 0} \sigma_\alpha^2(0) p^2(t - \tau) + \sum_{m=1}^{M-1} \sigma_\alpha^2(m) \lim_{\Delta \to 0} \frac{1}{\Delta} \int_{\tau_m=t}^{t+\Delta} f_{\tau_m}(\tau_m \mid \tau) d\tau_m =$$

$$\sigma_\alpha^2(0) \delta(t-\tau) + \lim_{\Delta \to 0} \sum_{m=1}^{M-1} \sigma_\alpha^2(m) \frac{1}{\Delta} f_{\tau_m}(t \mid \tau) \Delta =$$

$$\sigma_\alpha^2(0) \delta(t-\tau) + \sum_{m=1}^{M-1} \sigma_\alpha^2(m) f_{\tau_m}(t \mid \tau) = \sigma_h^2(t)$$

thus, the channel power delay profile is equal to $\sigma_h^2(t)$.

References

[1] A. M. Saleh and R. A. Valenzuela, "A Statistical Model for Indoor Multipath Propagation," IEEE J. Selected. Areas Commun., vol. SAC-5, no. 2, pp. 128-137, February 1987.

[2] A. F. Molisch, "Ultrawideband Propagation Channels—Theory, Measurements, and Modeling," IEEE Trans. on Vehicular Technology, vol. 54, no. 5, pp. 1528-1545, September 2005.

[3] A. F. Molisch et al., "A Comprehensive Standardized Model for Ultrawideband Propagation Channels," IEEE Trans. on Antennas and Propagation, vol. 54, no. 11, pp. 3151-3166, November 2006

[4] A. F. Molisch et al., "IEEE 802.15.4a channel model—Final report," September 2004.

[5] W. Chung and D. Ha, "An accurate ultra wideband (UWB) ranging for precision asset location," in Proc. IEEE Conf. Ultrawideband Syst. Technol. (UWBST), Reston, Va., November 2003, pp. 389-393.

[6] K. Yu and I. Oppermann, "Performance of UWB position estimation based on time-of-arrival measurements," in Proc. IEEE Conf. Ultrawideband Syst. Technol. (UWBST), Kyoto, Japan, May 2004, pp. 400-404.

[7] R. Fleming, C. Kushner, G. Roberts, and U. Nandiwada, "Rapid acquisition for ultra-wideband localizers," in Proc. IEEE Conf. Ultrawideband Syst. Technol. (UWBST), Baltimore, Md., May 2002, pp. 245-249.

[8] C. Falsi, D. Dardari, L. Mucchi, and M. Z. Win, "Time of arrival estimation for UWB localizers in realistic environments," EURASIP J. Appl. Signal Process., vol. 2006, pp. 1-13, 2006.

[9] V. Lottici, A. D'Andrea, and U. Mengali, "Channel estimation for ultrawideband communications," IEEE J. Select. Areas Commun., vol. 20, no. 9, pp. 1638-1645, December 2002.

[10] L. Stoica, A. Rabbachin, and I. Oppermann, "A low-complexity noncoherent IR-UWB transceiver architecture with TOA estimation," IEEE Trans. Microwave Theory Tech., vol. 54, pp. 1637-1646, June 2006.

[11] I. Guvenc, Z. Sahinoglu, and P. V. Orlik, "TOA Estimation for IR-UWB Systems With Different Transceiver Types," IEEE Trans. Microwave Theory and Tech., vol. 54, no. 4, April 2006.

[12] D. Dardari, C.-C. Chong, and M. Z. Win, "Analysis of threshold-based TOA estimator in UWB channels," in Proc. Eur. Signal Process. Conf. (EUSIPCO), Florence, Italy, September 2006.

[13] A. Chehri, P. Fortier and P. M. Tardif, "Time-of-Arrival Estimation For IR-UWB Systems Based on Two Step Energy Detection" Biennial Symposium on Commun., pp. 369-373, June 2008

[14] I. Guvenc and Z. Sahinoglu, "Threshold-based TOA estimation for impulse radio UWB systems," in Proc. IEEE in Conf. Ultra-Wideband (ICUWB), Zurich, Switzerland, 2005, pp. 420-425.

[15] D. Dardari, A. Conti, U. Ferner, A. Giorgetti, M. Z. Win, "Ranging With Ultrawide Bandwidth Signals in Multipath Environments" Proc. of IEEE, Special Issue on UWB Technology and Emerging Applications, vol. 97, no. 2, pp. 404-426, February 2009.

[16] I. Guvenc and Z. Sahinoglu, "Multiscale Energy Products for TOA Estimation in IR-UWB Systems," in Proc. IEEE Global Telecommun Conf., St. Louis, Mo., vol. 1, pp. 209-213, December 2005.

[17] Z. Tian and G. B. Giannakis, "A GLRT approach to Data-Aided Timing Acquisition in UWB Radios—Part I: Algorithms", IEEE Trans. Wireless Commun., vol. 4, no. 6, pp. 2956-2967, November 2005.

[18] X. Li, "Super-Resolution TOA Estimation With Diversity for Indoor Geolocation," IEEE Trans. Wireless Commun., vol. 3, no. 1, January 2004.

[19] R. Roy, A. Paulraj and T. Kailath, "Estimation of Signal Parameters via Rotational Invariance Techniques—ESPRIT", IEEE Trans. Acoust., Speech, Signal Process., vol. 37, no. 7, pp. 984-995, July 1989.

[20] R. J. J. Vidal, M. Najar, "High resolution time-of-arrival detection for wireless positioning systems", In IEEE Vehicular Technology Conference, Vancouver, Canada, pp. 2283-2287, September 2002.

[21] M. Navarro and M. Najar, "Joint Estimation of TOA and DOA in IR-UWB", IEEE Workshop on Signal Processing Advances in Wireless Commun., Helsinki, Finland, pp. 17-20, June 2007.

[22] K. Gedalyahu, R. Tur, Y. C. Eldar, "Multichannel Sampling of Pulse Streams at the Rate of Innovation", IEEE Trans. on Signal Processing, vol. 59, no. 4, pp. 1491-1504, April 2011.

[23] J. Kusuma, I. Maravic, and M. Vetterli. "Sampling with finite rate of innovation: Channel and timing estimation for UWB and GPS". In IEEE International Conference on Commun (ICC'03), pp. 3540-3544, 2003.

[24] M. Z. Win and R. A. Scholtz, "Characterization of ultra-wide bandwidth wireless indoor communications channels: A communication theoretic view," IEEE J. Sel. Areas Commun., vol. 20, pp. 1613-1627, December 2002.

[25] J. Y. Lee and R. A. Scholtz, "Ranging in a dense multipath environment using an UWB radio link," IEEE J. Select. Areas Commun., vol. 20, no. 9, pp. 1677-1683, December 2002.

[26] C. Mazzucco, U. Spagnolini, and G. Mulas, "A ranging technique for UWB indoor channel based on power delay profile analysis," in Proc. IEEE Vehic. Technol. Conf. (VTC), Los Angeles, Calif., September 2004, pp. 2595-2599.

[27] Y. Qi, H. Kobayashi, and H. Suda. "On time-of-arrival positioning in a multipath environment," IEEE Trans. Veh. Technol., vol. 55, no. 5, pp. 1516-1526, September 2006.

[28] R. C. Mittelhammer, Mathematical Statistics For Economics And Business, Chapter 5.5, Springer-Verlag New York Inc., 1996.

[29] D. S. Bernstein, Matrix Mathematics Theory Facts and Formulas, Second edition, Princeton University Press, 2009.

[30] A. J. Weiss and B. F. Friedlander, "Performance Analysis of Spatial Smoothing with Interpolated Arrays," IEEE Tans. Signal Processing, vol. 41, no. 5, May 1993.

[31] S. M. Kay, Fundamentals of Statistical Signal Processing: Detection Theory. Upper Saddle River, N.J.: Prentice-Hall, 1998.

Example 2

Direct Position Estimate

The present Example describes a direct position estimate procedure according to some embodiments of the present invention. The data presented below demonstrate that the direct position estimator of the present embodiments has superior performance compared to the conventional indirect method at low SNR over various multipath channel models and the gap narrows as the SNR increases. A closed form analytical expression that tightly approximated the DPE position estimation root mean square error is also presented.

Introduction

Position estimation methods can be partitioned into two important classes: direct and indirect position estimation. In the direct position estimation (DPE) the target position is estimated directly from the received signals (the raw measurements), preferably from all reference stations. In other words the received signals are transferred to the server for joint processing. In indirect position estimation (IPE) a few parameters are first estimated from each received signal, locally for each received signal, and then the position is estimated based on those parameters. Indirect positioning requires passing less data to the location estimation processor. On the other hand, IPE does not utilize all available information in the location estimation. Various solutions for IPE have been developed [7]-[11]. The common approach for the position estimation in the second step is to search for the position that attains the least squares error between the measured distances (from the first step) and the distances corresponding to each position hypothesis. In case a quality measurement is given per each distance measurement then the position can be estimated by weighted least squares [1].

System Model

Consider a wireless network where there are K reference stations at known positions and a target at unknown position. The 3D position of the k-th reference station and of the target are denoted by $p_{ref}^k = [x^k\ y^k\ z^k]^T$, $k=0,1,\ldots,K-1$, and $p=[x\ y\ z]^T$, respectively. It is assumed that the target is the transmitting side and that the reference stations are the receivers. The system model described in the sequel also applies to the case that the reference stations are the transmitters side and the target is the receiver side since the problem is equivalent for both cases. The target transmits a single pulse $s(t)$ which is assumed known to the reference stations. It is assumed that the reference stations and the target are synchronized so that the pulse transmission time is known to the reference stations. On the way from the target to the k-th reference station the pulse travels through channel $h^k(t)$ which is assumed to be a time invariant multipath channel with impulse response given by $$h^k(t) = \sum_{m=0}^{M_k-1} \alpha_m^k \delta(t - \tau_m^k) \qquad \text{(EQ. 1)}$$

where k denotes the reference station index, $M_k$ is the number of multipath components in $h^k(t)$, $\delta(t)$ is the Dirac delta function, $\alpha_m^k$ and $\tau_m^k$ are the complex coefficient and the delay of the m-th multipath component, respectively. All $\alpha_m^k$ and $\tau_m^k$ for any k or m are statistically independent. In other words, the multipath reflections are independent within a channel and also the channels of different reference stations are statistically independent. Throughout this Example the notation of the first arrival at the k-th reference station, $\tau_0^k$, is replaced by $\tau^k$ for simplifying the exhibition. It is assumed that the first arrival corresponds to the direct path from the transmitter to the receiver. It can be either a line-of-sight component or a direct path through an obstruction. The received signal at the k-th reference station is given by $$r^k(t) = \sum_{m=0}^{M_k-1} \alpha_m^k s(t - \tau_m^k) + w^k(t) \qquad \text{(EQ. 2)}$$

where $w^k(t)$ is additive white complex Gaussian noise observed at the k-th reference station.

At the receiver, the signal $r^k(t)$ is passed through a pre-sampling low pass filter (LPF) whose impulse response is denoted by $b(t)$ and its bandwidth is denoted by W. It is assumed that W is larger than the bandwidth of $s(t)$. The filter output $y^k(t)$ is sampled at rate $f_s = 1/T_s = 2W$. The resulting sampled sequence is denoted by $y_n^k$ and can be written as $$y_n^k = q_n^k + v_n^k \qquad \text{(EQ. 3)}$$

where $v_n^k$ are the noise samples obtained by filtering $w^k(t)$ with $b(t)$ and $q_n^k$ are the samples of the received multipath signal. Let $x(t)$ be the result of the convolution between $s(t)$ and $b(t)$ then $q_n^k$ is obtained by convolving $h^k(t)$ with $x(t)$ and sampling the result at a rate of $1/T_s$ $$q_n^k = \int_0^{nT_s} h^k(\lambda) x(nT_s - \lambda) d\lambda = \sum_{m=0}^{M_k-1} \alpha_m^k x(nT_s - \tau_m^k). \qquad \text{(EQ. 4)}$$

The noise samples $v_n^k$ are assumed to be independent complex circular Gaussian random variables with zero mean and variance $\sigma_v^2$. It is assumed that $x(t)$ is causal.

Let $y^k = [y_0^k\ y_1^k\ \ldots\ y_{L_k-1}^k]^T$ be a vector of length $L_k$ containing the k-th reference station observation window samples which are given by $y_n^k = y^k(nT_s)$. Without loss of generality, it is assumed that the beginning of the observation window is at time $t=0$ which is also the transmission time of $s(t)$. It is assumed that the observation window contains the multipath signal or at least the initial part of it and does not contain noise samples following the multipath signal. A procedure suitable for searching for the observation window is presented in Example 1, above. It is noted that the time-frame definition above is used for convenient mathematical description and is not the physical time frame. The receivers know the time difference between the actual transmission and the observation window start and can compensate for it. The observation vectors from all reference stations are collected by a server which uses them to estimate the position of the target. It is assumed that the signal propagation speed is the speed of light denoted by c.

Direct Position Estimation

In this section DPE is derived for the system model presented above. For given target and reference station positions, the TOA of the first multipath component at the k-th reference station can be expressed as $$\tau^k = \frac{1}{c}\sqrt{(p_{ref}^k - p)^T (p_{ref}^k - p)}. \qquad \text{(EQ. 5)}$$

There are all together K equations for $\tau^0, \tau^1, \ldots, \tau^{K-1}$ thus in principle if $K \geq 3$ then the target 3D position can be determined by the time of arrival measurements. The ML DPE is given by $$\hat{p} = \underset{p}{\operatorname{argmax}}\, f(y^0, y^1, \ldots, y^{K-1} | p). \qquad \text{(EQ. 6)}$$

Since each position hypothesis p determines the time of arrivals at the K reference stations, according to (5), then the ML estimator in (6) can be written as $$\hat{p} = \underset{p}{\operatorname{argmax}}\, f(y^0, y^1, \ldots, y^{K-1} | \tau^0, \tau^1, \ldots, \tau^{K-1}) \qquad \text{(EQ. 7)}$$

where $\tau^k$ is a function of p. The multipath channel realization of different reference stations are assumed statistically independent hence the observation vectors $y^0, y^1, \ldots, y^{K-1}$ are independent and thus $$\hat{p} = \underset{p}{\operatorname{argmax}}\, \prod_{k=0}^{K-1} f(y^k | \tau^k) \qquad \text{(EQ. 8)}$$

An approximation to the likelihood function $f(y^k|\tau^k)$ was derived in Example 1 above by approximating the received signal as Gaussian. The resulting likelihood function is practical for implementation and approaches the exact likelihood function when the multipath is dense or when there is a single channel component. In the intermediate cases it showed to be a good approximation. In the present Example, the detailed DPE is derived following the approach taken in Example 1.

Each observation vector $y^k$, given $\tau^k$, is partitioned into two segments $y=[(y_0^k)^T\ (y_1^k)^T]^T$ such that the first segment $y_0^k$ contains only noise samples, and the second segment $y_1^k$ contains the received multipath first cluster plus noise samples. Note that $\tau^k$, the first arrival time with respect to the beginning of the observation window, is a real number. Let $N_\tau^k$ be the integer index of the first sample within the observation vector $y^k$ that contains the multipath signal, thus, $(N_\tau^k-1)T_s < \tau^k \leq N_\tau^k T_s$. The segment $y_1^k$ is assumed to have a Gaussian distribution. This assumption is strictly true in two cases. The first is when $h^k(t)=\alpha_0^k\delta(t-\tau^k)$ and $\alpha_0^k$ is a complex Gaussian random variable. The other case is when the multipath density is so high that each sample in $y_1^k$ is a sum of infinite number of random variables. However, it has been shown that even a small number of multipath arrivals within the transmitted pulse duration is enough to justify the Gaussian assumption and that the TOA estimator based on this assumption gives good performance for various multipath models both sparse and dense [14].

For each observation vector $y^k$, the segments prior and following $\tau^k$ are statistically independent hence $$f(y^k|\tau^k) = f(y_0^k|\tau^k)f(y_1^k|\tau^k). \quad \text{(EQ. 9)}$$

The noise samples in $y_0^k$ are independent complex Gaussian random variable with zero mean, variance $\sigma_v^2$ and independent real and imaginary components, thus $$f(y_0^k|\tau^k) = \prod_{n=0}^{N_\tau^k-1} \frac{1}{\pi\sigma_v^2} e^{-\frac{|y_n^k|^2}{\sigma_v^2}}. \quad \text{(EQ. 10)}$$

Let $L_k$ be the length of $y^k$. The $L_k-N_\tau^k$ samples in $y_1^k$ are assumed to have Gaussian distribution hence their distribution is given by $$f(y_1^k|\tau^k) = \frac{1}{\pi^{L_i-N_\tau^k}|R_1^k(\tau^k)|} e^{-(y_1^k)^H(R_1^k(\tau^k))^{-1}y_1^k} \quad \text{(EQ. 11)}$$

where $R_1^k(\tau^k)$ is the autocorrelation matrix of $y_1^k$ which is dependent on the value of $\tau^k$. Denote by $\rho_{i,j}^k(\tau^k)$ the element in the i-th row and j-th column of $R_1^k(\tau^k)$ which is given by $$\rho_{i,j}^k(\tau^k)=E\{y_{N_\tau^k+i}^k(y_{N_\tau^k+j}^k)^*|\tau^k\}=\int_{t=\tau}^\infty \sigma_h^2(t)x((N_\tau^k+i)T_s-t)x((N_\tau^k+j)T_s-t)dt+\sigma_v^2\delta_K(i-j) \quad \text{(EQ. 12)}$$

where $\delta_K(n)$ is the Kronecker delta and $\sigma_h^2(t)$ is the channel power delay profile, i.e. the average power vs delay [14].

By substituting (10) and (11) into (9) we arrive at the following Gaussian model TOA likelihood function $$f(y^k|\tau^k) = \left[\prod_{n=0}^{N_\tau^k-1} \frac{1}{\pi\sigma_v^2} e^{-\frac{|y_n^k|^2}{\sigma_v^2}}\right] \frac{1}{\pi^N|R_1^k(\tau^k)|} e^{-(y_1^k)^H(R_1^k(\tau^k))^{-1}y_1^k}. \quad \text{(EQ. 13)}$$

By substituting (13) into (8), applying ln to the result, and eliminating insignificant terms we arrive at the following DPE $$\hat{p}_{DPE} = \arg\min_p \left\{ \sum_{k=0}^{K-1} N_\tau^k \ln(\sigma_v^2) + \frac{1}{\sigma_v^2} \cdot y_0^{k\,.2} + \ln(|R_1^k(\tau^k)|) + (y_1^k)^H(R_1^k(\tau^k))^{-1}y_1^k \right\}. \quad \text{(EQ. 14)}$$

Recall that $\tau^k$ is a function of p. Note that further complexity reduction can be obtained by applying an approximation to (11) [14]. The search for the position that minimizes (14) can be done in two stages. In a first stage (14) is calculated over a discrete grid with relatively wide spacing and the U position hypothesis that attain minimum metric are set as initial estimations. In a second stage a fine search is conducted in the vicinity of each initial estimation to find a single position that minimizes (14). The fine search can be done by calculating (14) over a fine grid or by applying numerical minimization methods such as steepest descent or Gaussian-Newton [15].

Performance Analysis

The performance of the Gaussian estimator given in (14) will now be evaluated. An expression which approximates the position estimation mean square error (MSE) under the assumption that the error is small has been derived. This condition holds as the SNR increases and also when the number of measurements grow, which in the present Example can be realized by increasing the number of reference stations. The results presented below show that with four reference stations the small error conditions holds for a wide SNR range. The analysis is applicable for any multipath density and even for low density where the Gaussian approximation is inaccurate.

A cost function (a function to be minimized) in the face of (14) can be written as:

$$C(p) = \sum_{k=0}^{K-1} \left[\ln(|R^k(\tau^k)|) + (y^k)^H(R^k(\tau^k))^{-1}y^k\right] \quad \text{(EQ. 15)}$$

where $y^k$ is the k-th full observation vector (including the segment before and after the TOA), $R^k(\tau^k)=E\{y^k(y^k)^H\}$ and the elements $E\{y_i^k(y_j^k)^H\}$ are given in (14). For the analysis it is assumed, without loss of generality, that the observation vectors $y^k$, $k=0,1,\ldots K-1$, all have the same length L. Using the relation $(y^k)^H(R^k(\tau^k))^{-1}y^k = \text{Tr}\{(R^k(\tau^k))^{-1}y^k(y^k)^H\}$ (15) can be written as:

$$C(p) = \sum_{k=0}^{K-1} \left[\ln(|R^k(\tau^k)|) + \text{Tr}\{(R^k(\tau^k))^{-1}\hat{R}^k\}\right] \quad \text{(EQ. 16)}$$

where Tr{ } denotes the trace of a matrix and $\hat{R}^k=y^k(y^k)^H$ is the empirical autocorrelation estimation. Let $p_t$ and $\hat{p}$ be the true and estimated positions, respectively. Denote by vec(X) the vectorized version of some matrix X. Let $v_t=[\text{vec}(R^0(\tau^0))^T\ \text{vec}(R^1(\tau^1))^T \ldots \text{vec}(R^{K-1}(\tau^{K-1}))^T]$ and $\hat{v}=[\text{vec}(\hat{R}^0)^T \text{vec}(\hat{R}^1)^T \ldots \text{vec}(\hat{R}^{K-1})^T]$ be a vectorized representation of the true and empirical autocorrelation matrices, respectively. Let $$G(p,\hat{v}) = \frac{\partial}{\partial p}C(p).$$

A first order Taylor expansion of G at $p=p_t$ and $\hat{v}=v_t$ gives $$G(p,\hat{v}) \cong G(p_t,v_t) + Q[p-p_t] + F[\hat{v}-v_t] \quad \text{(EQ. 17)}$$

where $$Q = \left[\frac{\partial}{\partial p}G\right]_{p=p_t,\hat{v}=v_t} \text{ and } F = \left[\frac{\partial}{\partial \hat{v}}G\right]_{p=p_t,\hat{v}=v_t}.$$

For a given realization $\hat{v}$ the cost function C attains maximum at $p=\hat{p}$ and for $\hat{v}=v_t$ the cost function is maximized for $p=p_t$ hence $G(\hat{p},\hat{v})=G(p_t,v_t)=0$. Substituting the later into (17) gives $$Q[\hat{p}-p_t] \cong -F[\hat{v}-v_t] \quad \text{(EQ. 18)}$$

Right multiplying (18) with the conjugate transpose of itself yields $$Q[\hat{p}-p_t][\hat{p}-p_t]^H Q^H \cong F[\hat{v}-v_t][\hat{v}-v_t]^H F^H \quad \text{(EQ. 19)}$$

Left and right multiplying (19) by $Q^{-1}$ and $(Q^{-1})^H$ respectively and then taking the expectation results in $$E\{[\hat{p}-p_t][\hat{p}-p_t]^H\} \cong Q^{-1} F E\{[\hat{v}-v_t][\hat{v}-v_t]^H\} F^H (Q^{-1})^H \quad \text{(EQ. 20)}$$

Let $\Omega_{i,j}=E\{[\text{vec}(\hat{R}^i)-\text{vec}(R^i(\tau^i))][\text{vec}(\hat{R}^j)-\text{vec}(R^j(\tau^j))]^H\}$ then the expectation on the right hand side of (20) can be written as $$E\{[\hat{v}-v_t][\hat{v}-v_t]^H\} = \begin{bmatrix} \Omega_{0,0} & \Omega_{0,1} & \ldots & \Omega_{0,K-1} \\ \Omega_{1,0} & \Omega_{1,1} & \ldots & \Omega_{1,K-1} \\ \ldots & \ldots & \ldots & \ldots \\ \Omega_{K-1,0} & \Omega_{K-1,1} & \ldots & \Omega_{K-1,K-1} \end{bmatrix} \quad \text{(EQ. 21)}$$

since $E\{\text{vec}(\hat{R}^i)\}=\text{vec}(R^i(\tau^i))$ and $\hat{R}^i, \hat{R}^j$ are statistically independent for $i \neq j$ then $\Omega_{i,j}=0$ for $i \neq j$. It has been shown [16] that $\Omega_{i,j}=R^i(\tau^i) \otimes R^i(\tau^i)$ where $\otimes$ is the Kronecker product. Hence (20) can be written as:

$$E\{[\hat{p}-p_t][\hat{p}-p_t]^H\} \cong \quad \text{(EQ. 22)}$$

$$Q^{-1} F \begin{bmatrix} R^0(\tau^0) \otimes R^0(\tau^0) & 0 & \ldots & 0 \\ 0 & R^1(\tau^1) \otimes R^1(\tau^1) & \ldots & 0 \\ \ldots & \ldots & \ldots & \ldots \\ 0 & 0 & \ldots & R^{K-1}(\tau^{K-1}) \otimes R^{K-1}(\tau^{K-1}) \end{bmatrix} F^H (Q^{-1})^H$$

Q is calculated as follows. Let $\tau=[\tau^0 \, \tau^1 \, \ldots \, \tau^{K-1}]^T$ then G is given by $$G = \frac{\partial C(p)}{\partial p} = \quad \text{(EQ. 23)}$$

$$\left(\frac{d\tau}{dp}\right)^T \frac{\partial C(p)}{\partial \tau} = \left(\frac{d\tau}{dp}\right)^T \left[\frac{\partial C(p)}{\partial \tau^0} \, \frac{\partial C(p)}{\partial \tau^1} \, \ldots \, \frac{\partial C(p)}{\partial \tau^{K-1}}\right]^T$$

and the derivative of G with respect to p is given by $$\frac{\partial}{\partial p}G = \frac{\partial}{\partial p}\left(\left(\frac{d\tau}{dp}\right)^T \frac{\partial}{\partial \tau}C(p)\right) = \left(\frac{d\tau}{dp}\right)^T \left[\frac{\partial^2}{\partial^2 \tau}C(p)\right]\left(\frac{d\tau}{dp}\right) = \quad \text{(EQ. 24)}$$

$$\left(\frac{d\tau}{dp}\right)^T \begin{bmatrix} \frac{\partial^2}{\partial^2 \tau^0}C(p) & \frac{\partial\partial}{\partial \tau^0 \partial \tau^1}C(p) & \frac{\partial\partial}{\partial \tau^0 \partial \tau^{K-1}}C(p) \\ \frac{\partial\partial}{\partial \tau^1 \partial \tau^0}C(p) & \ldots & \ldots \\ \frac{\partial\partial}{\partial \tau^{K-1} \partial \tau^0}C(p) & \ldots & \frac{\partial^2}{\partial^2 \tau^{K-1}}C(p) \end{bmatrix} \left(\frac{d\tau}{dp}\right)$$

Since $$\frac{\partial\partial}{\partial \tau^j \partial \tau^i}C(p) = 0$$

for $i \neq j$ then from (24) Q can be written as $$Q = \left[\frac{\partial}{\partial p}G\right]_{p=p_t,\hat{v}=v_t} = J^T \begin{bmatrix} \gamma_0 & 0 & 0 \\ 0 & \ldots & 0 \\ 0 & 0 & \gamma_{K-1} \end{bmatrix} J \quad \text{(EQ. 25)}$$

where $\gamma_i = \left[\frac{\partial^2}{\partial^2 \tau^i}C(p)\right]_{p=p_t,\hat{v}=v_t}$ and $$J = \left[\frac{d\tau}{dp}\right]_{p=p_t} = \begin{bmatrix} \frac{\partial \tau^0}{\partial x} & \frac{\partial \tau^0}{\partial y} & \frac{\partial \tau^0}{\partial z} \\ \frac{\partial \tau^1}{\partial x} & \frac{\partial \tau^1}{\partial y} & \frac{\partial \tau^1}{\partial z} \\ \vdots & \vdots & \vdots \\ \frac{\partial \tau^{K-1}}{\partial x} & \frac{\partial \tau^{K-1}}{\partial y} & \frac{\partial \tau^{K-1}}{\partial z} \end{bmatrix}_{p=p_t}. \quad \text{(EQ. 26)}$$

Note that by substituting (5) into (26) it can be shown that the i-th row of J is the normalized vector connecting the i-th reference station position and the target position.

Next we calculate F which is given by $$F = \left[\frac{\partial}{\partial v}G\right]_{p=p_t,\hat{v}=v_t} = J^T \begin{bmatrix} \frac{\partial\partial}{\partial \hat{v} \partial \tau^0}C(p) \\ \frac{\partial\partial}{\partial \hat{v} \partial \tau^1}C(p) \\ \vdots \\ \frac{\partial\partial}{\partial \hat{v} \partial \tau^{K-1}}C(p) \end{bmatrix}_{p=p_t,\hat{v}=v_t} \quad \text{(EQ. 27)}$$

where $$\frac{\partial\partial}{\partial\hat{v}\partial\tau^i}C(p)$$

is a row vector given by $$\frac{\partial\partial}{\partial\hat{v}\partial\tau^i}C(p) = \left[\frac{\partial\partial}{\partial vec(\hat{R}^0)\partial\tau^i}C(p) \quad \frac{\partial\partial}{\partial vec(\hat{R}^1)\partial\tau^i}C(p) \ldots \frac{\partial\partial}{\partial vec(\hat{R}^{K-1})\partial\tau^i}C(p)\right]$$ (EQ. 28)

and $$\frac{\partial\partial}{\partial vec(\hat{R}^i)\partial\tau^j}C(p)$$

is a row vector with the length of $vec(\hat{R}^i)$ which is $L^2$. It can be shown that $$\frac{\partial\partial}{\partial vec(\hat{R}^i)\partial\tau^j}C(p) = [0 \quad 0 \quad \ldots \quad 0]$$

for $i \neq j$ hence (27) can be written as $$F = J^T \begin{bmatrix} \left[\frac{\partial\partial}{\partial vec(\hat{R}^0)\partial\tau^0}C(p)\right]_{p=p_t,\hat{v}=v_t} & Z & Z \\ Z & \ldots & Z \\ Z & \ldots & \left[\frac{\partial\partial}{\partial vec(\hat{R}^{K-1})\partial\tau^{K-1}}C(p)\right]_{p=p_t,\hat{v}=v_t} \end{bmatrix}$$ (EQ. 29)

where Z is a row vector with zero elements and length $L^2$. (29) and (25) are substituted into (22) to provide $$E\{[\hat{p}-p_t][\hat{p}-p_t]^H\} \cong \left|J^T \begin{bmatrix} \gamma_0 & 0 & 0 \\ 0 & \ldots & 0 \\ 0 & 0 & \gamma_{K-1} \end{bmatrix} J\right|^{-1}$$ (EQ. 30)

$$J^T \begin{bmatrix} \psi_0 & 0 & \ldots & 0 \\ 0 & \psi_1 & \ldots & 0 \\ \ldots & \ldots & \ldots & \ldots \\ 0 & 0 & \ldots & \psi_{K-1} \end{bmatrix} J \left[J^T \begin{bmatrix} \gamma_0 & 0 & 0 \\ 0 & \ldots & 0 \\ 0 & 0 & \gamma_{K-1} \end{bmatrix} J\right]^{-1} \text{ where}$$

$$\psi_i = \left[\frac{\partial\partial}{\partial vec(\hat{R}^i)\partial\tau^i}C(p)\right]_{p=p_t,\hat{v}=v_t}$$ (EQ. 31)

$$R^i(\tau^i) \otimes R^i(\tau^i) \left[\frac{\partial\partial}{\partial vec(\hat{R}^i)\partial\tau^i}C(p)\right]_{p=p_t,\hat{v}=v_t}^T$$

In Appendix A it is shown that $$\psi_i = \gamma_i = Tr\left\{\left[(R^i(\tau^i))^{-1}\left[\frac{\partial R^i(\tau)}{\partial \tau}\right]_{\tau=\tau^i}\right]^2\right\}.$$ (EQ. 32)

(32) is substituted into (30) to obtain the DPE covariance given by $$E\{[\hat{p}-p_t][\hat{p}-p_t]^H\} \cong \left[J^T \begin{bmatrix} \psi_0 & 0 & 0 \\ 0 & \ldots & 0 \\ 0 & 0 & \psi_{K-1} \end{bmatrix} J\right]^{-1}$$ (EQ. 33)

and the DPE MSE given by $$E\{\|\hat{p}-p_t\|^2\} \cong Tr\left\{\left[J^T \begin{bmatrix} \psi_0 & 0 & 0 \\ 0 & \ldots & 0 \\ 0 & 0 & \psi_{K-1} \end{bmatrix} J\right]^{-1}\right\}$$ (EQ. 34)

Under small error conditions the MSE of the ML TOA estimation that maximizes the TOA likelihood function in (13) is given by [14]

$$E\{(\hat{\tau}^k-\tau^k)^2\} \cong \frac{1}{\psi_k}$$ (EQ. 35)

Let $\hat{p}_{ie}$ be the IPE. It has been shown [18] that under the assumption of small error in the TOA estimation, the covariance of the IPE error is given by $$E\{[\hat{p}_{ie}-p_t][\hat{p}_{ie}-p_t]^H\} \cong Tr\{[J^TW^1J]^{-1}\}$$ (EQ. 36)

where $$W = E\left\{\begin{bmatrix}(\hat{\tau}^0-\tau^0)\\(\hat{\tau}^1-\tau^1)\\ \vdots \\(\hat{\tau}^{K-1}-\tau^{K-1})\end{bmatrix}[(\hat{\tau}^0-\tau^0) \ (\hat{\tau}^1-\tau^1) : (\hat{\tau}^{K-1}-\tau^{K-1})]\right\}$$ (EQ. 37)

Since the received signals at different reference stations are statistically independent and the TOA error is assumed unbiased then $E\{(\hat{\tau}^i-\tau^i)(\hat{\tau}^j-\tau^j)\}=0$ for $i \neq j$. Thus the IPE covariance can be written as $$E\{[\hat{p}_{ie}-p_t][\hat{p}_{ie}-p_t]^H\} \cong$$ (EQ. 38)

$$Tr\left\{\left[J^T \begin{bmatrix} 1/E\{(\hat{\tau}^0-\tau^0)^2\} & 0 & 0 \\ 0 & \ldots & 0 \\ 0 & 0 & 1/E\{(\hat{\tau}^{K-1}-\tau^{K-1})^2\} \end{bmatrix} J\right]^{-1}\right\}$$

(33), which is the covariance of the DPE, is obtained by substituting (35) into (38).

The above proves that when the small error conditions holds for both DPE and IPE then there performance are equal.

It is noted that there is a difference between the small error conditions for which the covariance expressions of DPE and IPE given in (33) and (38) respectively are accurate. The SNR for which the small error is valid is far lower for the DPE than for the IPE. Thus, the performance of the DPE and IPE consolidate only at high SNR. It is also noted that even at low SNR the small error approximation is valid for the DPE and the analysis is expected to give a good approximation.

In case the TOA estimation MSE is equal to all reference stations then (34) can be written as $$E\{\|\hat{p}-p_t\|^2\} \cong E\{(\hat{\tau}^k-\tau^k)^2\} \times \text{GDOP}^2 \quad \text{(EQ. 39)}$$

where GDOP is the geometric dilution of precision factor given by $\text{GDOP} = \sqrt{\text{Tr}\{[J^T J]^{-1}\}}$. The GDOP is the ratio between the root mean square errors of the location and the TOA estimations. It gives a relation between the position estimation error gain and the spatial geometry of the reference stations and target positions [18].

Results and Discussion

Figure 12:
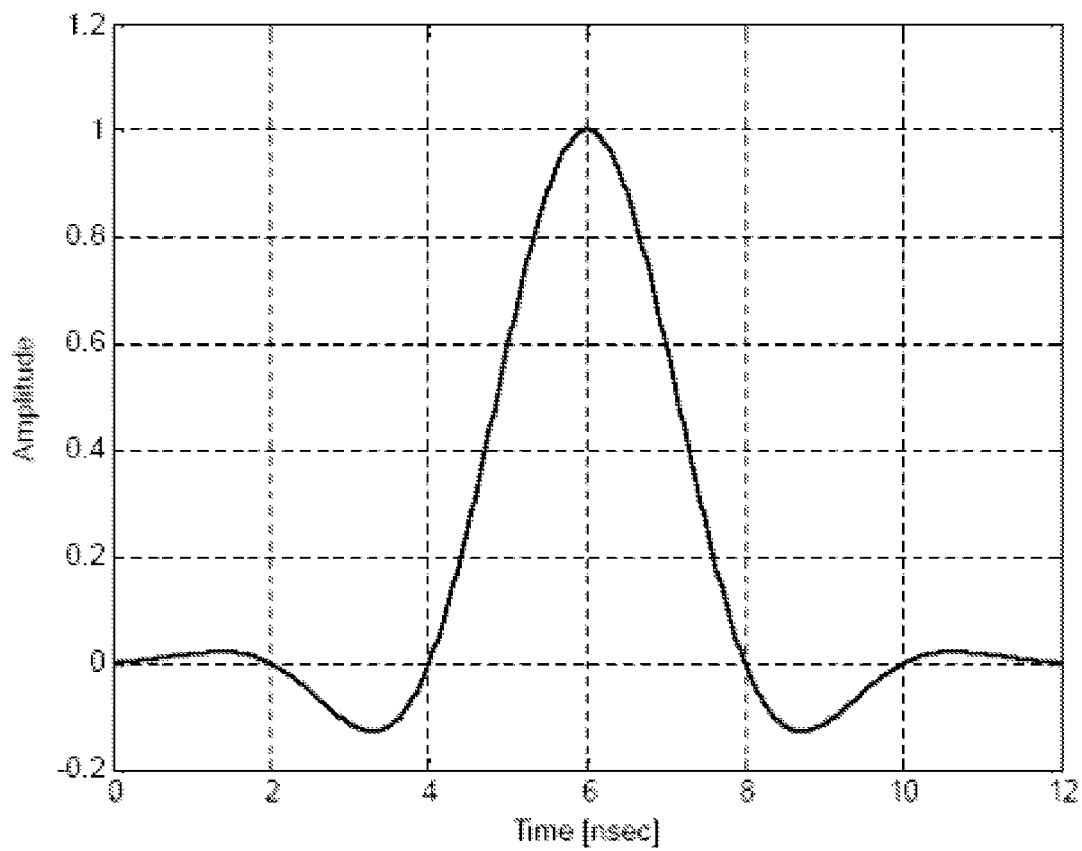
FIG. 12 shows a signal used in further computer simulations executed according to some embodiments of the present invention.

The performance of the developed DPE was tested with Monte Carlo simulation. The reference stations and target where placed in a 50×50×50 meters cubic volume and each received signal was obtained by filtering the transmitted pulse with a multipath realization taken from channel model 3 of the UWB channel models proposed by the IEEE 802.15.4a study group [6]. This channel models an indoor office environment with relatively dense multipath. The impulse response of the target transmitted signal is presented in FIG. 12. The total pulse duration is 12 ns. The width of its effective energetic duration is 2 ns, which means that the signal energy in this width contains most of the signal energy. The received signal was sampled at 1 Ghz. The performance criterion was the position error root mean square error RMSE vs SNR where $\text{RMSE} = \sqrt{E\{\|\hat{p}-p\|^2\}}$ and $\text{SNR} = (\Sigma_{n=-\infty}^{\infty}|q_n|^2)/\sigma_v^2$. The RMSE of the DPE given in (14) was compared to the traditional least squares IPE. In the first step of the IPE the TOA of each reference station was estimated by maximizing the approximate TOA likelihood function given in (11). This TOA estimation method showed to give good results and outperform other conventional TOA estimation methods in multipath conditions [14]. In the second step the position was estimated by $$\hat{p}_{IPE} = \arg\min_p \sum_{k=0}^{K-1} (\hat{\tau}^k - \tau^k)^2 \quad \text{(EQ. 40)}$$

where $\hat{\tau}^k$ are the estimated time of arrivals and $\tau^k$ are the time of arrivals corresponding to the position hypothesis. For both direct and indirect estimators the cost functions were minimized by first performing a coarse search for three initial estimations (per each method) that attain minimum cost function. The coarse search was over the entire cube dimension of 50×50×50 meter with 1 meter spacing. Then a fine grid search with 10 cm spacing was performed over cubes with dimension 1×1×1 meter centered at each initial estimation. We have verified that the coarse grid search spacing is small enough so that it does not degrade the estimation performance.

Figure 13:
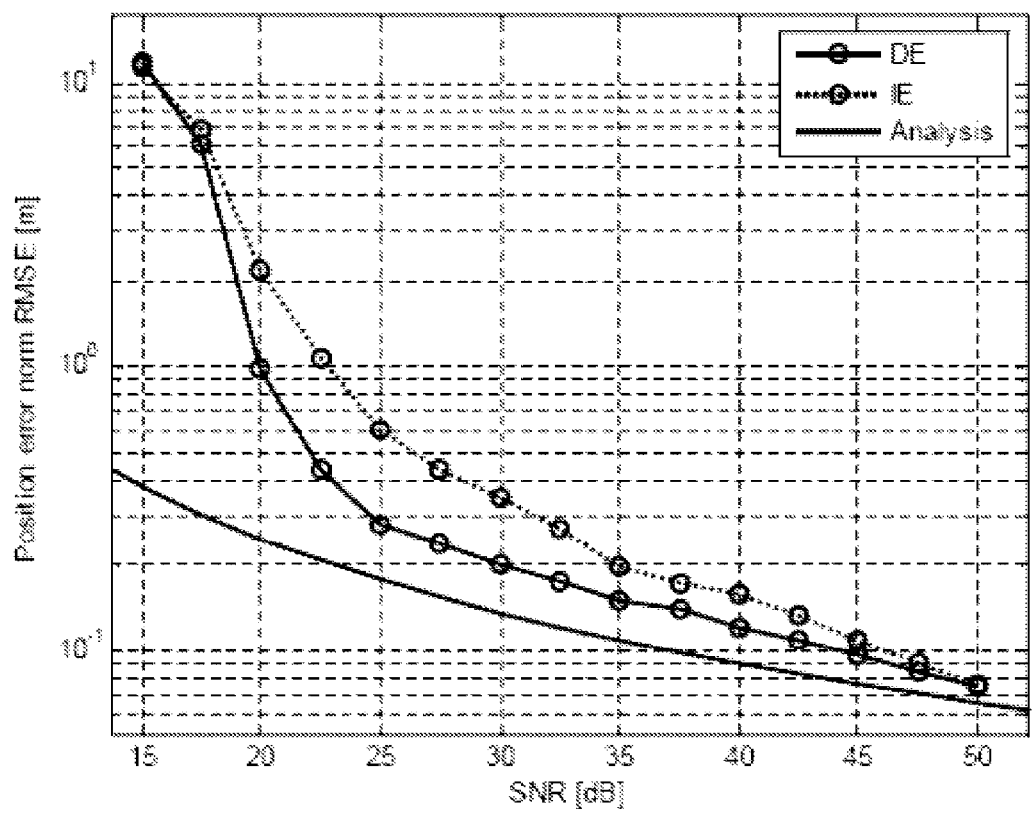
FIG. 13 shows the root mean square error (RMSE) as a function of the signal to noise ratio (SNR), as obtained by computer simulations performed according to some embodiments of the present invention for four reference stations and a target located at (25,25,25)m.
Figure 14:
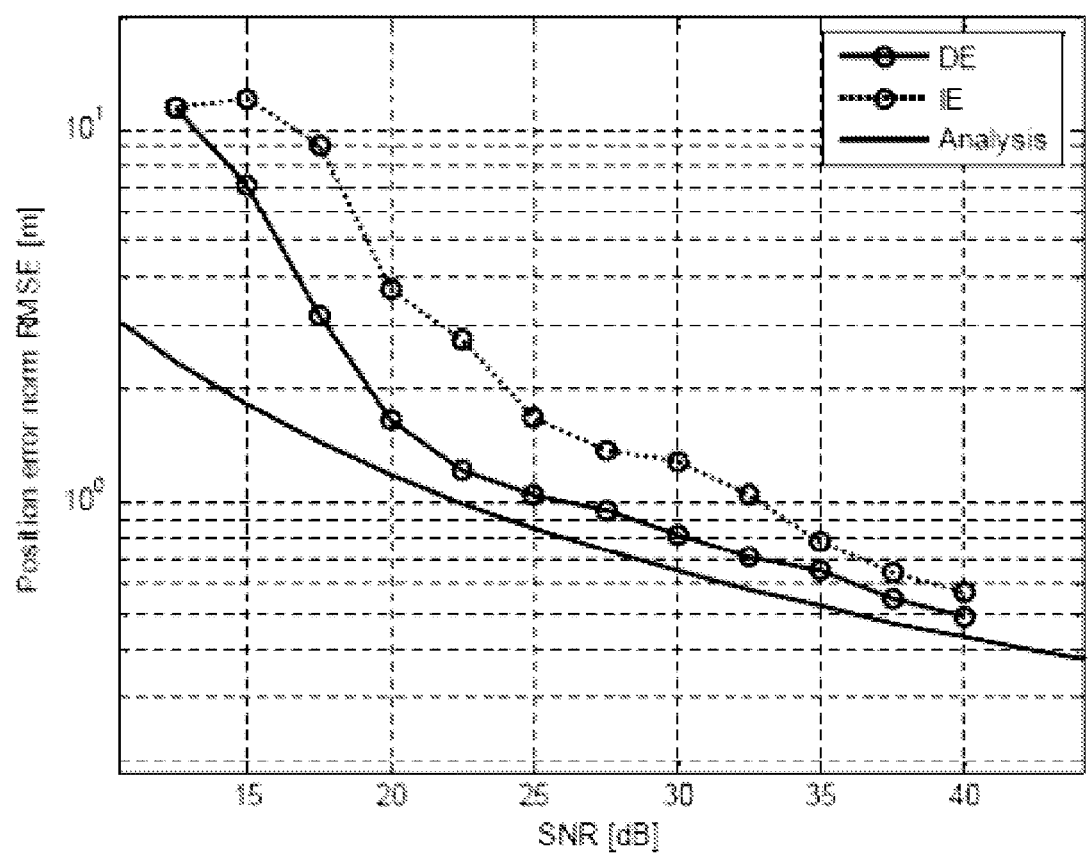
FIG. 14 shows the root mean square error (RMSE) as a function of the signal to noise ratio (SNR), as obtained by computer simulations performed according to some embodiments of the present invention for six reference stations and a target located at (25,25,25)m.

FIGS. 13 and 14 show RMSE vs SNR results obtained when the reference stations were located at the four upper corners of the cubic volume which are (0,0,50)m, (50,0,50)m, (0,50,50)m, (50,50,50)m and two different target locations (25,25,25)m and (25,25,47.5)m, respectively. The target get at (25,25,25)m has GDOP=1.5 which is low compared to the other target position with GDOP=7.15.

As shown, for any SNR or method, the point with the higher GDOP has larger RMSE. The RMSE is monotonically reducing as the SNR increases in both methods. However, the RMSE of DPE is significantly lower than IPE at low SNR and the gap diminishes as the SNR increases. At SNR values between 17.5 and 22.5 dB the RMSE of DPE is about 2.5 times lower than IPE. For SNR values between 25 dB and 35 dB the RMSE reduction factor is about 1.5 and for SNR higher than 40 dB the RMSE of both methods consolidate. A comparison of the SNR for the same RMSE, reveals about 5 dB or 3 dB advantage for the DPE for SNR in the range 17.5-35 dB, for GDOP=7.15 and GDOP=3 dB, respectively.

The analytical RMSE expression given by the square root of the expression in (34) lower bounds the simulation results. The bound becomes tighter as the SNR increases, but a small constant gap remains. Both the DPE and the IPE converge close to the small error approximation at high enough SNR starting from some SNR threshold, but the SNR threshold of DPE is far less in the DPE than the IPE. The analysis gives a good approximation to the DPE simulation results for SNR>25 dB in FIG. 13 and SNR>20 dB in FIG. 14 and to the IPE results only for SNR>40 dB in both figures.

Figure 15:
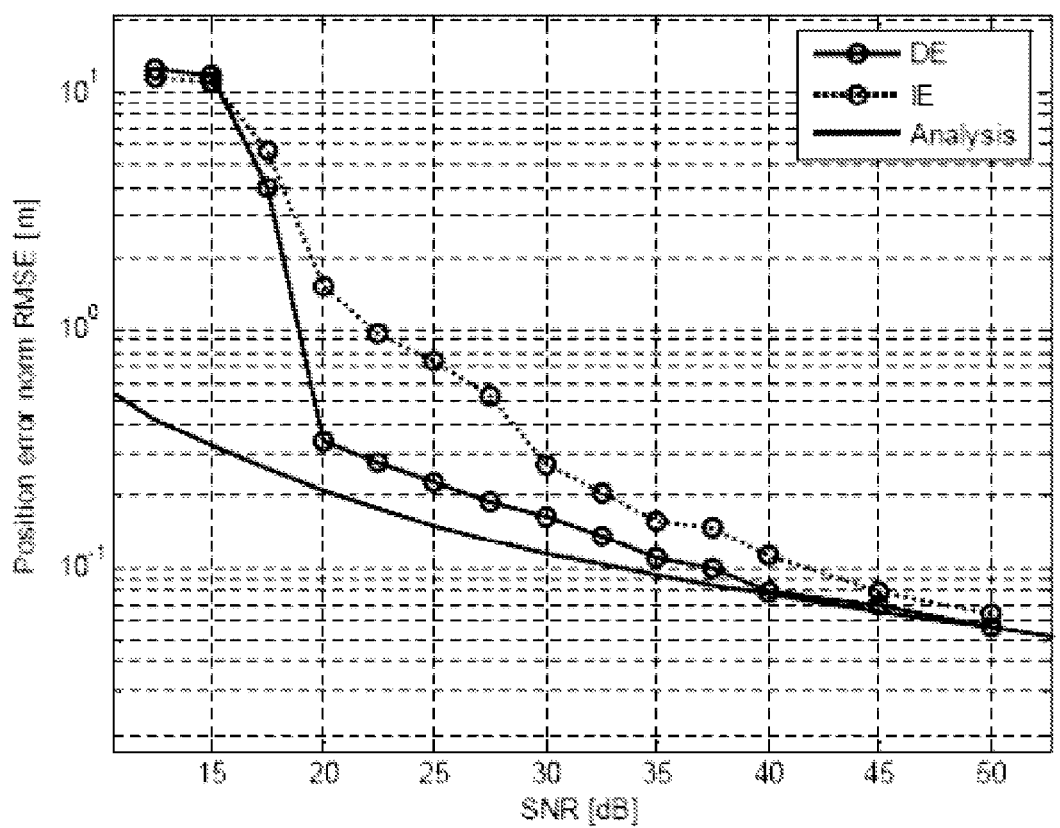
FIG. 15 shows the root mean square error (RMSE) as a function of the signal to noise ratio (SNR), as obtained by computer simulations performed according to some embodiments of the present invention for four reference stations and a target located at (25,25,47.5)m.
Figure 16:
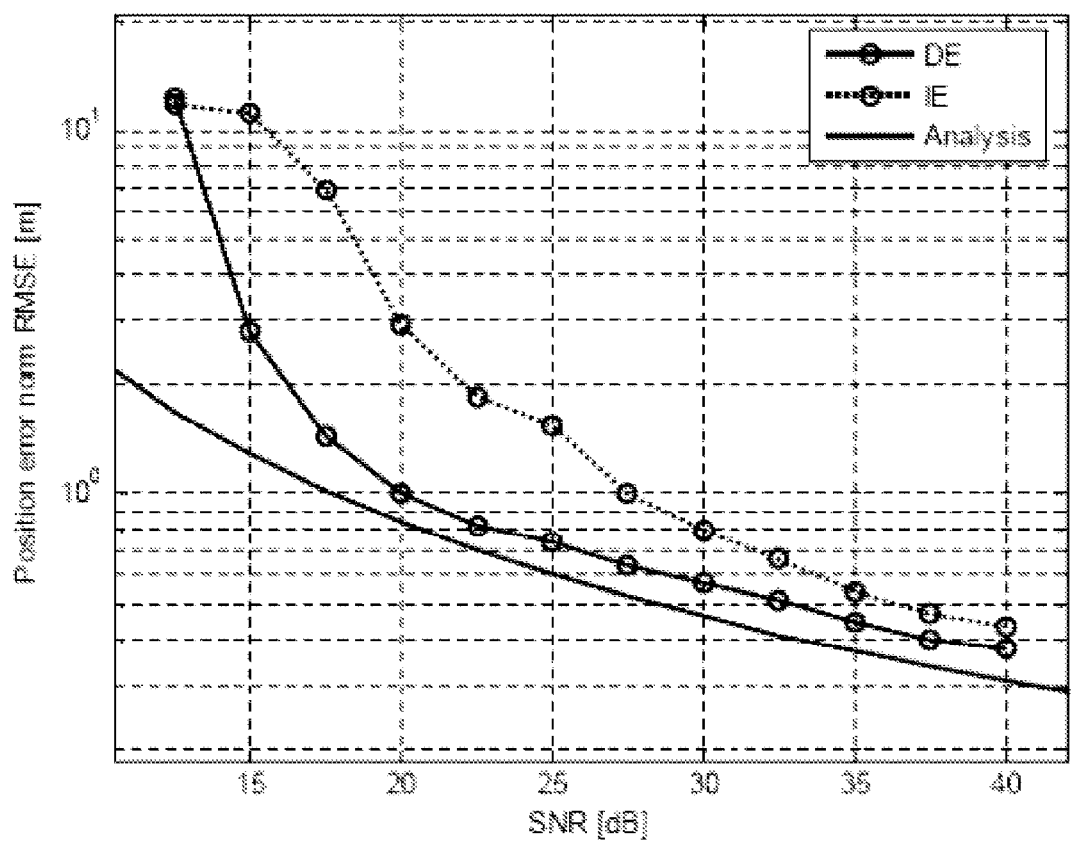
FIG. 16 shows the root mean square error (RMSE) as a function of the signal to noise ratio (SNR), as obtained by computer simulations performed according to some embodiments of the present invention for six reference stations and a target located at (25,25,47.5)m.

FIGS. 15 and 16 show RMSE vs SNR results for the same target and reference stations positions as FIGS. 13 and 14, respectively, with two additional reference stations located at (25,50,50)m and (25,0,50)m. Thus there were all-together six reference stations. The GDOP values for target locations (25,25,25) and (25,25,47.5) are 1.26 and 5.09, respectively. Compared to the results in FIGS. 13 and 14 the RMSE reduction of DPE is larger than of IPE at low SNR. At low SNR the RMSE of DPE is 3 times smaller than IPE. For SNR<30 dB IPE achieves the RMSE of DPE with SNR larger by about 7.5 dB. For SNR>35 dB the performance of DPE and IPE consolidate. The RMSE analysis gives a good approximation to simulation results for SNR>20 dB and SNR>17.5 dB in FIGS. 15 and 16 respectively. These SNR values are smaller by 2.5 and 5 dB compared to the results in FIGS. 13 and 14, respectively. At high SNR there is no noticeable gap between the analysis and simulation results of the target with GDOP=1.26 and for the target with GDOP=5.09 a small gap remains similarly to the results in FIG. 14. It is important to note that a substantial performance gap between DPE and IPE was also observed over other multipath channel models from the IEEE 802.15.4a study group [6] as well as other target and reference stations positions. These results are not presented here due to space limitations.

The results in FIGS. 13-16 show that the DPE attains significant improved position estimation performance compared to IPE at wide SNR range, and that the improvement diminishes with increasing SNR. The performance gap is increased with the increase of the number of reference stations from 4 to 6. The analytical RMSE expression in (34) closely lower bounds the DPE RMSE for most of the interest SNR range at which the position estimation error is smaller than a few meters.

The effect of the number of reference stations will now be discussed. As the number of reference stations increase, there are two contradicting effects that contribute to the performance gap between DPE and IPE. The first is the increase in the probability of a large TOA estimation error (in the first step of IPE) since there are more TOA estimations. The second effect is that the influence of each individual TOA estimation error on the indirect positioning cost function reduces as the number of reference stations increase. The first effect increases the gap and the second effect reduces it. The results presented in this Example show that when increasing the number of reference stations from four to six the performance gap between the direct and indirect methods increases hence the first effect is more dominant.

Without wishing to be bound to any theory, it is assumed that the high GDOP value of the target at (25,25,47.5)m compared to the target at (25,25,25)m is the reason for the analysis small gap from simulation results at high SNR reduced when increasing the number of reference stations from four to six only for the target at (25,25,25)m. As the GDOP increases the effect of the reference stations on the position error is less equal. In case of high GDOP, some reference stations contribute to the position error with larger weight than others. The fact that the increase in the number of reference stations from four to six did not reduce significantly the GDOP of the target at (25,25,47.5)m indicates that the weights of the additional two readers are low compared to the original four reference stations. Thus, when increasing the number of reference stations from four to six the effective number of reference stations for the target at (25,25,47.5)m did not grow as for the target at (25,25,25) which has low GDOP.

Appendix A

Proof of (32)

The derivative of the cost function in (16) with respect to $\tau^k$ is given by $$\frac{\partial C(p)}{\partial \tau^k} = \frac{\partial}{\partial \tau^k}\left[\ln(|R^k(\tau^k)|) + Tr\{(R^k(\tau^k))^{-1}\hat{R}^k\}\right] = \quad \text{(EQ. 41)}$$

$$Tr\left[(R^k(\tau^k))^{-1}\frac{\partial R^k(\tau^k)}{\partial \tau^k} - (R^k(\tau^k))^{-1}\frac{\partial R^k(\tau^k)}{\partial \tau^k}(R^k(\tau^k))^{-1}\hat{R}^k\right]$$

The derivative of (41) with respect to $\tau^k$ is given by $$\frac{\partial^2 C(p)}{\partial^2 \tau^k} = Tr\left\{\left[(R^k(\tau^k))^{-1}\frac{\partial R^k(\tau^k)}{\partial \tau^k}\right][2(R^k(\tau^k))^{-1}\hat{R}^k - I] + \quad \text{(EQ. 42)}$$

$$\Gamma[I - (R^k(\tau^k))^{-1}\hat{R}^k]\right\}$$

where $$\Gamma = \left[(R^k(\tau^k))^{-1}\frac{\partial^2 R^k(\tau^k)}{\partial^2 \tau^k}\right].$$

By substituting $\hat{R}^k = R^k(\tau^k)$ into (42) we obtain $\gamma_k$ given by $$\gamma_k = \left[\frac{\partial^2}{\partial^2 \tau^k}C(p)\right]_{p=p_t,\hat{v}=v_t} = Tr\left\{\left[(R^k(\tau^k))^{-1}\left[\frac{\partial R^k(\tau)}{\partial \tau}\right]_{\tau=\tau^k}\right]^2\right\} \quad \text{(EQ. 43)}$$

$\psi_k$ of (31) is derived as follows. From (41), the following can be derived $$\frac{\partial}{\partial vec(\hat{R}^i)}\left[\frac{\partial C(p)}{\partial \tau^i}\right] = \quad \text{(EQ. 44)}$$

$$\frac{\partial}{\partial vec(\hat{R}^i)}Tr\left[-(R^k(\tau^k))^{-1}\frac{\partial R^k(\tau^k)}{\partial \tau^k}(R^k(\tau^k))^{-1}\hat{R}^k\right]$$

$$A = (R^k(\tau^k))^{-1}\frac{\partial R^k(\tau^k)}{\partial \tau^k}(R^k(\tau^k))^{-1} \quad \text{(EQ. 45)}$$

then $$\frac{\partial}{\partial vec(\hat{R}^i)}Tr\left[-(R^k(\tau^k))^{-1}\frac{\partial R^k(\tau^k)}{\partial \tau^k}(R^k(\tau^k))^{-1}\hat{R}^k\right] = \quad \text{(EQ. 46)}$$

$$\frac{\partial}{\partial vec(\hat{R}^k)}\sum_{i=0}^{L-1}\sum_{j=0}^{L-1}A_{i,j}\hat{R}^k_{j,i} = -vec(A)^T$$

where $A_{i,j}$ and $\hat{R}_{j,i}^k$ are the elements in the i-th row and j-th column of A and $\hat{R}^k$, respectively. (46) is substituted into (31) to provide $$\psi_k = vec(A)^T R^k(\tau^k) \otimes R^k(\tau^k) vec(A) \quad \text{(EQ. 47)}$$

Using linear algebra equalities [17] (47) can be written as $$\psi_k = vec(A)^T vec(R^k(\tau^k)AR^k(\tau^k)) = Tr(A^T R^k(\tau^k)AR^k(\tau^k)) \quad \text{(EQ. 48)}$$

(32) is then obtained by substituting (45) into (48) and comparing the result to (43).

References

[1] S. Gezici and H. V. Poor "Position Estimation via Ultra-Wide-Band Signals", Proceeding of the IEEE, vol. 97, no. 2, pp. 386-403, February 2009.

[2] S. Gezici et al. "Localization via Ultra-Wideband Radios", IEEE Signal Processing Magazine, pp. 70-84, July 2005.

[3] A. M. Saleh and R. A. Valenzuela, "A Statistical Model for Indoor Multipath Propagation," IEEE J. Selected. Areas Commun., vol. SAC-5, no. 2, pp. 128-137, February 1987.

[4] A. F. Molisch, "Ultrawideband Propagation Channels—Theory, Measurements, and Modeling," IEEE Trans. on Vehicular Technology, vol. 54, no. 5, pp. 1528-1545, September 2005.

[5] A. F. Molisch et al., "A Comprehensive Standardized Model for Ultrawideband Propagation Channels," IEEE Trans. on Antennas and Propagation, vol. 54, no. 11, pp. 3151-3166, November 2006

[6] A. F. Molisch et al., "IEEE 802.15.4a channel model-Final report," September 2004.

[7] I. Guvenc and C. C. Chong, "A Survey on TOA Based Wireless Location and NLOS Mitigation Techniques", IEEE Comm Surveys and Tutorials, vol. 11, no. 3, pp. 107-124, 2009.

[8] K. W. K. Lui, H. C. So and W. K. Ma, "Maximum A Posteriori Approach to Time-of-Arrival-Based Localization in Non-Line-of-Sight Environment", IEEE Trans. on Vehicular Technology, vol. 53, no. 3, pp. 1517-1523, Match 2010.

[9] P. C. Chen, "A non-line-of-sight error mitigation algorithm in location estimation", in Proc. IEEE Int. Conf. Wireless Commun. Netw. (WCNC), vol. 1, pp. 316-320, September 1999.

[10] A. Al-Jazzar and J. J. Caffery, "ML and Bayesian TOA location estimators for NLOS environments", in Proc. IEEE Veh. Technol. Conf. (VTS), vol. 2, pp. 1178-1181, September 2002.

[11] Y. T. Chan, H. Y. Chin Hang and Pak-chung Ching, "Exact and Approximate Maximum Likelihood Localization Algorithms", IEEE Trans. on Vehicular Technology, vol. 55, no. 1, pp. 10-16, January 2006.

[12] A. J. Weiss, "Direct Position Determination of Narrowband Radio Frequency Transmitters", IEEE Signal Processing Letters, vol. 11, no. 5, May 2004.

[13] M. Rydstrom, L. Reggiani, E. G. Strom, and A. Svensson, "Suboptimal Soft Ranging Estimators With Applications in UWB Sensor Networks", IEEE Trans. on Signal Processing, vol. 56, no. 10, pp. 4856-4866, October 2008.

[14] See Example 1

[15] J. E. Dennis, Jr. and B. Schnabel, Numerical Methods for Unconstrained Optimization and Non-linear Equations, Englewood Cliffs, N.J.: Prentice-Hall, 1983.

[16] A. J. Weiss and B. F. Friedlander, "Performance Analysis of Spatial Smoothing with Interpolated Arrays," IEEE Tans. Signal Processing, vol. 41, no. 5, May 1993.

[17] D. S. Bernstein, Matrix Mathematics Theory Facts and Formulas, Second edition, Princeton University Press, 2009.

[18] R. B. Langley, "Dilution of Precision", GPS World, pp. 52-59, May 1999.

Example 3

Use of Correlated Diversity

TOA Estimation

Following is an exemplified derivation of the TOA estimator for the case in which the diversity information comprises data received from a plurality of correlated channels of a respective reference station Let $y^0, y^1, \ldots, y^{K-1}$ be K received signal column vectors, each being a different multipath vector. Two or more of the vectors can correspond to the same reference station (for example, the same reference station can transmit in K different frequencies). Collectively, the vectors constitute a diversity scheme. Herein, the vectors $y^0, \ldots, y^{K-1}$ are referred to as realization vectors.

In the present Example, the K realizations are correlated but all are assumed to have the same time of arrival. Given the TOA each vector $y^k$ is assumed to have a Gaussian distribution. Let $\tilde{y} = [(y^0)^T (y^1)^T \ldots (y^{K-1})^T]^T$ be a concatenation of all the received vectors and $\tilde{R} = E\{\tilde{y}\tilde{y}^H\}$ be the autocorrelation of $\tilde{y}$. The vector $\tilde{y}$ is assumed to be a Gaussian vector hence the Maximum Likelihood TOA estimation for this case is given by $$\hat{\tau} = \arg\max_\tau f(y^0, y^1, \ldots, y^{K-1} \mid \tau) = \frac{1}{\pi^N |\tilde{R}(\tau)|} e^{-\tilde{y}^H \tilde{R}^{-1}(\tau) \tilde{y}}$$

Applying a logarithm and eliminating insignificant terms the following expression is obtained:

$$\hat{\tau} = \arg\min_\tau \{\ln(|\tilde{R}(\tau)|) + \tilde{y}^H \tilde{R}^{-1}(\tau)\tilde{y}\} \quad (1)$$

In cases in which the K realizations are all with the same multipath but different noise measurements, the TOA estimation in (1) results in $$\hat{\tau} = \arg\min_\tau \{K \ln(|R(\tau)|) + z^H R^{-1}(\tau) z\} \quad (2)$$

where $$z = \sum_{k=0}^{K-1} (\tilde{y}^k)$$

and $R(\tau) = E\{y^0 (y^0)^H\}$.

Position Estimation

Following is an exemplified derivation of the direct position estimator for a situation in which there is more than one received signal per each link between a reference station and the object. Let there be Q reference stations, wherein the qth station features a rank—$K_q$ diversity scheme (for example, the station can transmit in $K_q$ different frequencies).

Let $\Omega^q = [y_q^0 \; y_q^1 \; \ldots \; y_q^{K_q-1}]$ be the set of vectors obtained per link between the target and the q-th reference station. These vectors are referred to as realization vectors. Thus subscript q of y is the reference station index (denoting the link between the target and the q-th reference station) and the superscript of y is the realization index. The vectors in $\Omega^q$ may be all received at the reference station or all at the object or part at the target and part at the reference station. Let p be the position vector. The direct position maximum likelihood estimator is given by $$\arg\max_p = f(\Omega^0, \Omega^1, \ldots, \Omega^{Q-1} \mid p) \quad (3)$$

It is assumed that $\Omega^i$ and $\Omega^j$ are independent for $i \neq j$ hence (3) can be written as $$p = \arg\max_P = \prod_{q=0}^{Q-1} f(\Omega^q \mid p) \quad (4)$$

Applying a logarithm to (4) the following expression is obtained:

$$p = \arg\max_P = \prod_{q=0}^{Q-1} \ln(f(\Omega^q \mid p)) \quad (4a)$$

Following is a derivation of $\ln(f(\Omega^q \mid p))$ in (4a) for the general case that the $K_q$ vectors in $\Omega^q$ have joint Gaussian distribution.

Let $\tilde{y}_q = [(y_q^0)^T (y_q^1)^T \ldots (y_q^{K_q-1})^T]^T$ be a concatenation of all vectors in the set $\Omega^q$ and $\tilde{R}_q = E\{\tilde{y}_q \tilde{y}_q^H\}$ be the autocorrelation of $\tilde{y}_q$. Then $$\ln(f(\Omega^q \mid p)) = -N_q \ln(\pi) - \ln(|\tilde{R}_q(\tau)|) - \tilde{y}_q^H \tilde{R}_q^{-1}(\tau)\tilde{y}_q \quad (5)$$

where $N_q$ is the length of $\tilde{y}_q$.

Then the Maximum Likelihood direct position estimator is given by $$\hat{p} = \arg\min_P = \sum_{q=0}^{Q-1} \ln(|\tilde{R}_q(\tau)|) + \tilde{y}_q^H \tilde{R}_q^{-1}(\tau) \hat{y}_q \quad (6)$$

When the realizations of $\Omega^q$ are independent then (5) can be written as:

$$\ln(f(\Omega^q \mid p)) =$$

$$\sum_{k=0}^{K_q} \ln(f(y_q^k \mid p)) = -N_q \ln(\pi) - K_q \ln(|R_q(\tau)|) - \sum_{k=0}^{K_q} (y_q^k)^H R_q^{-1}(\tau) y_q^k$$

where $R_q(\tau) = E\{y_q^k (y_q^k)^H\}$.

When the realizations of the reference stations have identical multipath but different noise measurements then $$\ln(f(\Omega^q|p)) = -N_q \ln(\pi) - K_q \ln(|R_q(\tau)|) - z_q^H R_q^{-1}(\tau) z_q$$

where $$z_q = \sum_{k=0}^{K_q-1} (y_q^k)$$

and $R_q(\tau) = E\{y_q^0 (y_q^0)^H\}$.

Example 4

Unsynchronized Signals

In this example a general expression for the TOA likelihood is derived and then used for solving direct position estimation for various synchronization conditions.
Solution of the TOA Likelihood Function A wideband pulse signal, which is assumed known to the receiver, is transmitted through a multipath channel and observed with additive white Gaussian complex noise. The samples of the received signal are given by $$y_n = \sum_{m=0}^{M-1} \alpha_m x(nT_s - \tau_m) + v_n \quad \text{(EQ. 1)}$$

where $v_n$ are statistically independent complex Gaussian noise samples with zero mean and variance $\sigma_v^2$, $x(t)$ is the convolution between the transmitted pulse and the receiver's filters, M is the number of multipath components, $\alpha_m$ and $\tau_m$ are the complex coefficient and the delay of the m-th arrival multipath component, respectively. Both $\alpha_m$ and $\tau_m$ are statistically independent. The notation of the first arrival time, $\tau_0$, will often be replaced by $\tau$ for simplifying the exhibition.

Let $y = [y_0 \, y_1 \, \ldots \, y_{L-1}]^T$ be a vector of length L containing the receiver's observation window samples. Without loss of generality, it is assumed that the beginning of the observation window is at time t=0. Note that $\tau$, the first arrival time with respect to the beginning of the observation window, is a real number. Let $N_\tau$ be the integer index of the first sample within the observation vector y that contains the multipath signal, thus, $(N_\tau-1)T_s < \tau \leq N_\tau T_s$. The observation vector y can be partitioned into two segments $y = [y_0^T \, y_1^T]^T$ such that the first segment $y_0 = [y_0 \, y_1 \, \ldots \, y_{N_\tau-1}]^T$ contains only noise samples, and the second segment $y_1 = [y_{N_\tau} \, y_{N_\tau+1} \, \ldots \, y_{L-1}]^T$ contains the received multipath first cluster plus noise samples as demonstrated in FIG. 3. It is assumed that the segment $y_1$ terminates at the end of the first multipath cluster. Let $v = [v_{N_\tau} \, v_{N_\tau+1} \, \ldots \, v_{L-1}]^T$ be the noise samples in $y_1$ then from (1) $y_1$ can be written as a sum of statistically independent vectors so that $$y_1 = \sum_{m}^{M_y-1} \eta_m + v \quad \text{(EQ. 2)}$$

where $\eta_m = \alpha_m [x(N_\tau T_s - \tau_m) \, x((N_\tau+1)T_s - \tau_m) \, \ldots \, x((L-1)T_s - \tau_m)]^T$ and $M_y$ is the number of multipath components included in $y_1$. The vectors $\eta_m$ are statistically independent since $\alpha_m$ and $\tau_m$ are statistically independent. The central limit theorem (CLT) for random vectors states that the sum of independent random vectors is a Gaussian vector when the number of the summed vectors approaches infinity. The number of non zero elements in the summation for each term of $y_1$ is proportional to the density of the multipath delays $(\tau_m)$ within the duration of x(t). The density is assumed to be large enough to justify the development of the TOA likelihood function based on the Gaussian approximation. Simulation performed by the present inventors show that in practice only three terms were enough to justify the Gaussian approximation.

For each single observation vector y the segments prior and following time $\tau$ are statistically independent hence $$f(y|\tau) = f(y_0|\tau) f(y_1|\tau) \quad \text{(EQ. 3)}$$

The noise samples in $y_0$ are independent complex Gaussian random variable with zero mean, variance $\sigma_v^2$ and independent real and imaginary components and the $L-N_\tau$ samples in $y_1$ are assumed to have Gaussian distribution hence the TOA likelihood function in (3) is given by $$f(y|\tau) = \left[\prod_{n=0}^{N_\tau-1} \frac{1}{\pi\sigma_v^2} e^{-\frac{|y_n|^2}{\sigma_v^2}}\right] \frac{1}{\pi^{(L-N_\tau)}|R_1(\tau)|} e^{-y_1^H R_1^{-1}(\tau) y_1} \quad \text{(EQ. 4)}$$

where $R_1(\tau)$ is the autocorrelation matrix of $y_1$ which is dependent on the value of $\tau$. Denote by $R_1^{i,j}(\tau)$ the element in the i-th row and j-th column of $R_1(\tau)$ which is given by $$R_1^{i,j}(\tau) = E\{y_{N_\tau+i} y^*_{N_\tau+j} | \tau\} = \int_{t=\tau}^{\infty} \sigma_h^2(t) x((N_\tau+i)T_s-t) x((N_\tau+j)T_s-t) dt + \sigma_v^2 \delta_K(i-j) \quad \text{(EQ. 5)}$$

where $x(\mu)$ initiates at $\mu=0$, $\delta_K(n)$ is the Kronecker delta and $\sigma_h^2(t)$ is the channel power delay profile, i.e. the average power vs delay.
TOA Estimation Algorithm The TOA ML estimator, assuming the receiver obtains K independent observation vectors $y^0, y^1, \ldots, y^{K-1}$, all with the same TOA, is given by $$\hat{\tau} = \arg\max_\tau f(y^0, y^1, \ldots, y^{K-1} | \tau) = \arg\max_\tau \prod_{k=0}^{K-1} f(y^k | \tau) \quad \text{(EQ. 6)}$$

Typically, K=1 but diversity can be used to obtain K>1 vectors. Substituting (4) into (6), applying a logarithm to the result, and eliminating insignificant terms the following Gaussian Model ML TOA estimator (GE) is obtained:

$$\hat{\tau}_{GE} = \arg\min_\tau \left\{ \sum_{k=0}^{K-1} N_\tau \ln(\sigma_v^2) + \frac{1}{\sigma_v^2} \|y_0^k\|^2 + \ln(|R_1(\tau)|) + (y_1^k)^H R_1^{-1}(\tau) y_1^k \right\} \quad \text{(EQ. 7)}$$

where $\|Y\|^2$ denotes the squared norm of the vector Y. The optimal combination of K independent observations is thus realized as the sum of their metrics.

The TOA estimator in (7) was derived based on the assumption that the observation vector y is a Gaussian vector. In simulations performed by the preset inventors it was found that the results are very close to the EML even for average density of only few paths within the pulse duration (x(t)).

The noise variance can be estimated by averaging the energy of the samples received long before the signal arrival time and $\sigma_n^2(t)$ can be approximate as constant within $y_1$ and then estimated by first evaluating the ratio between the energy of $y_1$ and its duration and then subtracting the noise variance from the result.

To further simplify the implementation of the GE given in (7) $y_1$ is further partitioned into two sub-segments $y_1 = [\mathbf{1}_{1,0}^T\, y_{1,1}^T]^T$ where $y_{1,0} = [y_{N_\tau}\, y_{N_\tau+1}\, \cdots\, y_{N_\tau+d-1}]^T$, $y_{1,1} = [y_{N_\tau+d}\, y_{N_\tau+d+1}\, \cdots\, y_{L-1}]^T$ and d is the number of samples within the duration of $x(t)$. An approximation to the GE estimator is derived by approximating the segments $y_{1,0}$ and $y_{1,1}$ as statistically independent and obtained the approximate GE (AGE) is given by $$\hat{\tau}_{AGE} = \operatorname*{argmin}_{\tau}\left\{\sum_{k=0}^{K-1} \gamma + \frac{1}{\sigma_v^2}\|y_0^k\|^2 + (y_{1,0}^k)^H R_{1,0}^{-1}(\tau - N_\tau) y_{1,0}^k + \|\tilde{y}_{1,1}^k\|^2\right\} \quad \text{(EQ. 8)}$$

where $\tilde{y}_{1,1}$ is the result of linear convolution between $y_{1,1}$ and a high pass filter, $R_{1,0} = E\{y_{1,0} y_{1,0}^H\}$, $\gamma = N_\tau(\ln(\sigma_v^2) - \rho)$ and $\rho$ is a constant.

The TOA estimator in (8) is simple to implement and has relatively low implementation complexity. The dimension of $R_{1,0}$ is d×d which is fixed and small compared to the dimension $(L-N_\tau)\times(L-N_\tau)$ of $R_1$ and hence the complexity of the TOA estimator in (8) is linearly dependent on L (the length of y) while the complexity of (7) grows with the third power of L. The complexity of the AGE is on the order of the complexity of the simplest TOA estimation methods. These methods are based on comparing the signal energy to a threshold.

The present inventors have developed an analytical expression that approximates the mean square error of the GE estimator in (7) under the assumption that the error is small. This condition holds as the number of independent measurements of the TOA grows which in our case means increasing the number of independent observation vectors, K, by means of diversity. The analytical expression is given by:

$$E\{(\hat{\tau} - \tau_t)^2\} \cong \frac{1}{KTr\left\{\left[R^{-1}(\tau_t)\left[\frac{\partial R(\tau)}{\partial \tau}\right]_{\tau=\tau_t}\right]^2\right\}} \quad \text{(EQ. 9)}$$

The expression in (9) is also the expression of the Cramer-Rao lower bound (CRLB) on the TOA estimation MSE when the received signal y is a Gaussian vector which is the case when the multipath is dense or when the channel has only a single path. Thus, in these two cases the GE MSE is higher or equal to (9) and it is expected to reach the CRLB as the number of independent observation vectors (K) increases.

Direct Position Estimation

The ML DPE will now be formulated for various cases of synchronization between the reference stations and object.

Consider a wireless network where there are Q reference stations at known positions and a target at unknown position. The 3D position of the q-th reference station and of the target are denoted by $p_{ref}^q = [x^q\, y^q\, z^q]^T$ and $p = [x\, y\, z]^T$, respectively where $q = 0, 1, \ldots, Q-1$. Let $\zeta^q(p)$ be the signal propagation time between the target and the q-th reference station which is given by $$\zeta^q(p) = \frac{1}{c}\sqrt{(p_{ref}^q - p)^T(p_{ref}^q - p)}. \quad \text{(EQ. 10)}$$

where c is the speed of light.

Denote by $\Omega^q$ the set of all observation vectors related to the link between the target and the q-th reference station. The ML DPE is given by $$\hat{p} = \operatorname*{argmax}_{p} f(\Omega^0, \Omega^1, \ldots, \Omega^{Q-1} \mid p) \quad \text{(EQ. 11)}$$

For each target position p there are Q corresponding propagation times $\zeta^0(p), \zeta^1(p), \ldots, \zeta^{Q-1}(p)$. It is assumed that the channels between the target and different reference stations are statistically independent thus $\Omega^i$ and $\Omega^j$ are statistically independent for $i \neq j$ hence the ML estimator in (11) can be written as $$\hat{p} = \operatorname*{argmax}_{p} \prod_{q=0}^{Q-1} f(\Omega^q \mid \zeta^q(p)) \quad \text{(EQ. 12)}$$

The solution of (12) depends on the clocks synchronization conditions of the reference stations and target. When the clocks of the reference stations are synchronized then the target position can be estimated by transmission from one side only (target or reference stations). It is assumed, without loss of generality, that the target is the transmitting side. Assuming, for now, only one received signal per reference station thus $\Omega^q = y^q$. Let $t_0$ be the transmission time and $\tau_y^q$ be the TOA at the q-th reference station which is given by $\tau_y^q = t_0 + \zeta^q$. In case the reference stations clocks are synchronized to the target clock then the time $t_0$ is known to the reference stations and the ML DPE is given by $$\hat{p}_s = \operatorname*{argmax}_{p} \prod_{q=0}^{Q-1} f(y^q \mid \tau_y^q = t_0 + \zeta^q(p)) \quad \text{(EQ. 13)}$$

When the reference stations are synchronized among themselves but not synchronized to the target then for the reference stations receivers the target transmission time ($t_0$) is a random variable with uniform distribution. In this case the position estimator could be obtained by either averaging the product in (13) over $t_0$ or by maximizing it over $t_0$. The later is the Generalized ML (GML) approach which is simpler and not expected to be degraded since $t_0$ has uniform distribution. The GML DPE for synchronized reference stations which are not synchronized to the target is given by $$\hat{p}_{sr} = \operatorname*{argmax}_{p}\left[\max_{t_0} \prod_{q=0}^{Q-1} f(y^q \mid \tau_y^q = t_0 + \zeta^q(p))\right] \quad \text{(EQ. 14)}$$

In the next considered scenario, the reference stations clocks are not synchronized one to the other nor to the target's clock. In this case measuring the distance between the target and reference stations requires transmission by both target and reference stations. Consider a single link between the q-th reference station and target. Let $t_1$ and $t_2$ be the transmission time of the reference station and target respectively. Let $\Delta^q=t_2-t_1$ be the unknown time difference between the transmission times. Let $\tau_y^q$ be the time difference between the TOA at the reference station and the reference station transmission time $t_1$, and $\tau_x^q$ be the time difference between the TOA at the target and the target transmission time $t_2$ i.e.

$$\tau_y^q = t_2 + \zeta^q(p) - t_1 = \zeta^q(p) + \Delta^q \quad \text{(EQ. 15)}$$

$$\tau_x^q = t_1 + \zeta^q(p) - t_2 = \zeta^q(p) - \Delta^q \quad \text{(EQ. 16)}$$

Let $x^q$ be the received samples at the target obtained from the q-th reference station transmission. In the asynchronous case one has $\Omega^q = \{x^q, y^q\}$. By substituting (15) and (16) into (12), assuming $\Delta^q(p)$ has uniform distribution and applying the GML approach the following asynchronous DPE is obtained:

$$\hat{p}_{as} = \quad \text{(EQ. 17)}$$
$$\operatorname*{argmax}_{P} \prod_{q=0}^{Q-1} \max_{\Delta_q} f(y^q, x^q \mid \tau_y^q = \zeta^q(p) + \Delta^q, \tau_x^q = \zeta^q(p) - \Delta^q)$$

Solving the joint likelihood function $f(y^q, x^q | \tau_y^q = \zeta^q(p) + \Delta^q, \tau_x^q = \zeta^q(p) - \Delta^q)$ depends on the correlation assumption between the channel from target to reference station and vice versa. In case they are statistically independent (for example when the target and reference stations have different carrier frequencies) then the position estimator in (17) can be written as $$\hat{p}_{as} = \arg \quad \text{(EQ. 18)}$$
$$\max_{P} \prod_{q=0}^{Q-1} \max_{\Delta_q} f(y^q \mid \tau_y^q = \zeta^q(p) + \Delta^q) f(x^q \mid \tau_x^q = \zeta^q(p) - \Delta^q)$$

Another case is two way location (transmission from target and also base station sides) where the base stations are synchronized among themselves but not synchornized to the target. In this case the unknown time difference between the transmittions of the target and base station is the same for all base stations, i.e., $\Delta^0 = \Delta^1 = \ldots = \Delta^{Q-1} = \Delta$. The direct position estimation for this case can be written as:

$$\hat{p}_{as} = \arg \quad \text{(EQ. 19)}$$
$$\max_{P} \prod_{q=0}^{Q-1} \max_{\Delta_q} f(y^q \mid \tau_y^q = \zeta^q(p) + \Delta^q) f(x^q \mid \tau_x^q = \zeta^q(p) - \Delta^q)$$

For the various cases of synchronization the present inventors have succeeded to formulate the ML direct position estimators as a product of the TOA likelihood function $f(y|\tau)$. This likelihood function was approximated and derived above. By substituting the result given in (4) into (13), (14) and (18) novel direct position estimators are obtained. The estimators complexity can be reduced by applying the approximations that yield (8) from (7).

Example 5

General Formulation of the Maximum Likelihood Direct Position Estimation

Let $k=\{0,1,\ldots,K-1\}$ be the index of the reference node. Let there be $Q_k$ observation vectors corresponding to the link between the target and the k-th base station. These vectors can be obtained with use of diversity technique such as space, time, frequency or antenna polarization. The $Q_k$ vectors can be statistically independent or also correlated. Let $y_q^k$ be the q-th observation column vector from the $Q_k$ vectors that correspond to the link between the target and the k-th base station. Let $\tilde{y}^k = [(y_0^k)^T (y_1^k)^T \ldots (y_{Q_k-1}^k)^T]^T$ be a column vector which is a concatenation of all received column vectors per link between the target and the k-th reference. The vector $\tilde{y}^k$ may include vectors which were received at the reference node or target or both. It is assumed the $\tilde{y}^k$ has a Gaussian distribution. Let $R^k(p) = E\{\tilde{y}^k(\tilde{y}^k)^H | p\}$ be the autocorrelation of $\tilde{y}^k$ given the position p and $\mu^k(p) = E\{\tilde{y}^k | p\}$ be the mean of $\tilde{y}^k$ given p. It is assumed that $\tilde{y}^k$ and $\tilde{y}^m$ are statistically independent for $k \neq m$. The Maximum Likelihood direct position estimation (ML DPE) is given by $$\hat{p} = \operatorname*{argmax}_{p} \prod_{k=0}^{K-1} f(\tilde{y}^k \mid p) \quad \text{(EQ. 1)}$$

where $f(\tilde{y}^k | p)$ is the probability distribution function which is assumed Gaussian with autocorrelation $R^k(p)$ and mean $\mu^k(p)$. Then the ML DPE can be written as $$\hat{p} = \operatorname*{argmin}_{p} \sum_{k=0}^{K-1} \ln(|R^k(p)|) + (\tilde{y}^k - \mu^k)^H (R^k(p))^{-1} (\tilde{y}^k - \mu^k) \quad \text{(EQ. 2)}$$

Let $\xi^k(p)$ be the signal propagation time between the target at position p and the k-th reference node. Let $\tau^k$ be the time of arrival at the k-th reference node which is given by $\tau^k = t_0 + \xi^k(p)$ where $t_0$ is the transmission time.

If the transmission time $t_0$ is known then (2) can be written as $$\hat{p} = \operatorname*{argmin}_{p} \sum_{k=0}^{K-1} \ln(|R^k(\tau^k = t_0 + \xi^k(p))|) + \quad \text{(EQ. 3)}$$
$$(\tilde{y}^k - \mu^k)^H (R^k(\tau^k = t_0 + \xi^k(p)))^{-1} (\tilde{y}^k - \mu^k)$$

If the transmission time $t_0$ is unknown but the all reference nodes are tune synchronized then the position can be obtained by $$\hat{p} = \operatorname*{argmin}_{p} \left\{ \min_{t_0} \sum_{k=0}^{K-1} \ln(|R^k(\tau^k = t_0 + \xi^k(p))|) + \quad \text{(EQ. 4)} \right.$$
$$\left. (\tilde{y}^k - \mu^k)^H (R^k(\tau^k = t_0 + \xi^k(p)))^{-1} (\tilde{y}^k - \mu^k) \right\}$$

Example 6

Frequency Domain

In this example a TOA Maximum Likelihood estimation in the frequency domain, according to some embodiments of the present invention is described.

Let y be a vector of length N which is the DFT of the received vector and let F be the autocorrelation of y, so that $F=E\{yy^H\}$. The Maximum Likelihood estimation of the TOA, $\tau$, can be written as $$\hat{\tau}=\arg\min_\tau y^H G(\tau) F G^H(\tau) y \quad \text{(EQ. 1)}$$

where $G(\tau)=\text{diag}\{1,z,\ldots,z^{N-1}\}$; $z=e^{j2\pi\tau/T}$ and T is the time duration of vector y.

The cost function to be minimized in Equation (1) can be written as, $$Q(z)=y^H G(\tau) F G^H(\tau) y = g^H(z) Y^H F Y g(z) \quad \text{(EQ. 2)}$$

where $Y=\text{diag}\{y\}$ and $g(z)=[1,z,z^2,\ldots,z^{N-1}]^T$. Note that Q(z) is a polynomial in z given by $$Q(z)=a_{-(N-1)}z^{-(N-1)}+a_{-(N-2)}z^{-(N-2)}+\ldots a_{N-2}z^{N-2}+a_{N-1}z^{N-1} \quad \text{(EQ. 3)}$$

The coefficients of the polynomial terms are the sum of the diagonals of the matrix $Y^H F Y$. Since this matrix is Hermitian the coefficients have the property: $a_i = a^*_{-i}$. Hence, the cost function in Equation (3) can be written as $$Q(z)=\text{Re}\{a^*_0 + 2a^*_1 z^{-1} \ldots + 2a^*_{N-2}z^{-(N-2)} + 2a^*_{N-1}z^{-(N-1)}\}. \quad \text{(EQ. 4)}$$

Let $x=[a^*_0, 2a^*_1, \ldots, 2a^*_{N-1}]$ then the ML estimator in (1) can be implemented by the following stages:

(a) Applying a Discrete Fourier Transform (DFT) or Fast Fourier Transform (FFT) on the vector x with any desired resolution using zero padding prior to the DFT/FFT operation or first applying decimation to vector x followed by zero padding and then DFT/FFT. Note that the result is a complex expression having a real part and an imaginary part. For the next stage, only the real part can be used.

(b) Searching for the frequency that attains minimum real DFT/FFT. From the definition of $z=e^{-j2\pi\tau/T}$ let $f=\tau/T$ be the frequency and $f_M$ be the frequency that attains minimum real value then, according to some embodiments of the present invention the TOA estimation is extracted from $f_M$ by $\hat{\tau}=f_M \times T$.

Alternatively, the ML estimator in (1) can be implemented by calculating DFT at relatively large frequency spacing (coarse resolution) that span the range of minimum and maximum TOA values. Followed by searching for the frequency that attains minimum real value and then calculating DFT at the vicinity of the minimal frequency with small frequency spacing (fine resolution) and conducting another search for the minimal frequency. From the definition of $z=e^{-j2\pi\tau/T}$ let $f=\tau/T$ be the frequency and $f_M$ be the frequency that attains minimum real value then, according to some embodiments of the present invention the TOA estimation is extracted from $f_M$ by $\hat{\tau}=f_M \times T$.

Example 7

Propagation Delay Estimation Based on Two Way Signals

In this example, two way signals are used according to some embodiments of the present invention to estimate the propagation delay between the object and a reference station. This technique is particularly useful for estimating the range to the object in an indirect position estimation.

Let $y_{ref}$ and $y_{tar}$ be column vectors of the received signals at the reference and target respectively. Let $\tilde{y}=[y_{ref}^T \; y_{tar}^T]^T$ be column vector which is the concatenation of $y_{ref}$ and $y_{tar}$. Let $\zeta$ be the signal propagation time between the object and the reference station. Let $\Delta$ be the difference between the transmission times of the object and the reference station. Let $\tau_{ref}$ be the difference between the time of arrival at the reference station and the transmission time of the reference station. Let $\tau_{tar}$ be the difference between the time of arrival at the target and the transmission time of the target.

It is assumed, without loss of generality that $y_{ref}$ starts from the transmission time of the reference station and $y_{tar}$ starts from the transmission time of the target. The ML estimator of the propagation delay (using the notations of Example 4 above) is given by $$\hat{\zeta}=\arg\min_\zeta \max_\Delta f(y_{ref},y_{tar}|\tau_{ref}=\zeta+\Delta,\tau_{tar}=\zeta-\Delta)=\arg\min_\zeta \min_\Delta \ln(|\tilde{R}(\zeta,\Delta)|)+\tilde{y}^H \tilde{R}^{-1}(\zeta,\Delta)\tilde{y}$$

where $\tilde{R}(\zeta,\Delta)=E\{\tilde{y}\tilde{y}^H|\zeta,\Delta\}$.

Example 8

Position or Range Estimation by Propagation Delay Modeling

The power delay profile relates to the distance between the object and the reference station. For example, the channel delay spread (the effective duration of the power delay) is shorter as the distance becomes smaller and also the ratio between the first arrival energy and the following multipath arrivals energies is larger as the distance is smaller.

The relation between the distance and the power delay profile can according to some embodiments of the present invention be modeled, and incorporated into the direct position estimation or into the propagation delay estimation. For each candidate position or candidate propagation delay the distance between the object and reference station is given and the power delay profile used in the matrix R is according to the given distance.

A representing example for the propagation delay estimation is given by $$\hat{\zeta}=\arg\min_\zeta \min_\Delta \ln(|\tilde{R}(\zeta,\Delta,\sigma_h^2(\zeta))|)+\tilde{y}^H \tilde{R}^{-1}(\zeta,\Delta,\sigma_h^2(\zeta))\tilde{y}$$

where $\sigma_h^2(\zeta)$ is the power delay profile as a function of the propagation delay $\zeta$ between the object and the respective reference station and $\Delta$ is the difference between the transmission times of the reference station and target.

A representing example for the position estimation where the object and reference stations are assumed to be synchronized (which is not to be considered as limiting) is given by $$\hat{p}=\arg\min_p \sum_{k=0}^{K-1} \ln(|R^k(\tau^k,\sigma_h^2(\tau^k))|)+(\tilde{y}^k)^H (R^k(\tau^k,\sigma_h^2(\tau^k)))^{-1}\tilde{y}^k$$

where $\tau^k$ is the TOA at the kth reference station (corresponding to the position hypothesis p), which is proportional to the distance, and $\sigma_h^2(\tau^k)$ is the power delay profile as a function of $\tau^k$.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of estimating a position of an object, comprising:
   receiving a plurality of signals transmitted between each of a respective plurality of reference stations of known position and the object;
   for each received signal: processing said signal using a matrix featuring a characteristic power delay profile and a characteristic signal waveform to provide a processed signal, and partitioning said signal into at least a first segment containing noise and a second segment containing at least a multipath signal corresponding to a plurality of paths between the object and a respective reference station; and
   calculating a direct estimate of the position of the object based, at least in part, on said processed signals and on said segments.

2. The method according to claim 1, wherein said matrix is based on a noise variance.

3. The method according to claim 1, wherein said matrix is based on an autocorrelation matrix of said received signal and is a function of the position of the object.

4. The method according to claim 1, wherein said processing comprising modeling said signal using a function characterized by said matrix, said function being selected from the group consisting of a Gaussian function, a Lorentzian function, a hyperbolic secant function, a logistic distribution, a Fourier transform and a wavelet transform.

5. The method according to claim 1, wherein at least one of the signals is a diversity signal having diversity measurements, and the method further comprising processing said diversity measurements, wherein said estimate is based on said processed diversity measurements.

6. The method according to claim 1, wherein at least two of the reference stations are synchronized, and the object is unsynchronized with any reference station.

7. The method according to claim 1, wherein at least two of the reference stations are unsynchronized, wherein the object is unsynchronized with any reference station, and wherein a signal transmitted between the object and each of said at least two reference stations is a two-way signal.

8. The method according to claim 1, wherein at least two of the reference stations are synchronized, wherein the object is unsynchronized with any reference station, and wherein a signal transmitted between the object and each of said at least two reference stations is a two-way signal.

9. The method according to claim 1, wherein said reference stations are located at indoor positions, and the method is utilized for estimating an indoor position of the object.

10. The method according to claim 1, wherein the object is selected from the group consisting of a moving object, an inventory item, a human, an animal, a vehicle and a mobile phone.

11. The method according to claim 1, wherein said reference stations are located at outdoor positions, and the method is utilized for estimating an outdoor position of the object.

12. The method according to claim 1, wherein the reference stations are Access Points, transmitting and receiving over a wireless network according to the LAN protocol, and wherein the object is a client of said wireless network.

13. The method according to claim 1, wherein the reference stations system are satellites are transmitting according to a Global Navigation Satellite System (GNSS) protocol, and the object comprises a receiver for GNSS signals, where said GNSS is selected from the group consisting of a Global Positioning System (GPS), a Global Orbiting Navigation Satellite System (GLONASS) and a Galileo navigation system.

14. The method according to claim 1, wherein said characteristic power delay profile is calculated based on an estimate of a signal-to-noise ratio.

15. The method according to claim 1, further comprising jointly estimating a plurality of pairs of candidate power delay profiles and respective candidate direct estimations of the position of the object, scoring each pair of said plurality of pairs, and selecting the direct estimation of the position of the object based on said score.

16. The method according to claim 1, further comprising jointly estimating a plurality of pairs of candidate signal waveforms and respective candidate direct estimations of the position of the object, scoring each pair of said plurality of pairs, and selecting the direct estimation of the position of the object based on said score.

17. A system for estimating a position of an object, comprising:
   a plurality of reference stations of known positions; and
   a data processor, configured for executing the method according to claim 1.

18. A non-transitory computer software product, comprising a computer-readable medium in which program instructions are stored, which instructions, when read by a data processor, cause the data processor to receive a plurality of signals transmitted between each of a respective plurality of reference stations of known position and an object and execute the method according to claim 1.

19. A method of estimating a time-of-arrival (TOA) of a signal transmitted between an object and a reference station, comprising:
   receiving a multipath signal having a plurality of components respectively corresponding to a plurality of paths between the object and the reference station;
   processing said signal using a matrix featuring a characteristic power delay profile and a characteristic signal waveform to provide a processed signal; and
   calculating an estimate of the TOA of the signal based, at least in part, on said processed signal;
   wherein a signal transmitted between the object and each of said at least two reference stations is a two-way signal, and wherein said matrix features a difference between a signal transmission time of the object and a signal transmission time of a respective reference station.

20. The method according to claim 19, wherein said reference stations are located at indoor positions, and the method is utilized for estimating a distance between a reference station and an object.

21. The method according to claim 19, wherein said matrix is the same for all received signals.

22. The method according to claim 19, wherein said matrix is different for at least two of the received signals.

23. The method according to claim 19, wherein said characteristic power delay profile is calculated based on an estimate of a signal-to-noise ratio.

24. The method according to claim 19, further comprising updating said characteristic power delay profile using data collected from signal transmissions between said reference stations and other objects.

25. The method according to claim 19, further comprising, obtaining at least one additional power delay profile, wherein said processing said signal is executed separately for each power delay profile.

26. The method according to claim 19, further comprising jointly estimating a plurality of pairs of candidate power delay profiles and respective candidate TOAs, scoring each pair of said plurality of pairs, and selecting the TOA estimate based on said score.

27. The method according to claim 19, further comprising, obtaining at least one additional signal waveform, wherein said processing said signal is executed separately for each signal waveform.

28. The method according to claim 19, further comprising:
jointly estimating a plurality of sets of: candidate power delay profiles, candidate signal waveforms, and respective candidate TOAs,
scoring each set of said plurality of sets, and
selecting the TOA estimate based on said score.

29. A system for estimating a position of an object, comprising:
a plurality of reference stations of known positions; and
a data processor, configured for executing the method according to claim 19 to provide a TOA of signals transmitted between the object and each of said reference stations and for calculating the position based on said TOA.

30. A non-transitory computer software product, comprising a computer-readable medium in which program instructions are stored, which instructions, when read by a data processor, cause the data processor to receive a plurality of signals transmitted between each of a respective plurality of reference stations of known position and an object and execute the method according to claim 19.

31. A method of estimating a position of an object, comprising:
receiving a plurality of signals transmitted between each of a respective plurality of reference stations of known position and the object;
for each signal, estimating a time-of-arrival (TOA) of said signal using the method according to claim 19, thereby providing a plurality of TOA estimates; and
calculating an indirect estimate of the position of the object based, at least in part, on said plurality of TOA estimates.

32. The method according to claim 31, wherein said calculation of said indirect estimate comprises utilizing at least one procedure selected from the group consisting of a weighted least-squares procedure, a non-weighted least-squares procedure and a Kalman filter procedure.

33. A method of estimating a position of an object, comprising:

receiving a plurality of signals transmitted between each of a respective plurality of reference stations of known position and the object;
for each received signal: processing said signal using a matrix featuring a characteristic power delay profile and a characteristic signal waveform to provide a processed signal;
calculating a direct estimate of the position of the object based, at least in part, on said processed signals;
jointly estimating a plurality of pairs of candidate power delay profiles and respective candidate direct estimations of the position of the object;
scoring each pair of said plurality of pairs; and
selecting the direct estimation of the position of the object based on said score.

34. A method of estimating a position of an object, comprising:
receiving a plurality of signals transmitted between each of a respective plurality of reference stations of known position and the object;
for each received signal: processing said signal using a matrix featuring a characteristic power delay profile and a characteristic signal waveform to provide a processed signal; and
calculating a direct estimate of the position of the object based, at least in part, on said processed signals;
wherein the method comprises:
jointly estimating a plurality of pairs of candidate signal waveforms and respective candidate direct estimations of the position of the object;
scoring each pair of said plurality of pairs; and
selecting the direct estimation of the position of the object based on said score.

35. A method of estimating a time-of-arrival (TOA) of a signal transmitted between an object and a reference station, comprising:
receiving a multipath signal having a plurality of components respectively corresponding to a plurality of paths between the object and the reference station;
processing said signal using a matrix featuring a characteristic power delay profile and a characteristic signal waveform to provide a processed signal; and
calculating an estimate of the TOA of the signal based, at least in part, on said processed signal;
wherein the method comprises:
jointly estimating a plurality of pairs of candidate power delay profiles and respective candidate TOAs;
scoring each pair of said plurality of pairs; and
selecting the TOA estimate based on said score.

36. A method of estimating a time-of-arrival (TOA) of a signal transmitted between an object and a reference station, comprising:
receiving a multipath signal having a plurality of components respectively corresponding to a plurality of paths between the object and the reference station;
processing said signal using a matrix featuring a characteristic power delay profile and a characteristic signal waveform to provide a processed signal; and
calculating an estimate of the TOA of the signal based, at least in part, on said processed signal;
wherein the method comprises:
jointly estimating a plurality of sets of: candidate power delay profiles, candidate signal waveforms, and respective candidate TOAs;
scoring each set of said plurality of sets; and
selecting the TOA estimate based on said score.

37. A method of estimating a position of an object, comprising:
- receiving a plurality of signals transmitted between each of a respective plurality of reference stations of known position and the object;
- for each signal, estimating a time-of-arrival (TOA) of said signal executing a method of estimating a TOA of said signal to provide a plurality of TOA estimates; and
- calculating an indirect estimate of the position of the object based, at least in part, on said plurality of TOA estimates;
- wherein said method of estimating a TOA of said signal comprises: receiving a multipath signal having a plurality of components respectively corresponding to a plurality of paths between the object and the reference station, processing said signal using a matrix featuring a characteristic power delay profile and a characteristic signal waveform to provide a processed signal, and calculating an estimate of said TOA of said signal based, at least in part, on said processed signal; and
- wherein said calculation of said indirect estimate comprises utilizing at least one procedure selected from the group consisting of a weighted least-squares procedure, a non-weighted least-squares procedure and a Kalman filter procedure.

* * * * *